US008009371B2

(12) United States Patent
Sue et al.

(10) Patent No.: US 8,009,371 B2
(45) Date of Patent: Aug. 30, 2011

(54) LENS DRIVING APPARATUS

(75) Inventors: Takeshi Sue, Nagano (JP); Noboru Otsuki, Nagano (JP); Daisuke Higuchi, Nagano (JP); Makoto Akabane, Nagano (JP)

(73) Assignee: Nidec Sankyo Corporation (JP)

( * ) Notice: Subject to any disclaimer, the term of this patent is extended or adjusted under 35 U.S.C. 154(b) by 309 days.

(21) Appl. No.: 11/916,418

(22) PCT Filed: Aug. 31, 2006

(86) PCT No.: PCT/JP2006/317246
§ 371 (c)(1),
(2), (4) Date: Jun. 29, 2009

(87) PCT Pub. No.: WO2007/026830
PCT Pub. Date: Mar. 8, 2007

(65) Prior Publication Data
US 2009/0303621 A1 Dec. 10, 2009

(30) Foreign Application Priority Data

| Sep. 2, 2005 | (JP) | ................................. | 2005-255040 |
| Oct. 28, 2005 | (JP) | ................................. | 2005-314565 |
| Feb. 24, 2006 | (JP) | ................................. | 2006-048497 |
| Mar. 22, 2006 | (JP) | ................................. | 2006-078343 |

(51) Int. Cl.
*G02B 7/02* (2006.01)
(52) U.S. Cl. .................... 359/824; 359/813; 359/814
(58) Field of Classification Search .................. 359/811, 359/819, 813, 814, 823, 824
See application file for complete search history.

(56) References Cited

U.S. PATENT DOCUMENTS

| 5,200,776 A * | 4/1993 | Sakamoto ....................... 396/86 |
| 5,606,456 A * | 2/1997 | Nagata et al. .................. 359/554 |
| 6,011,927 A * | 1/2000 | Kamata ........................... 396/55 |
| 6,631,042 B2 * | 10/2003 | Noguchi ....................... 359/823 |

FOREIGN PATENT DOCUMENTS

| JP | 2004-280031 | 10/2004 |
| JP | 2005-37865 | 2/2005 |
| JP | 2005-173431 | 6/2005 |
| JP | 2005-258355 | 9/2005 |
| JP | 2006-71702 | 3/2006 |
| JP | 3124292 | 7/2006 |

OTHER PUBLICATIONS

International Search Report for International Application No. PCT/JP2006/317246 mailed Jan. 9, 2007.

* cited by examiner

*Primary Examiner* — Mohammed Hasan
(74) *Attorney, Agent, or Firm* — Cantor Colburn LLP

(57) ABSTRACT

A lens driving apparatus is disclosed. The lends driving apparatus may include a movable body holding lenses, a fixed body in which the movable body is mounted and movably along the lens optical axis direction, and a drive mechanism that moves the movable body in the lens optical axis direction. The drive mechanism may be equipped with a coil that is held by the movable body or the fixed body, a magnet that is held by the other body of the movable body and the fixed boy, and a regulatory means that regulates the movement of the movable body which is induced by an electromagnetic force generated when current is passed through the coil. The coil may be opposed to the magnet in the lens optical direction.

10 Claims, 48 Drawing Sheets

[Fig.1]
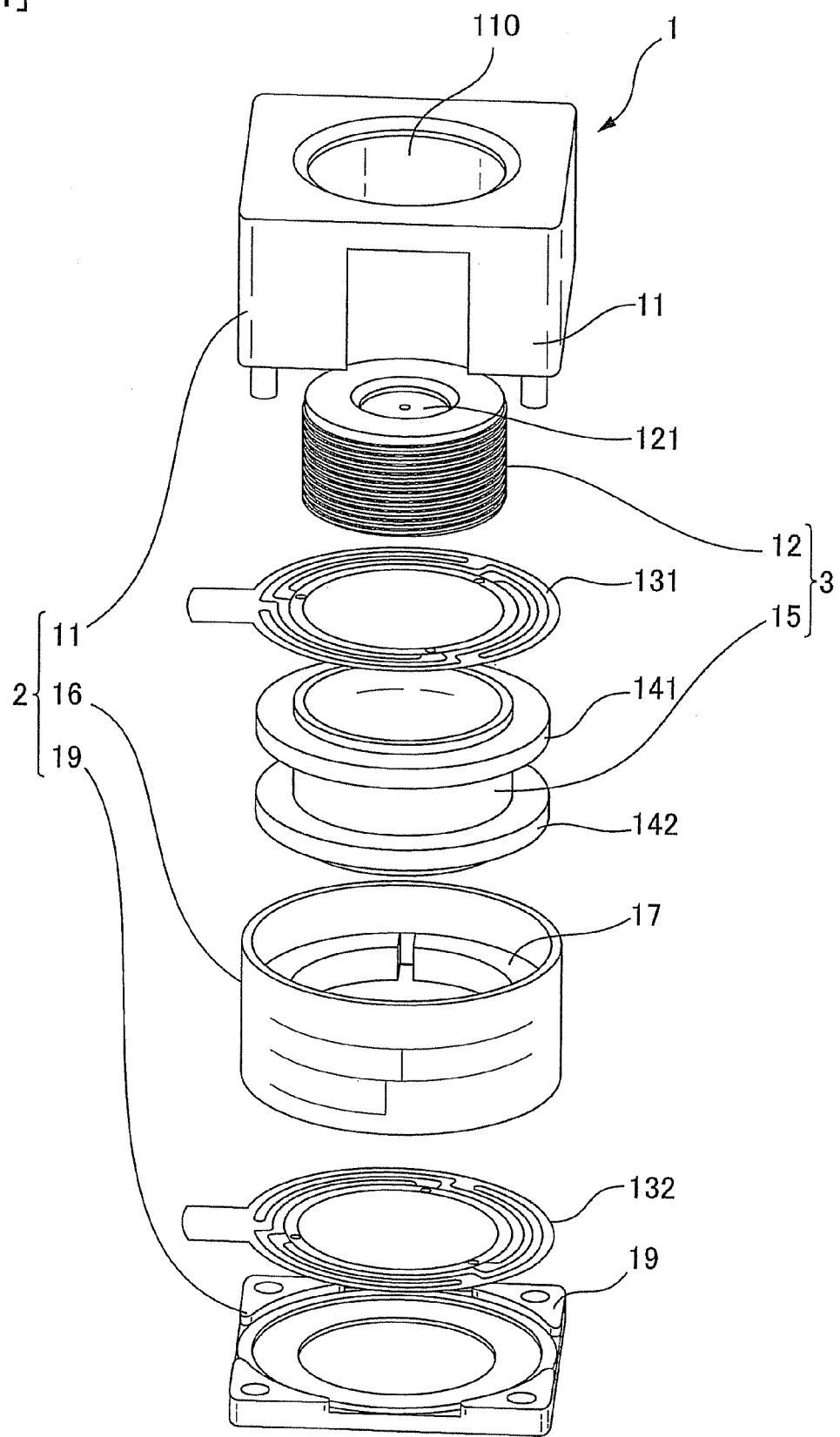

[Fig.2] (a)
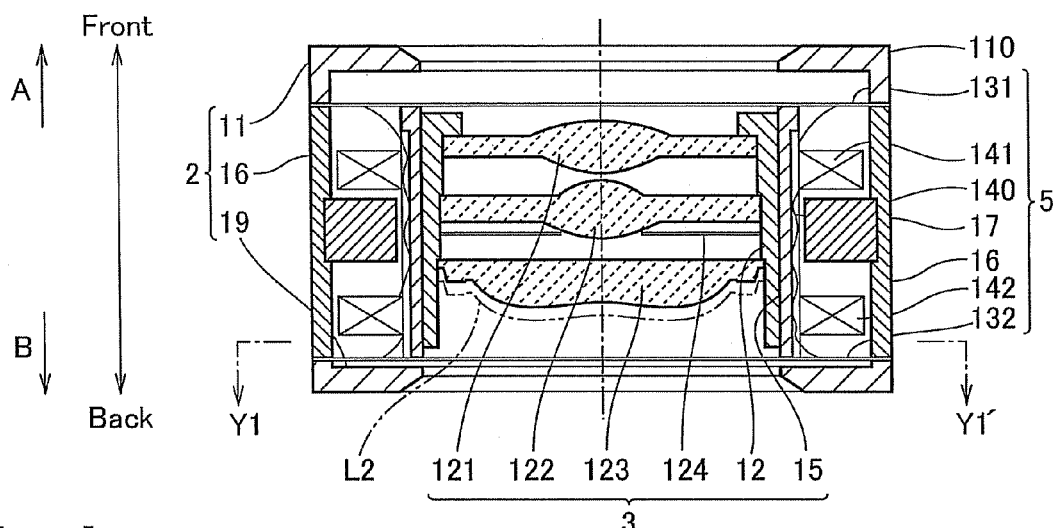
[Fig.2] (b)
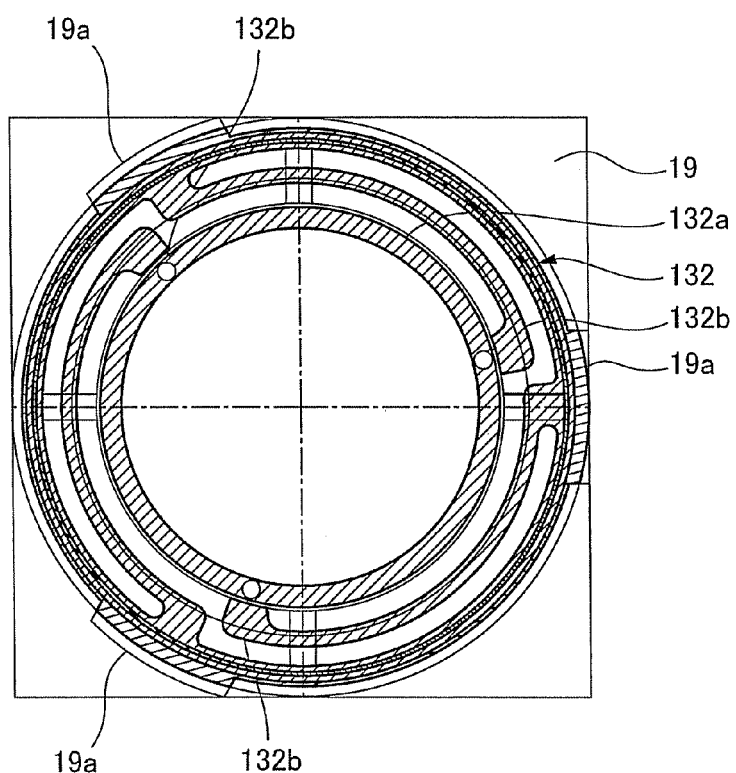

[Fig.3] (a)
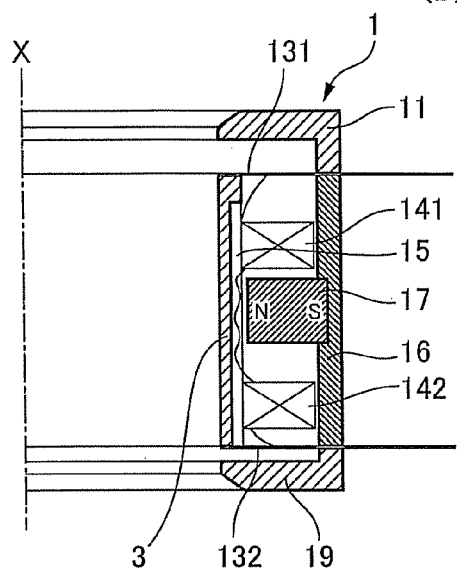
[Fig.3] (b)
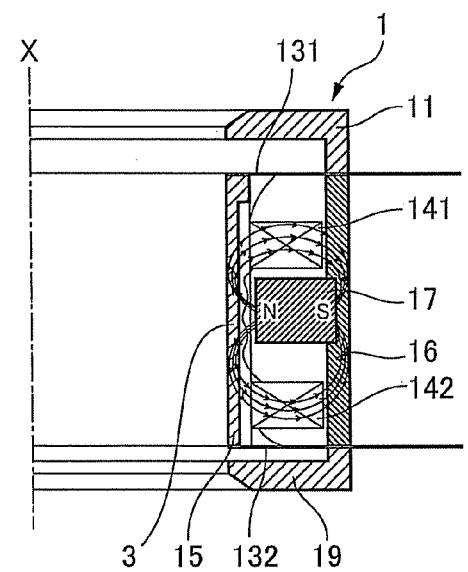
[Fig.3] (c)
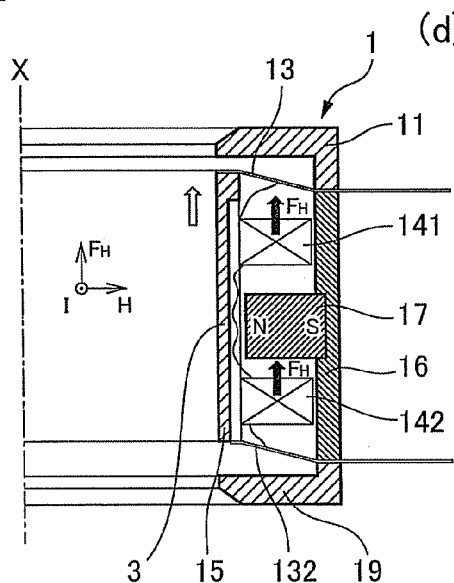
[Fig.3] (d)
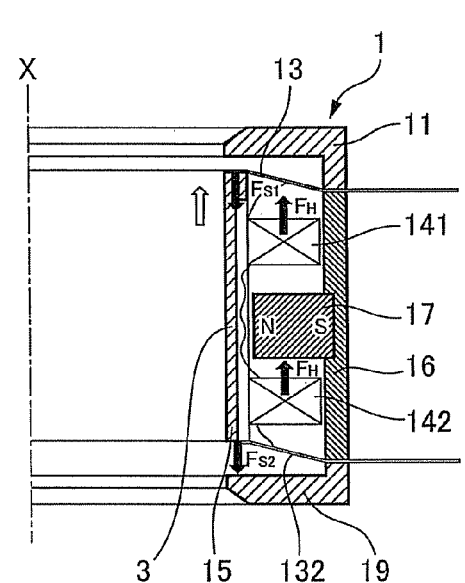

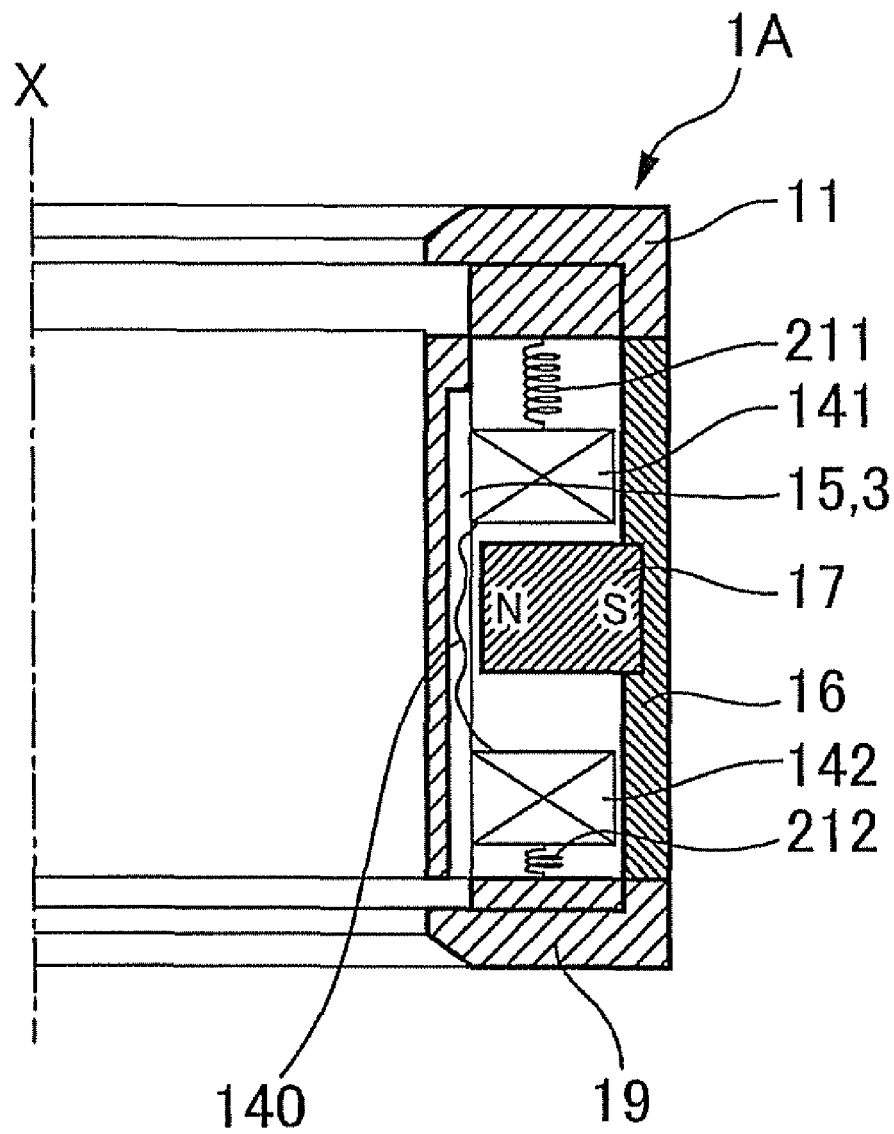
[Fig.4]

[Fig.5] (a)
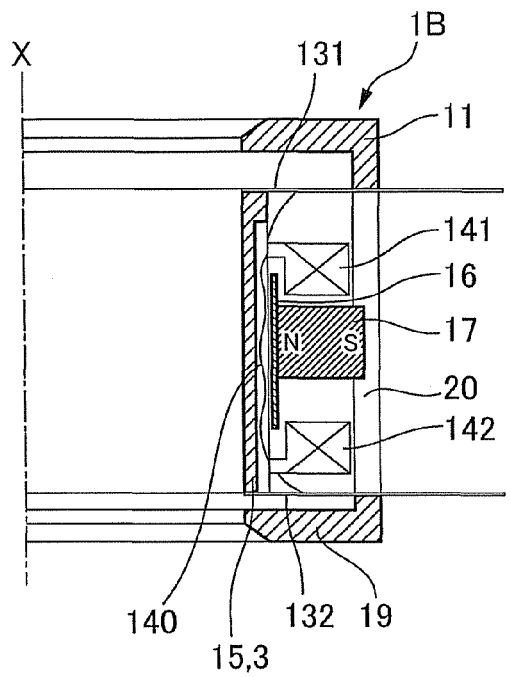
[Fig.5] (b)
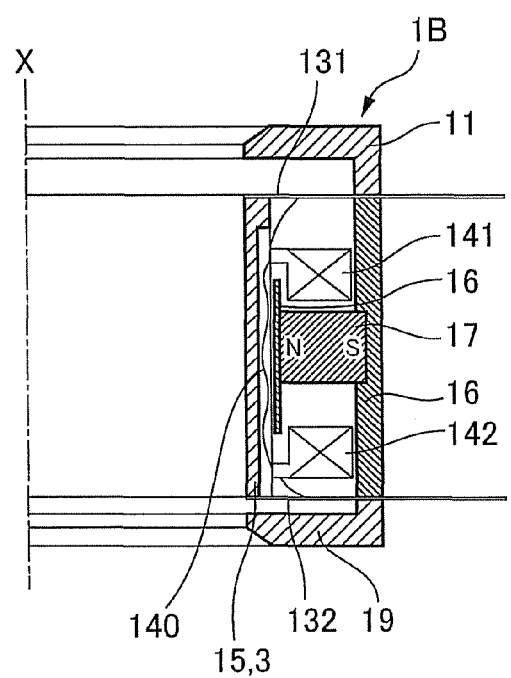

[Fig.6]
(a)
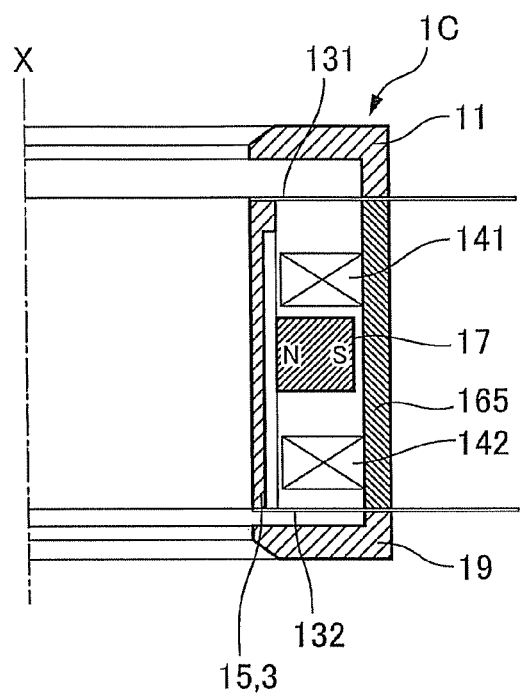
[Fig.6]
(b)
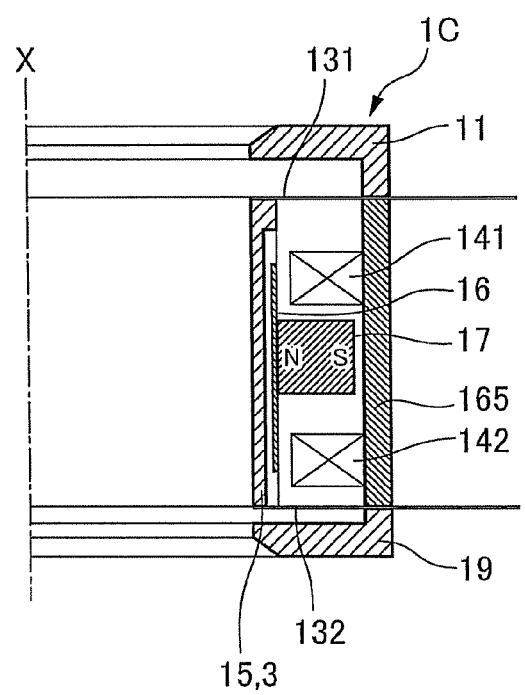

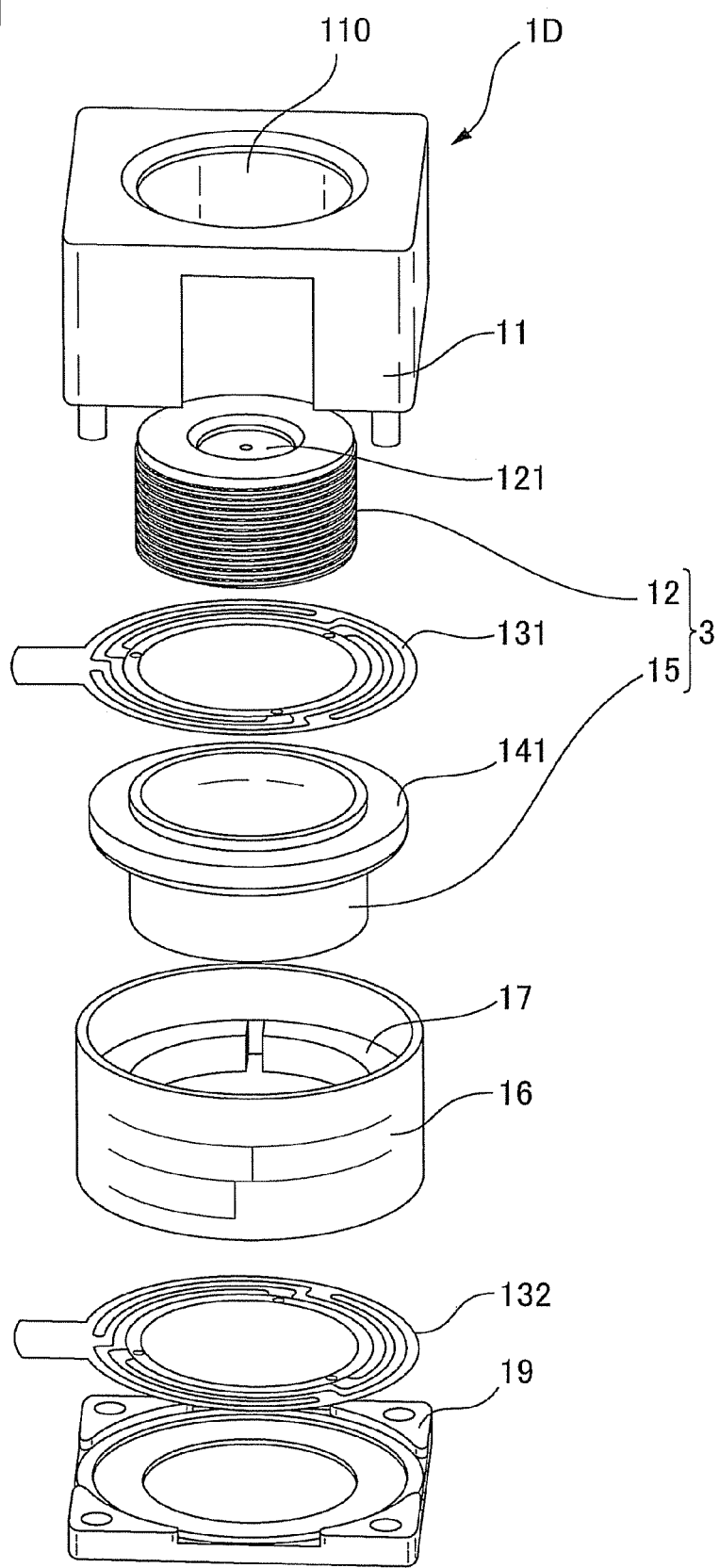
[Fig.7]

[Fig.8]
(a)
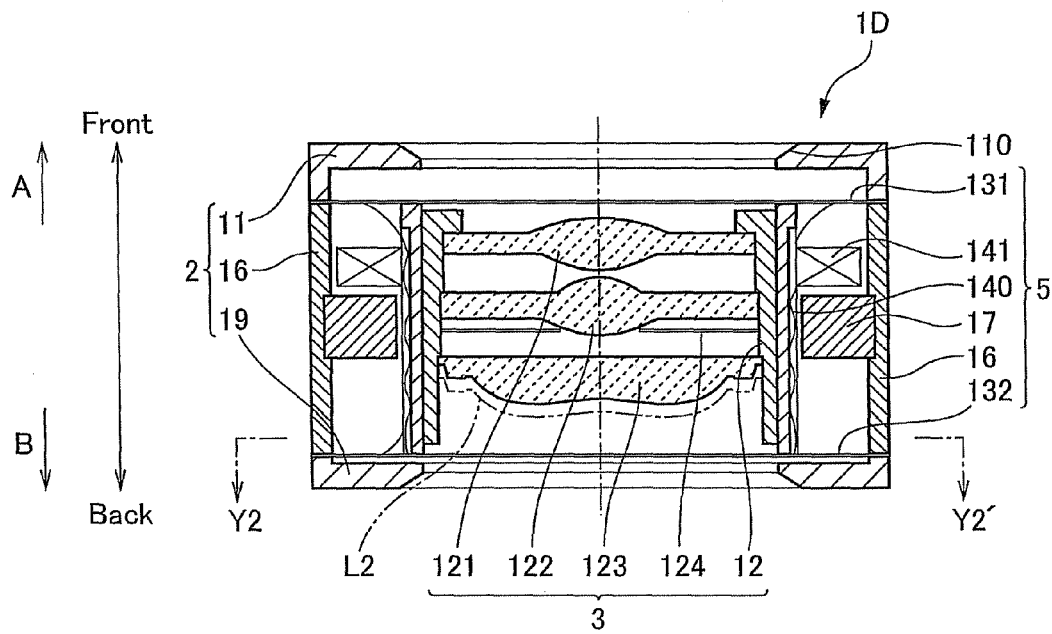
[Fig.8]
(b)
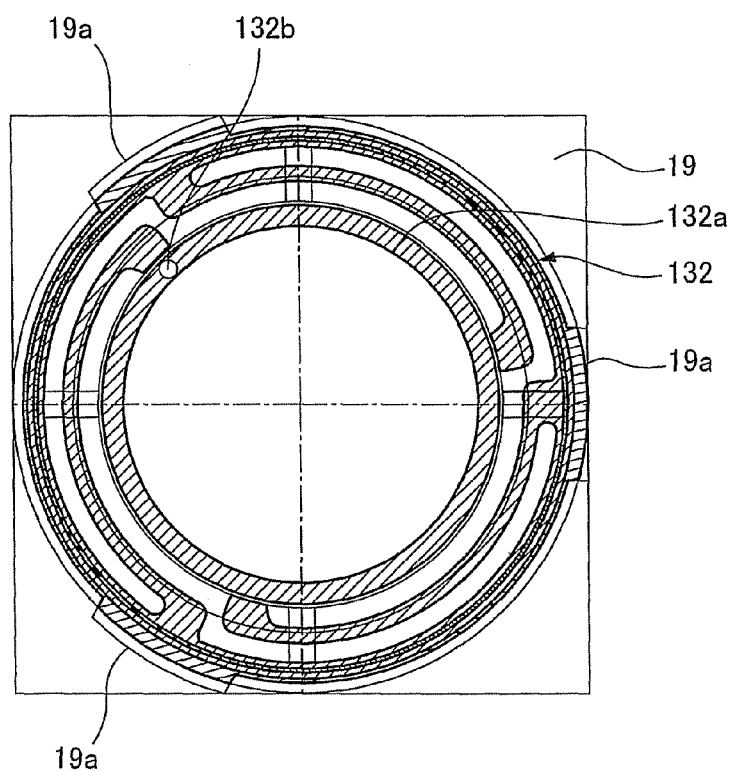

[Fig.9]
(a)
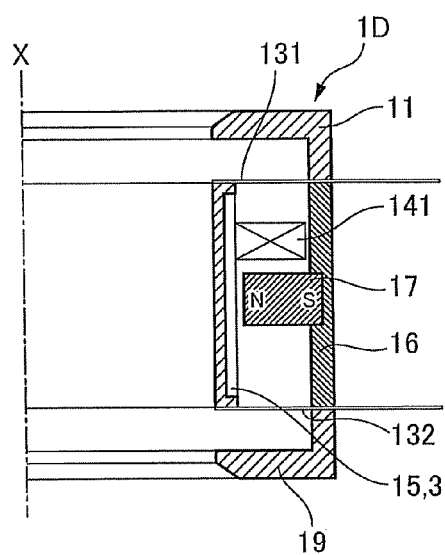
[Fig.9]
(b)
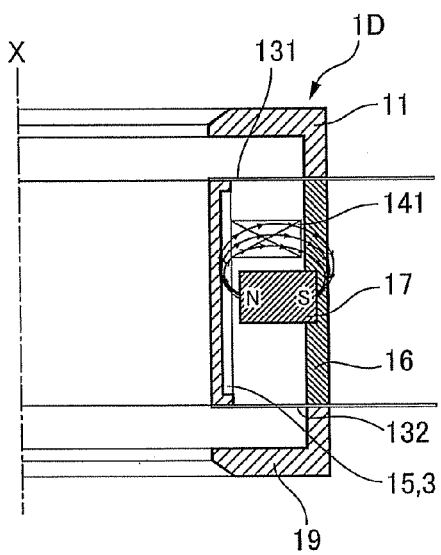
[Fig.9]
(c)
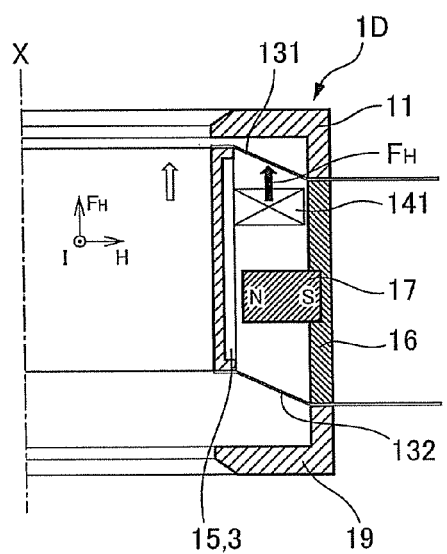
[Fig.9]
(d)
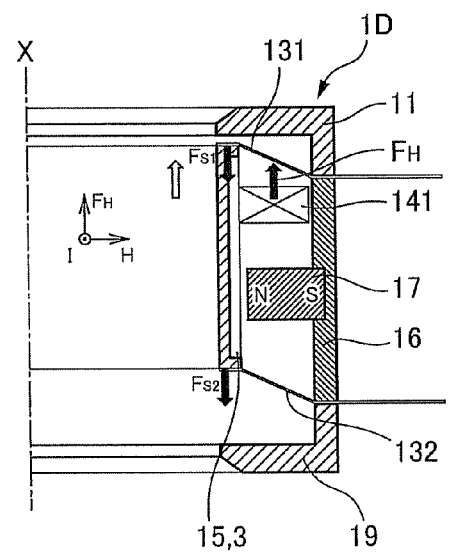

[Fig.10]
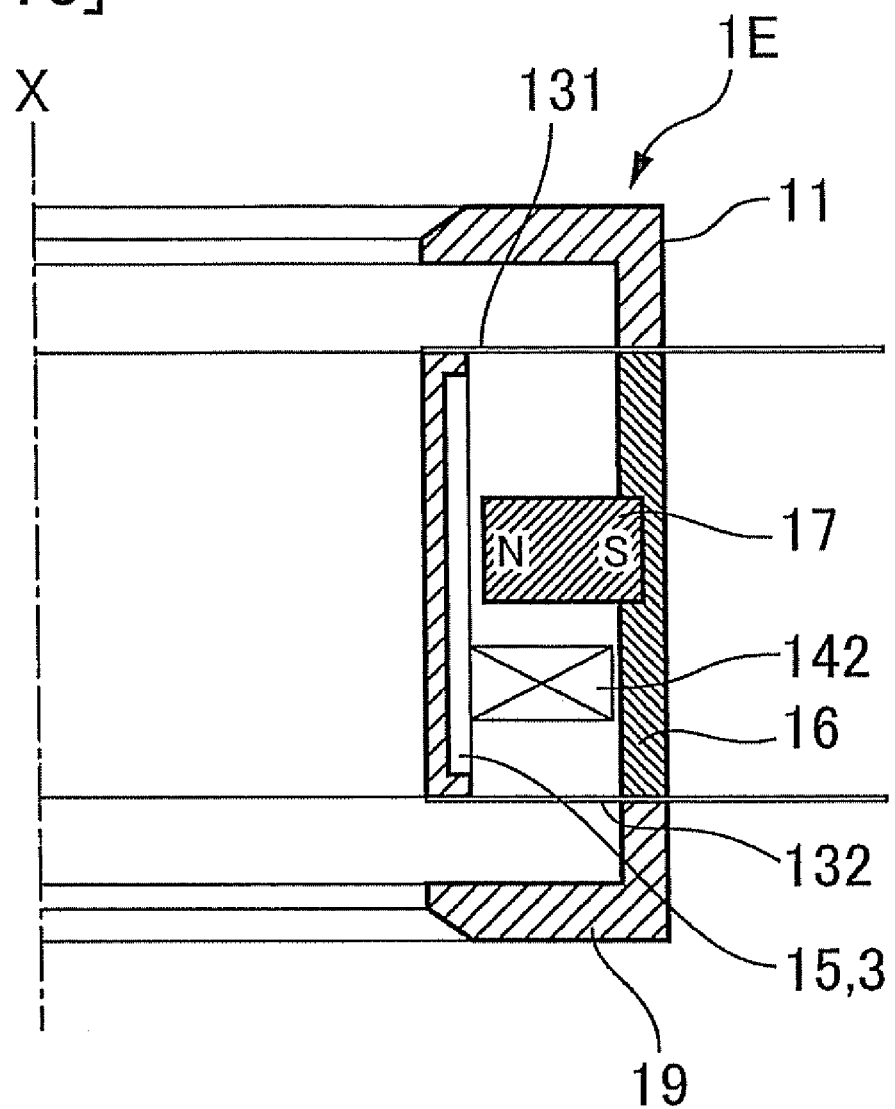

[Fig.11]
(a)
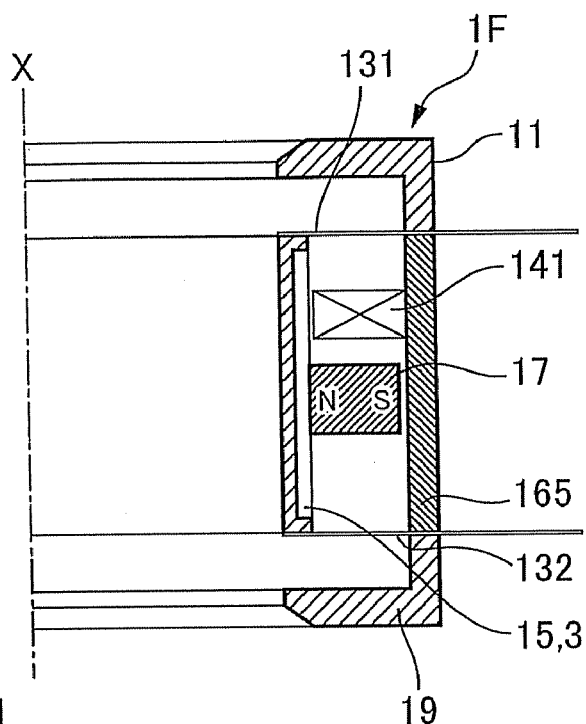
[Fig.11]
(b)
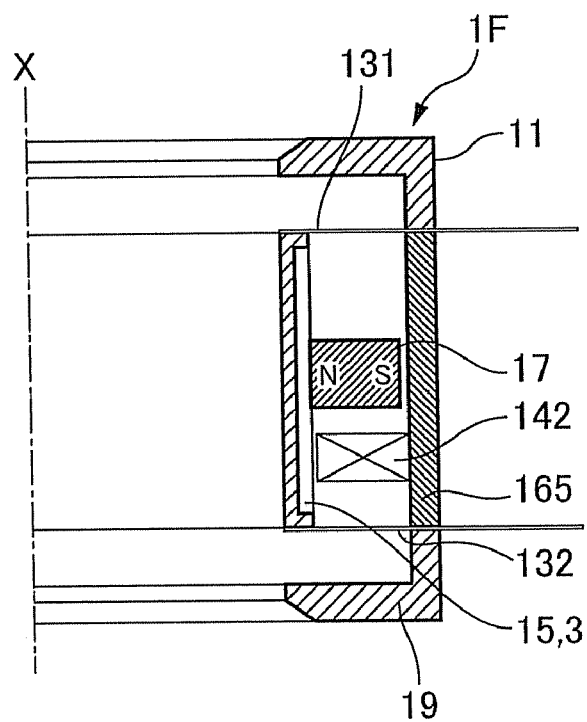

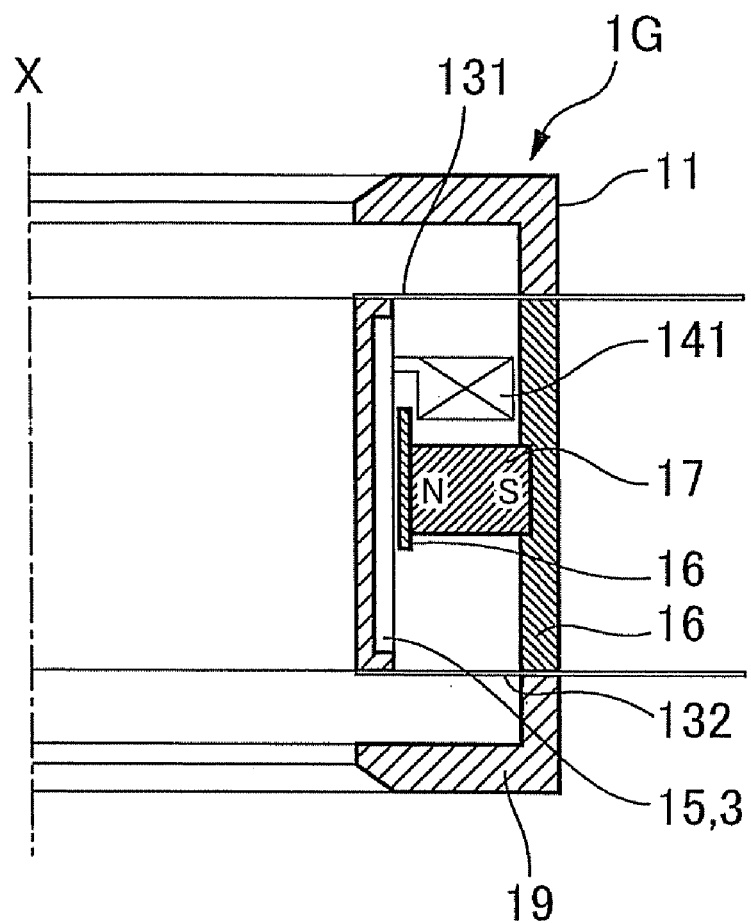
[Fig.12]

[Fig.13]
(a)
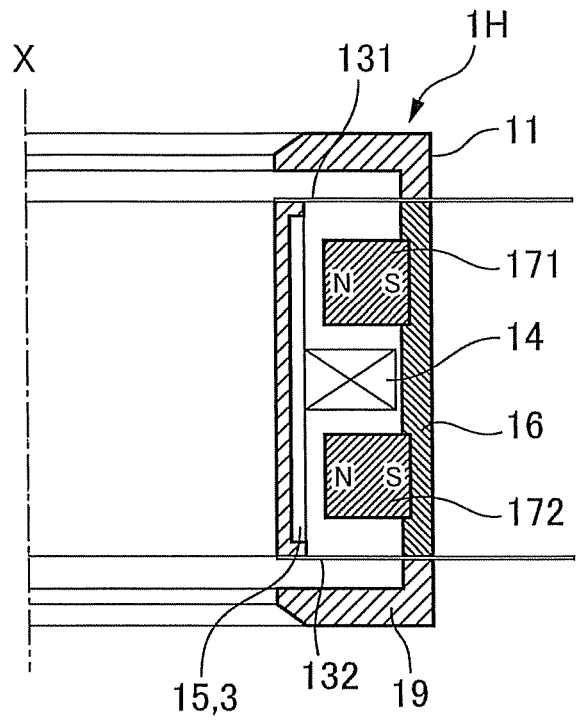
[Fig.13]
(b)
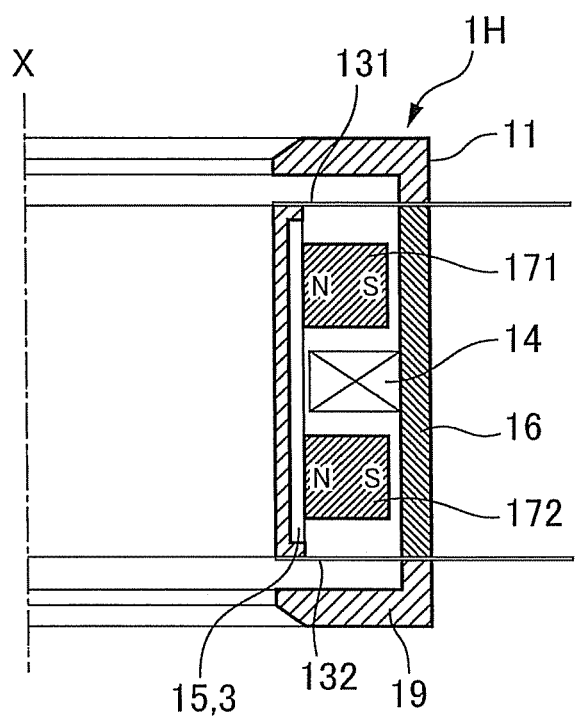

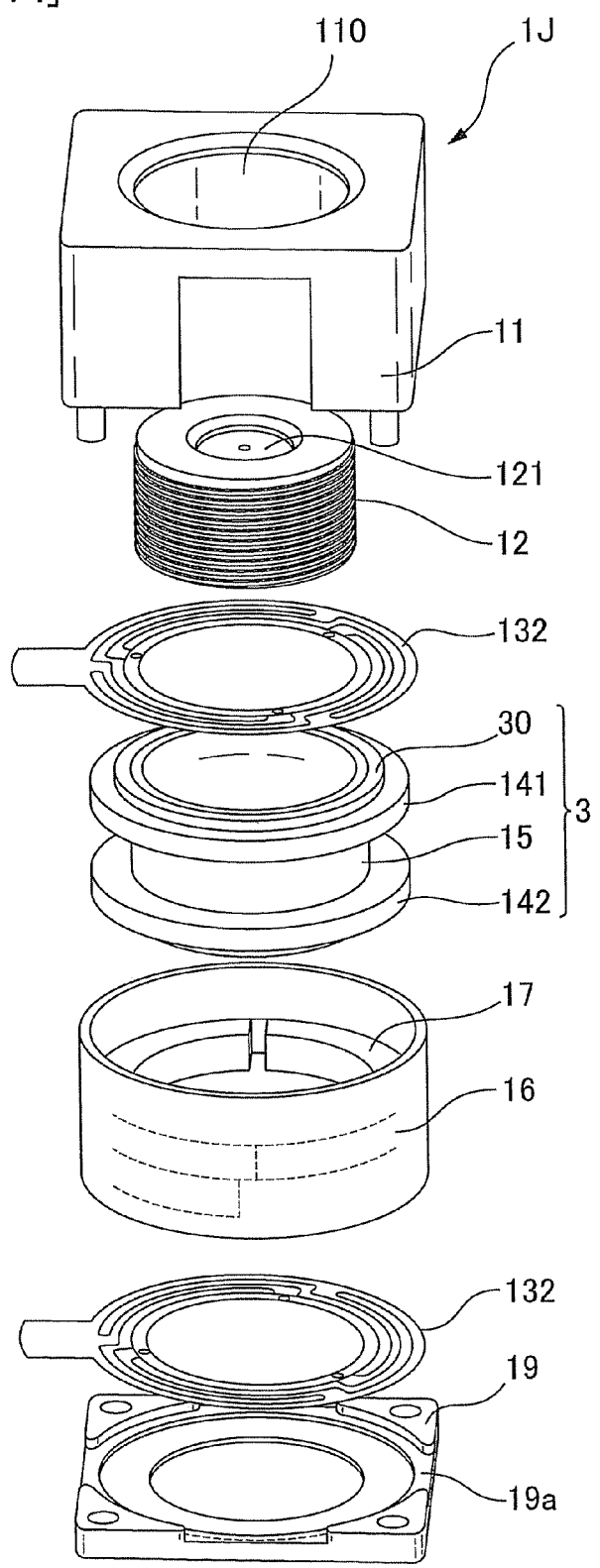
[Fig.14]

[Fig.15]
(a)
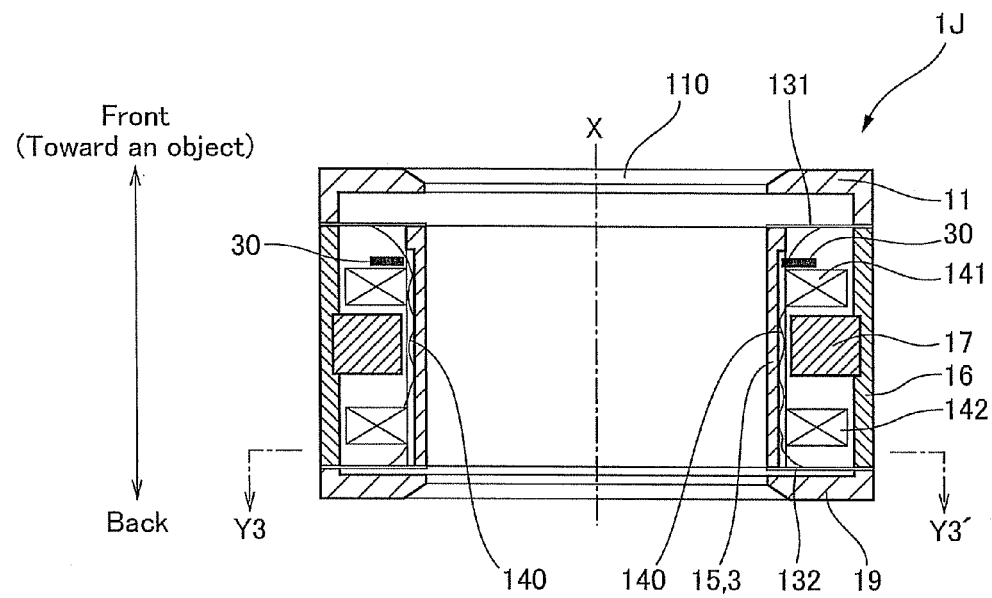
[Fig.15]
(b)
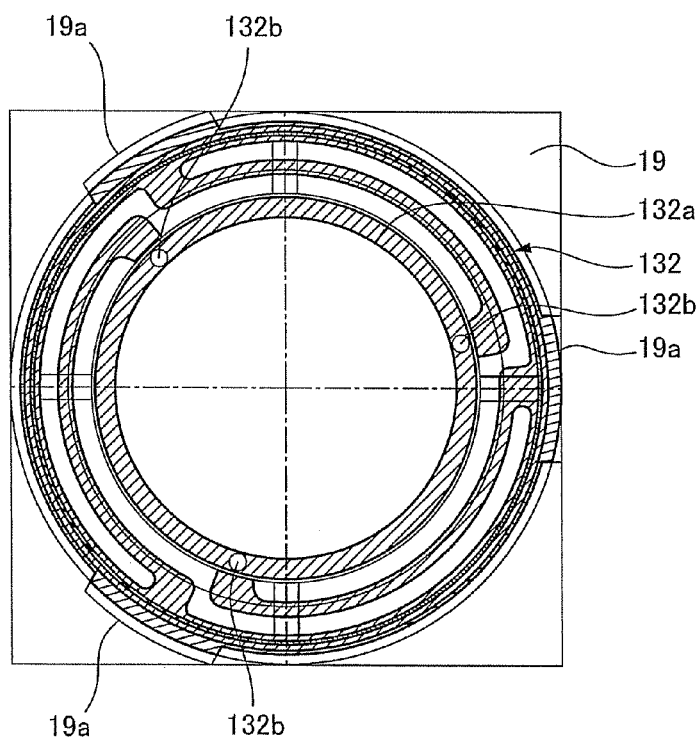

[Fig.16]
(a)
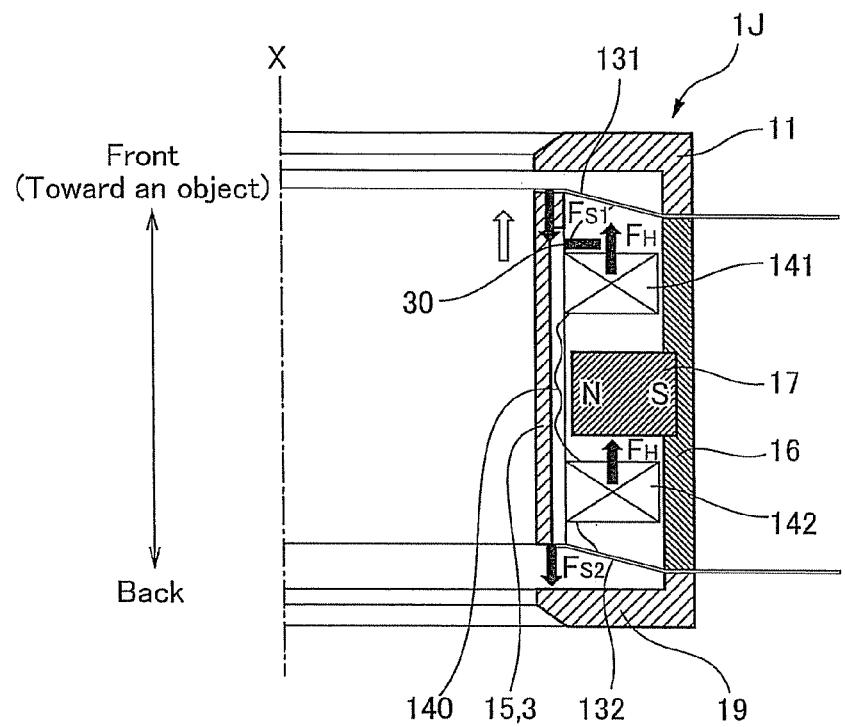
[Fig.16]
(b)
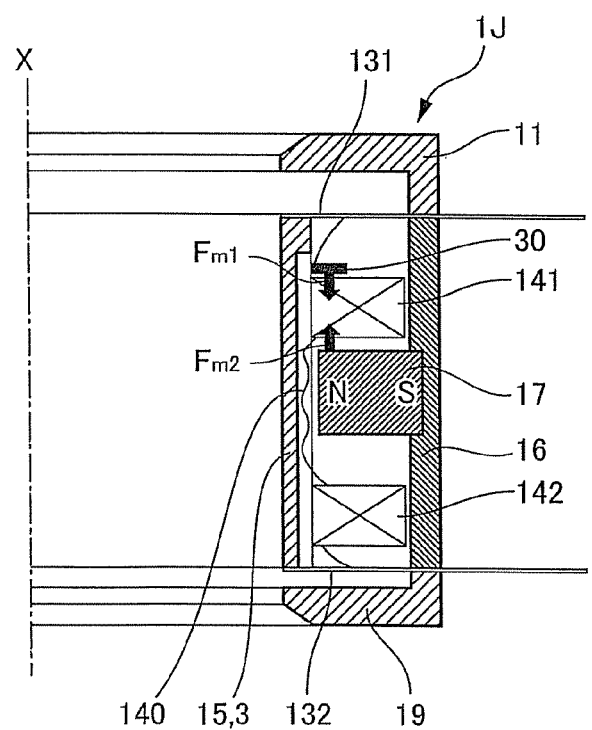

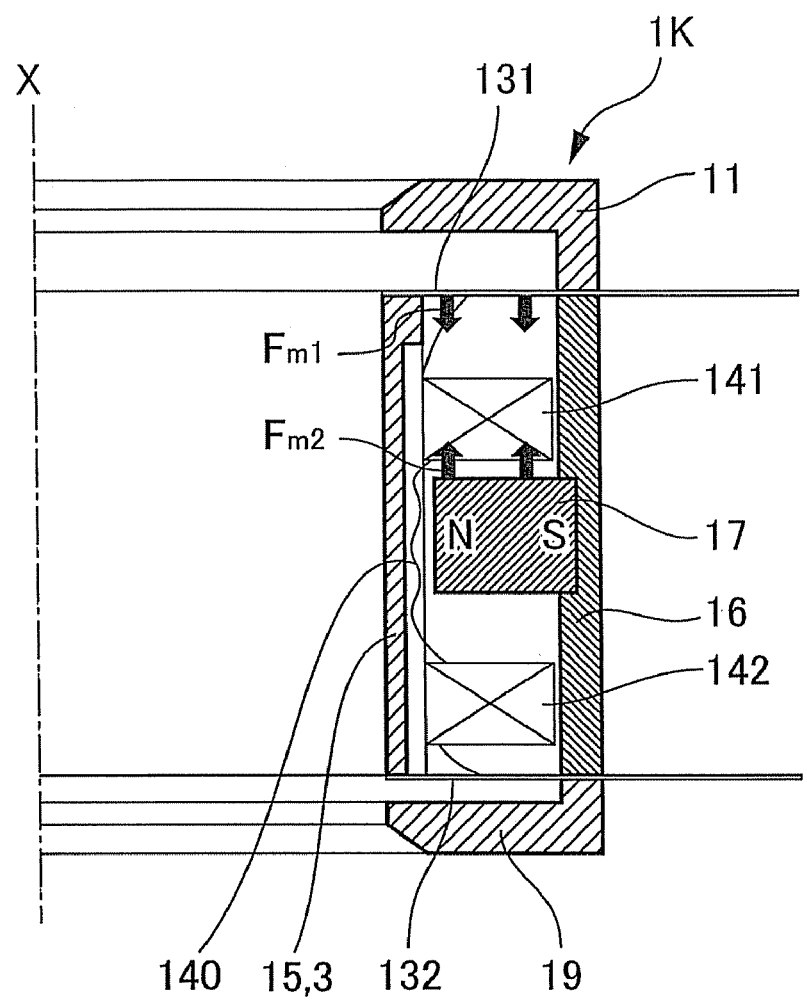
[Fig.17]

[Fig.18]
(a)
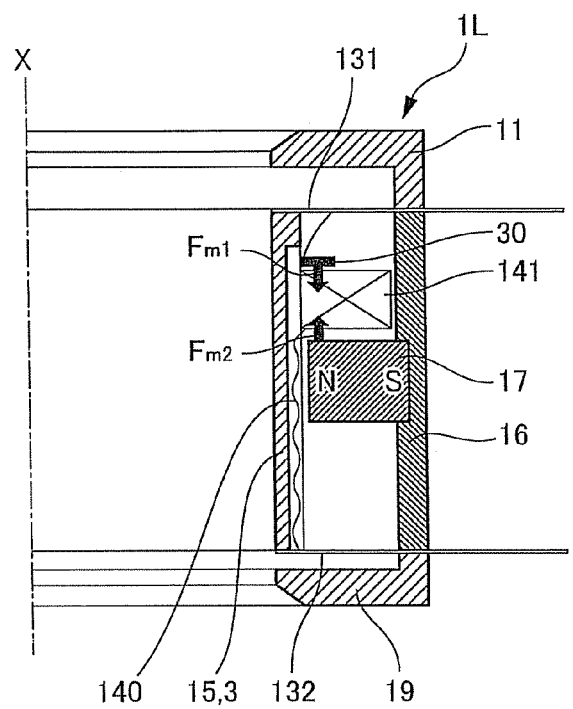
[Fig.18]
(b)
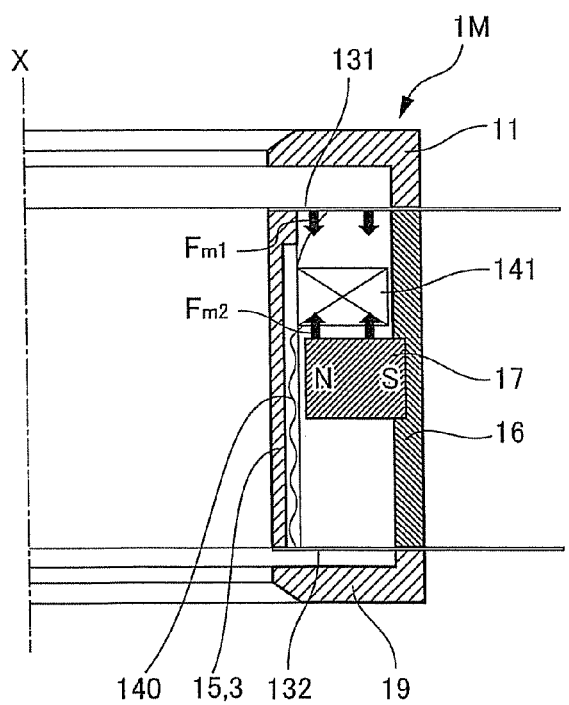

[Fig.19]
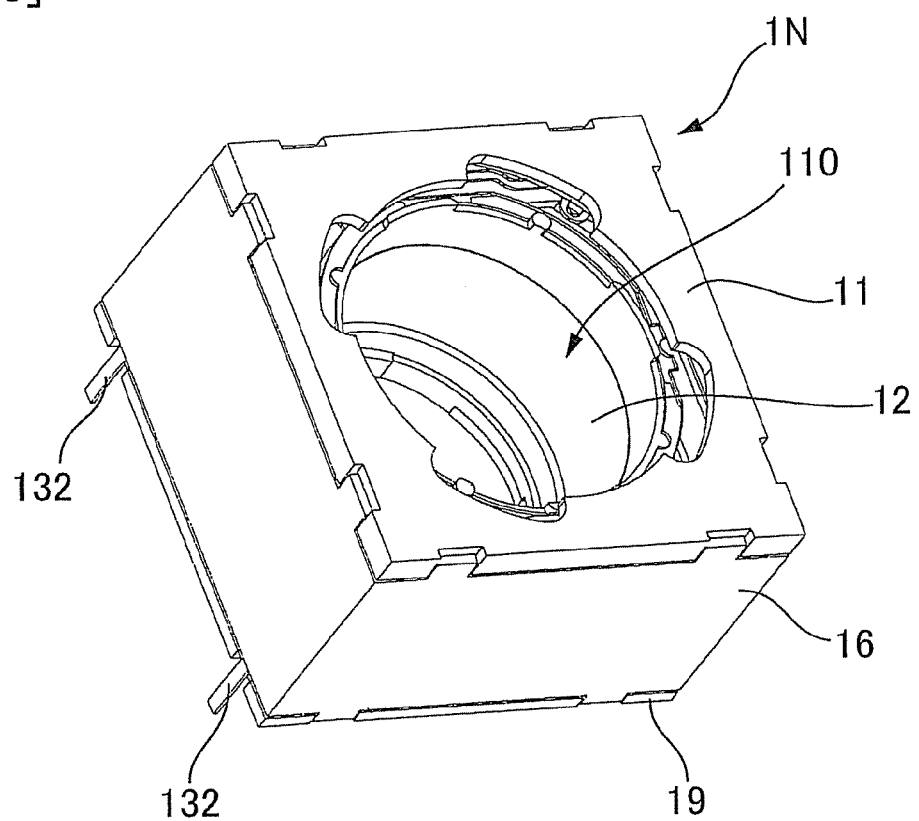

[Fig.20]
(a)
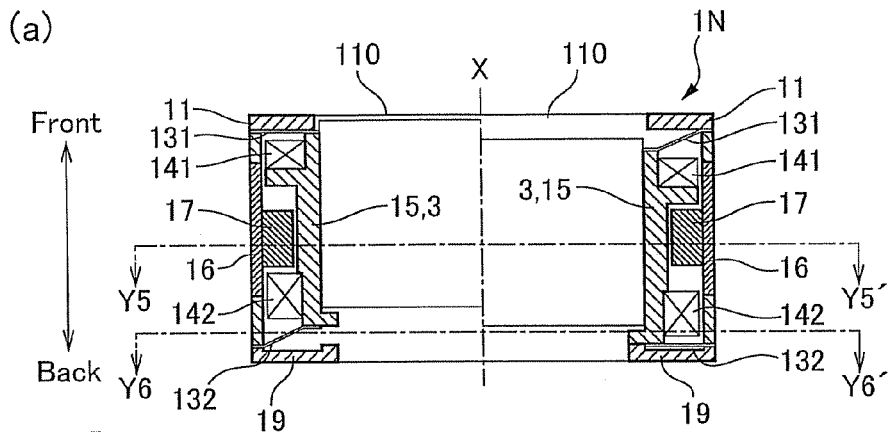
[Fig.20]
(b)
[Fig.20]
(c)
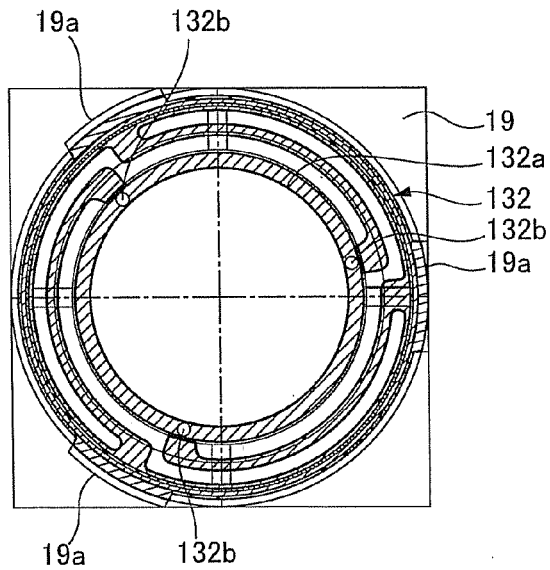

[Fig.21]
(a)
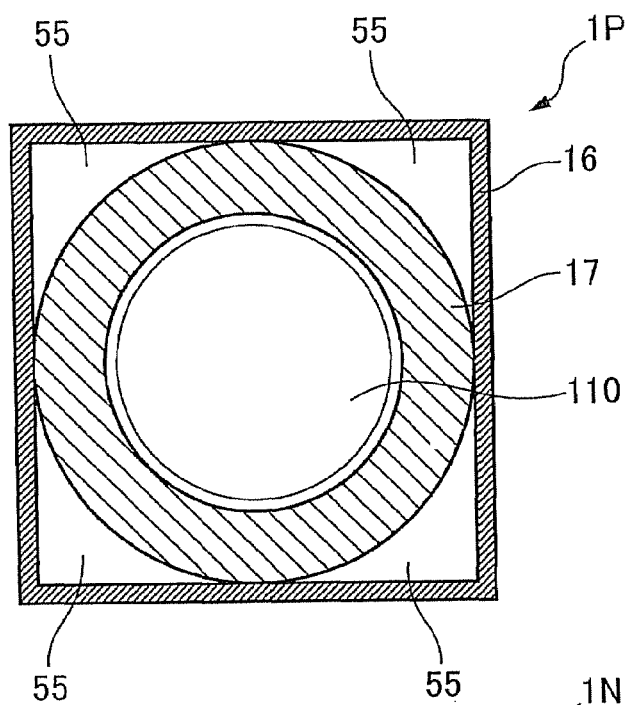
[Fig.21]
(b)
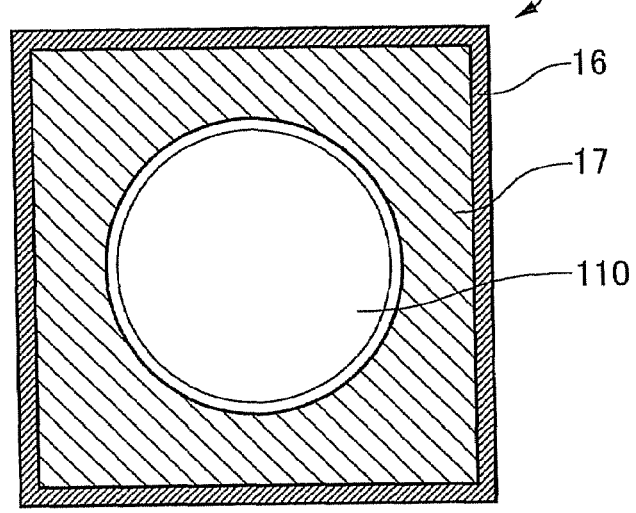

[Fig.22]
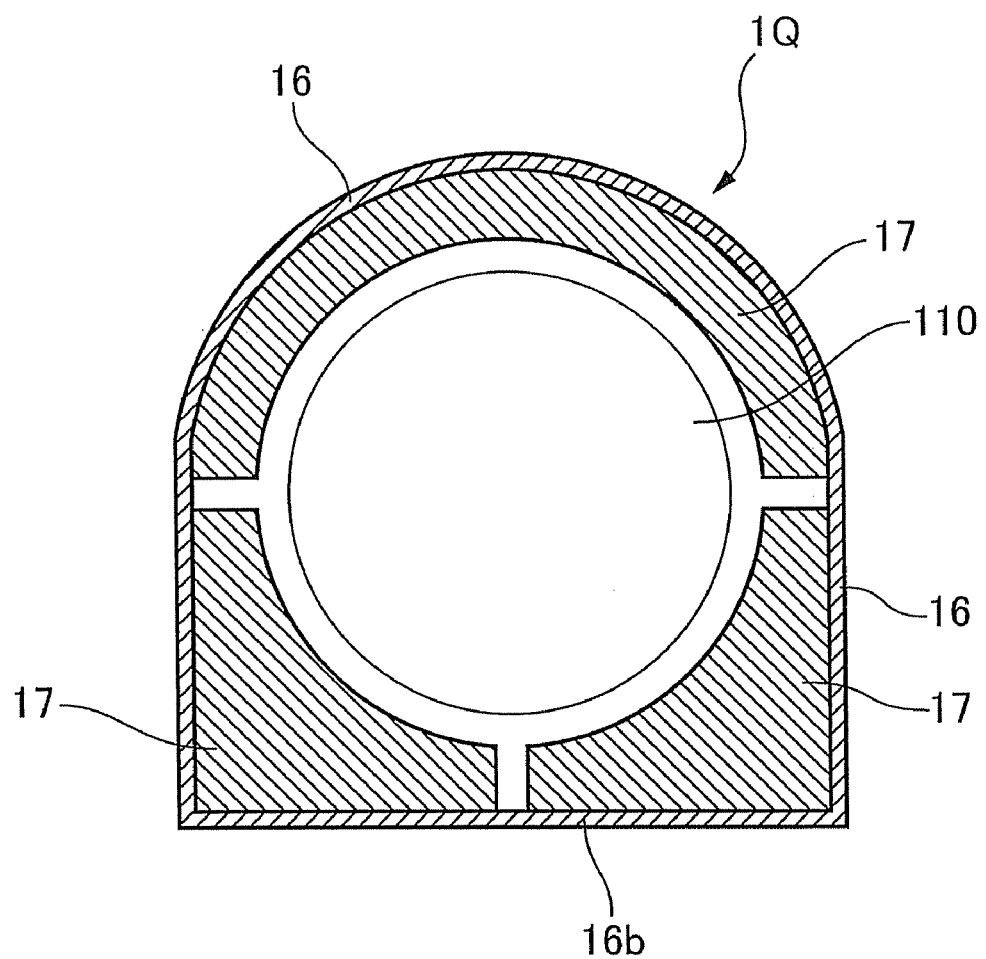

[Fig.23]
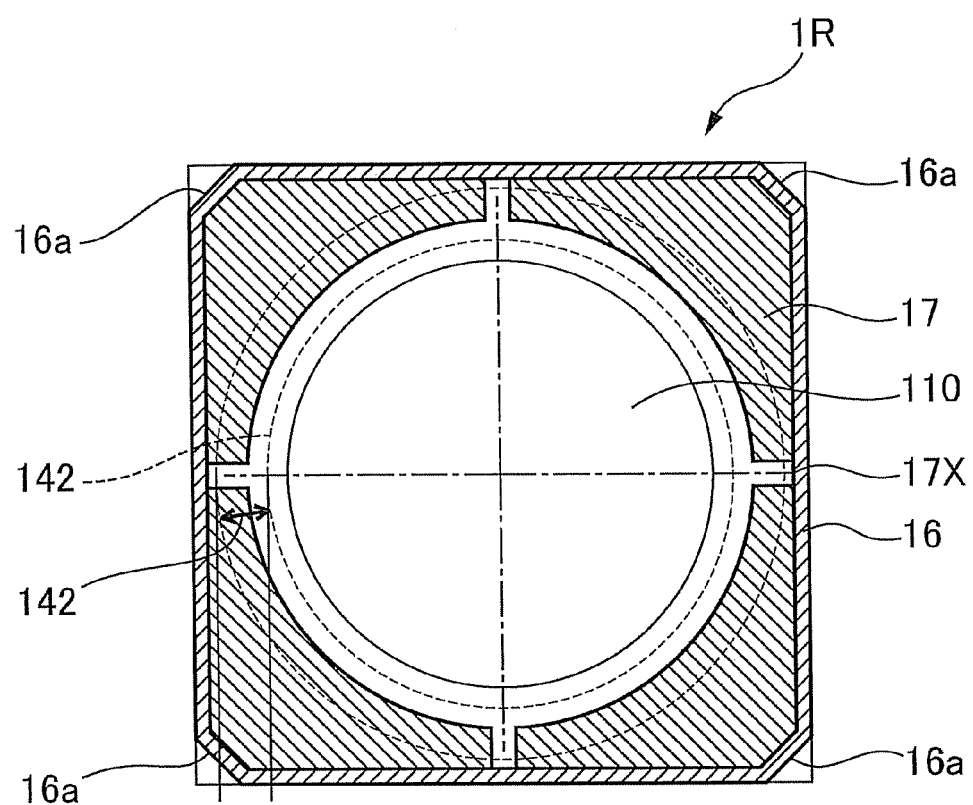

[Fig.24]
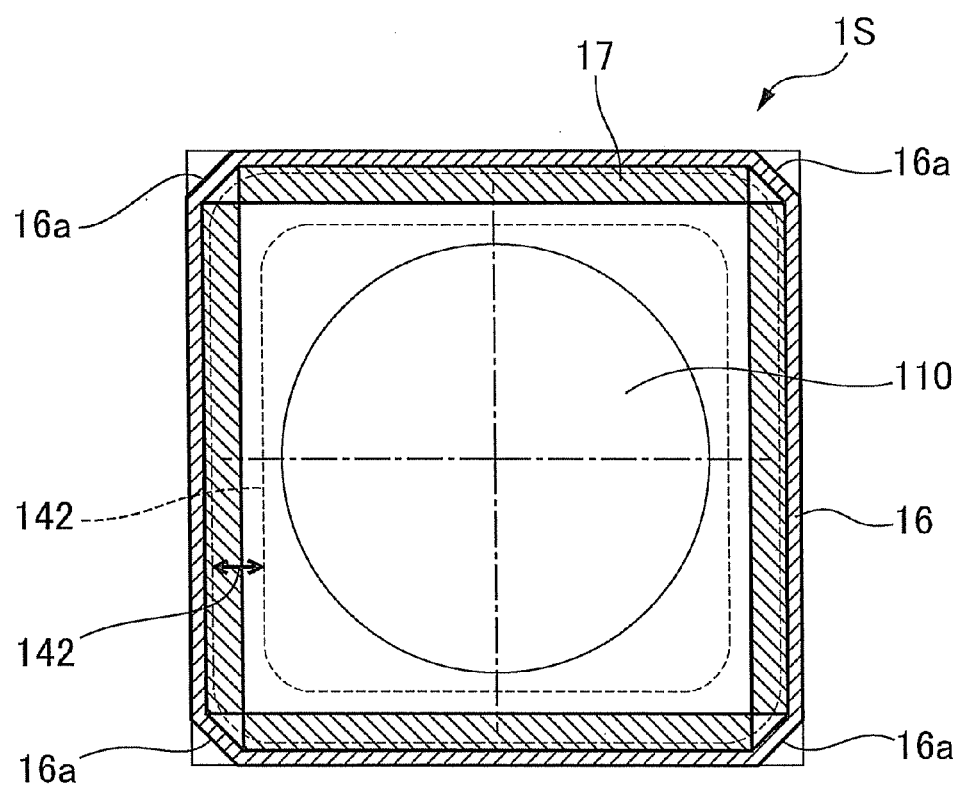

Movable: Coil
Fixed: Magnet, Yoke

Movable: Magnet, Yoke
Fixed: Coil

Movable: Magnet
Fixed: Coil, Yoke

Movable: Coil
Fixed: Magnet, Yoke

Movable: Magnet, Yoke
Fixed: Coil

Movable: Magnet
Fixed: Coil, Yoke

Movable: Coil
Fixed: Magnet, Yoke

Movable: Magnet, Yoke
Fixed: Coil

Movable: Magnet, Yoke
Fixed: Coil

Movable: Magnet
Fixed: Coil, Yoke

Movable: Coil
Fixed: Magnet, Yoke

Movable: Magnet, Yoke
Fixed: Coil

Movable: Magnet
Fixed: Coil, Yoke

Movable: Coil
Fixed: Magnet, Yoke

Movable: Magnet, Yoke
Fixed: Coil

Movable: Magnet
Fixed: Coil, Yoke

Movable: Coil  Fixed: Magnet, Yoke

Movable: Magnet, Yoke  Fixed: Coil

Movable: Coil
Fixed: Magnet, Yoke

Movable: Magnet, Yoke
Fixed: Coil

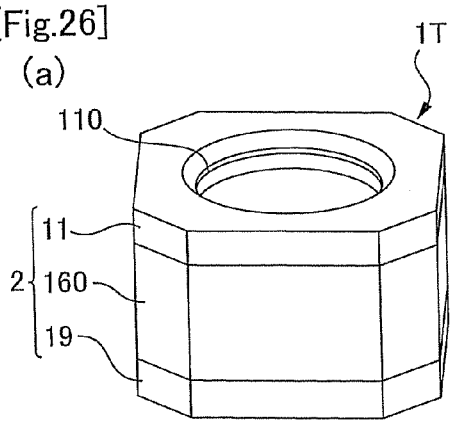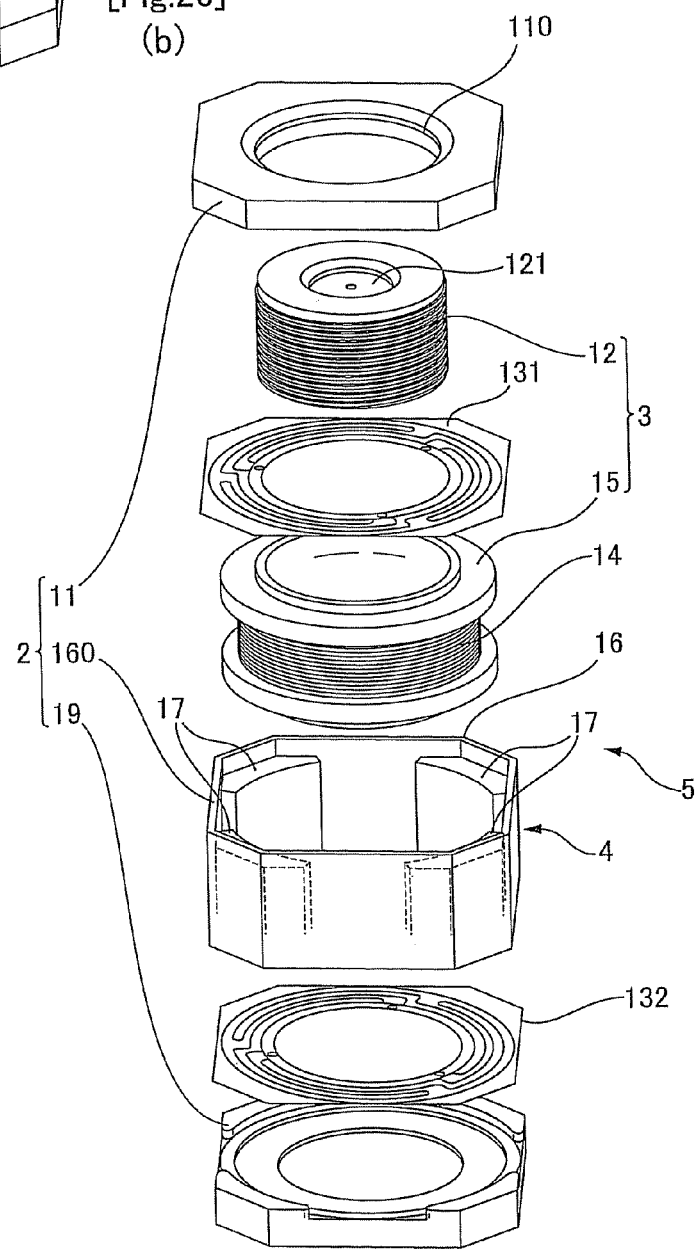

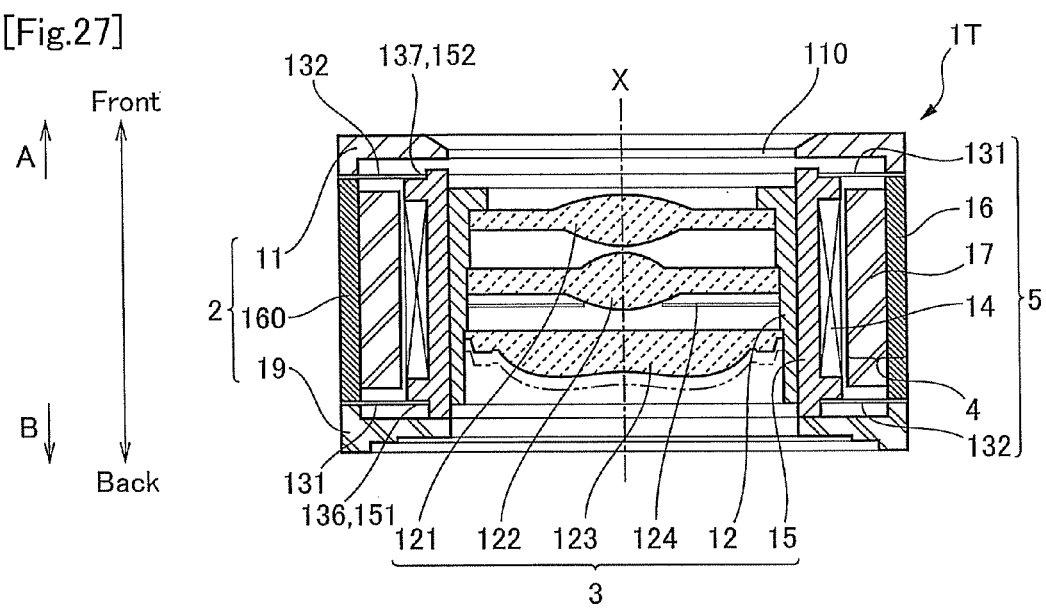
[Fig.27]

[Fig.28]
(a)
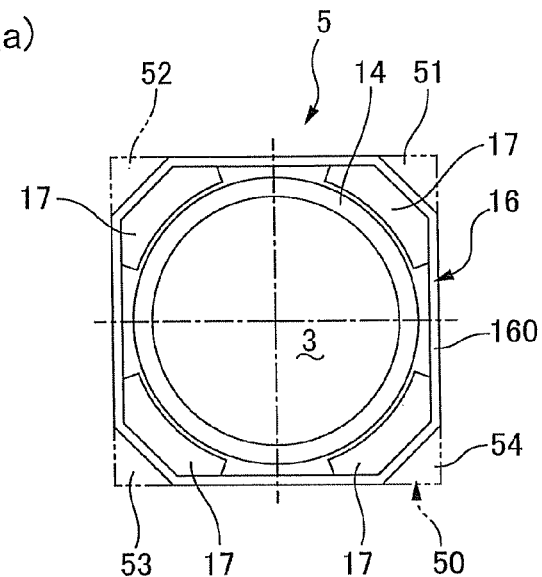
[Fig.28]
(b)
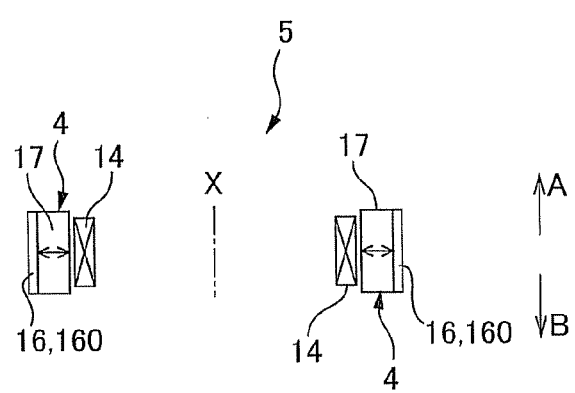
[Fig.28]
(c)
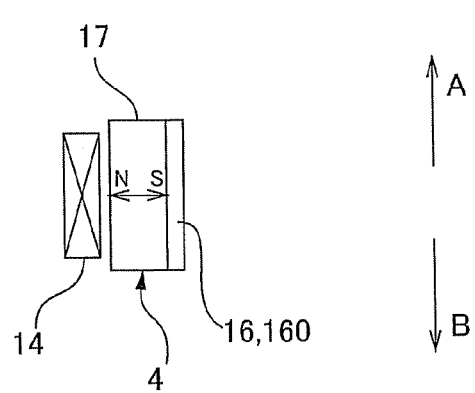

[Fig.29]
(a)
[Fig.29]
(b)
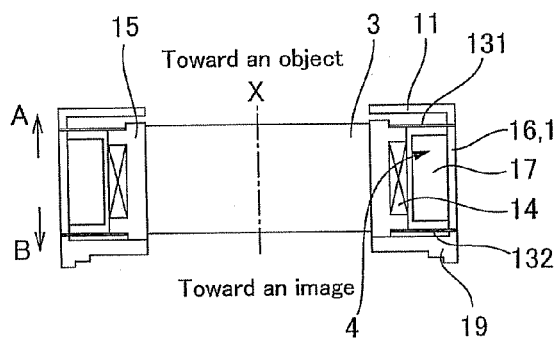
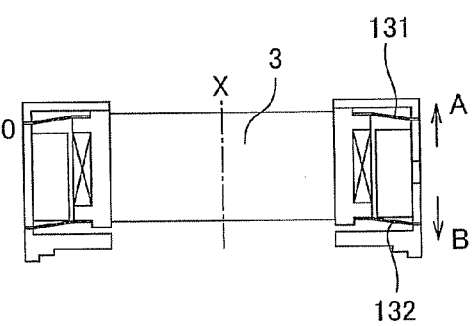

[Fig.30] (a)
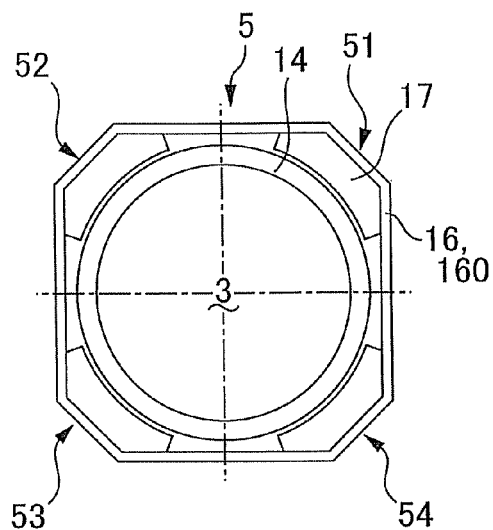
[Fig.30] (b)
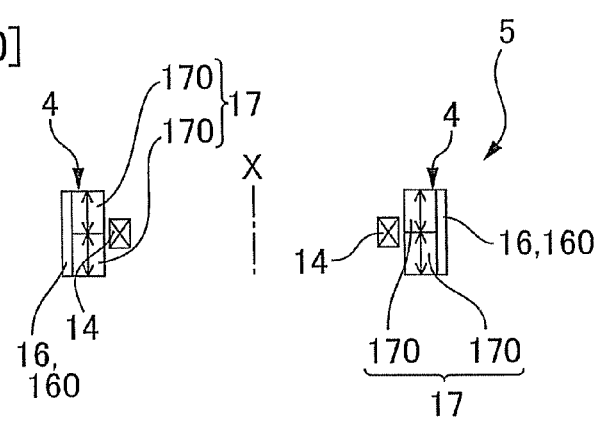
[Fig.30] (c)
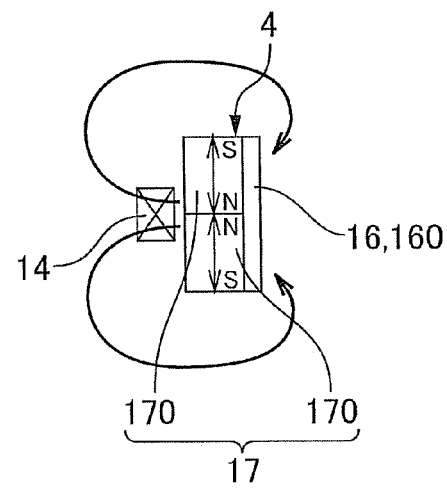

[Fig.31]
(a)
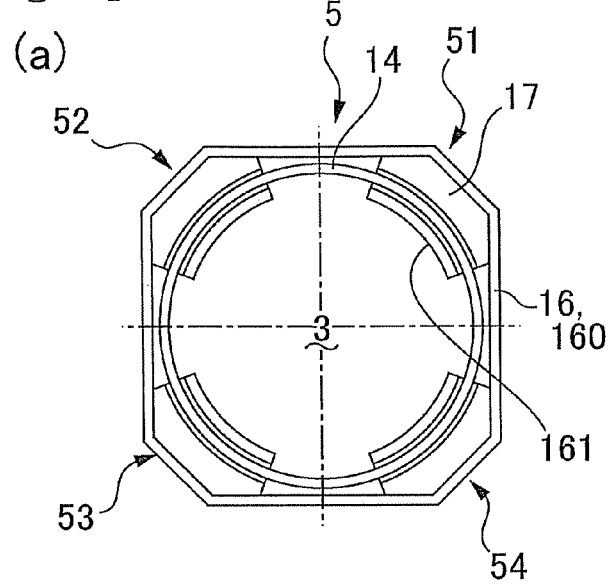
[Fig.31]
(b)
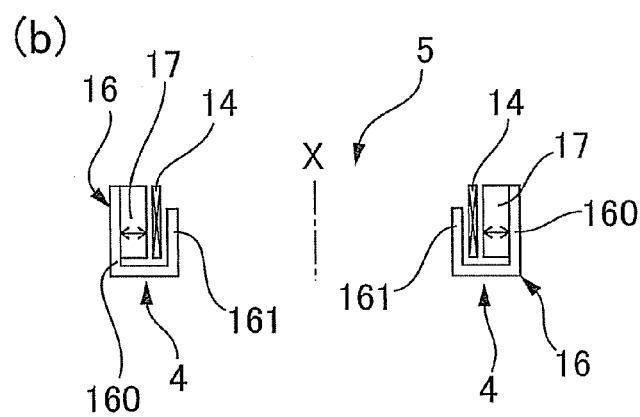
[Fig.31]
(c)
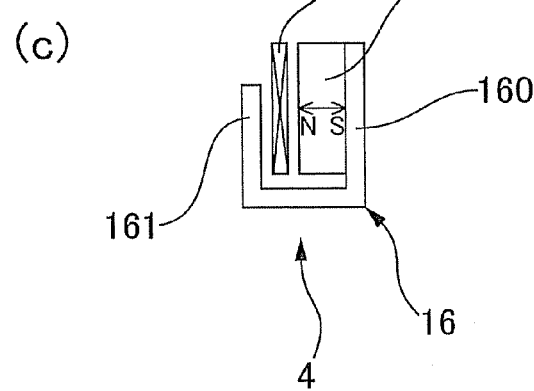

[Fig.32]
(a)
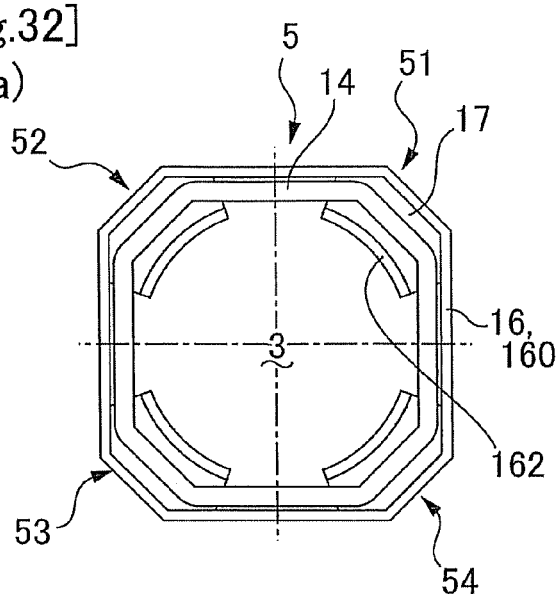
[Fig.32]
(b)
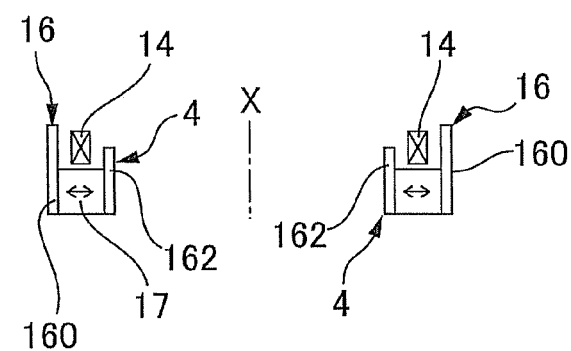
[Fig.32]
(c)
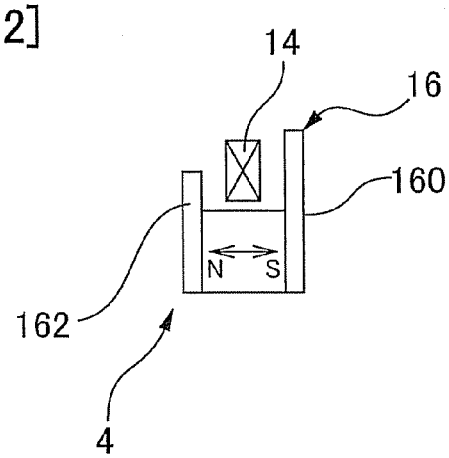

[Fig.33]
(a)
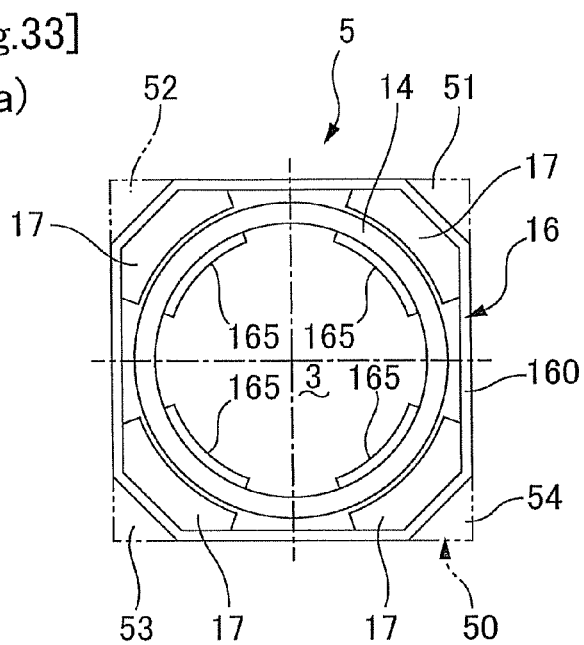
[Fig.33]
(b)
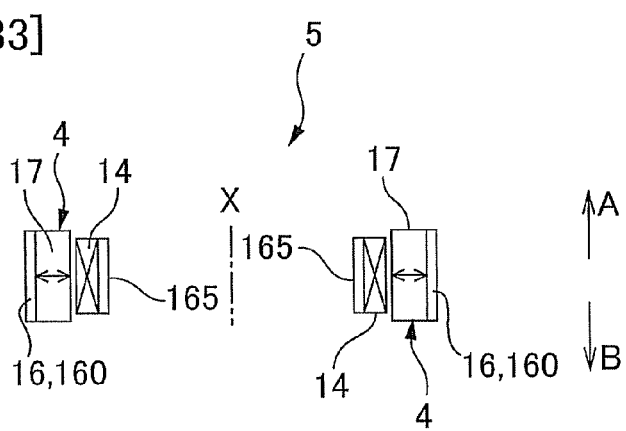
[Fig.33]
(c)
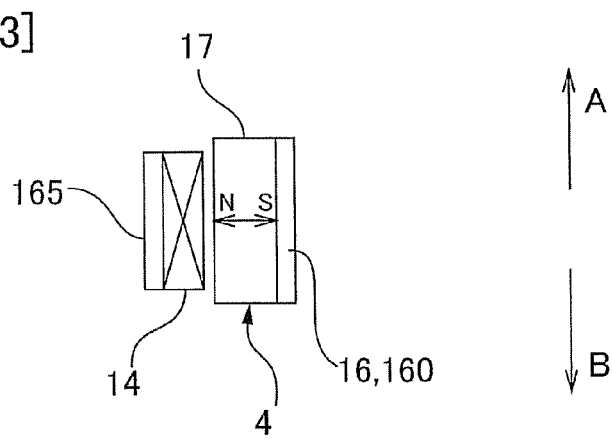

[Fig.34]
(a)
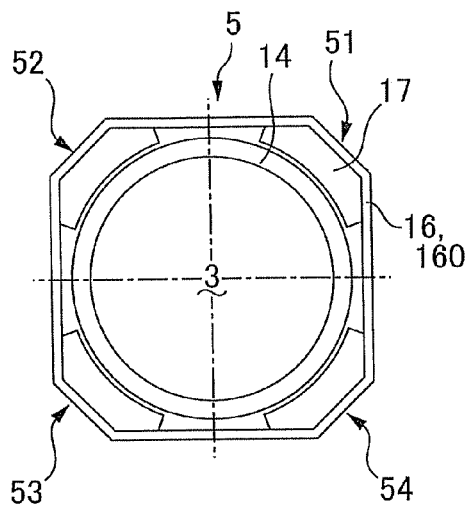
[Fig.34]
(b)
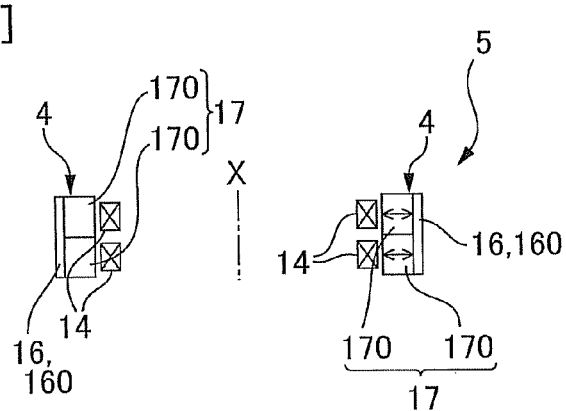
[Fig.34]
(c)
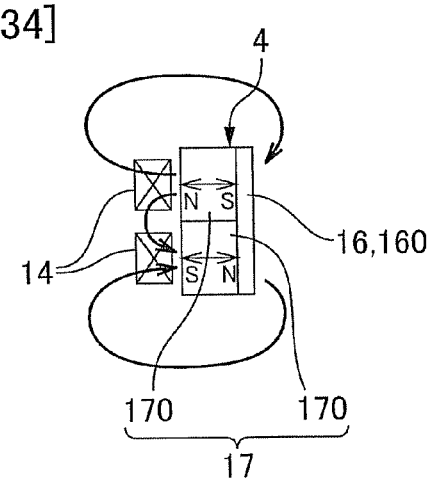
[Fig.34]
(d)
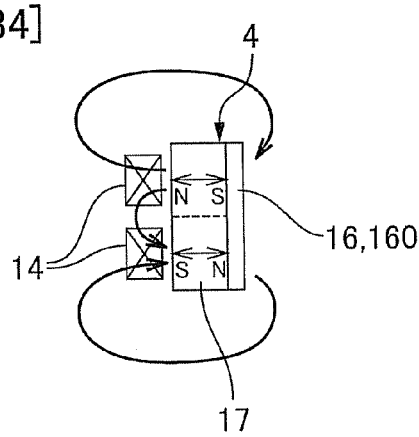

[Fig.35]
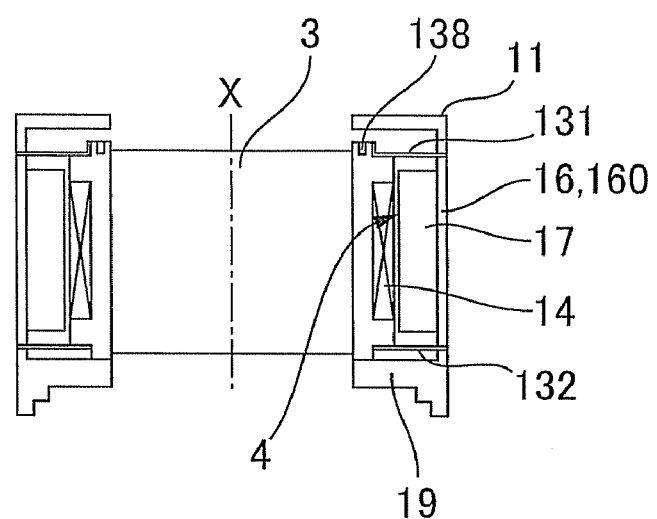

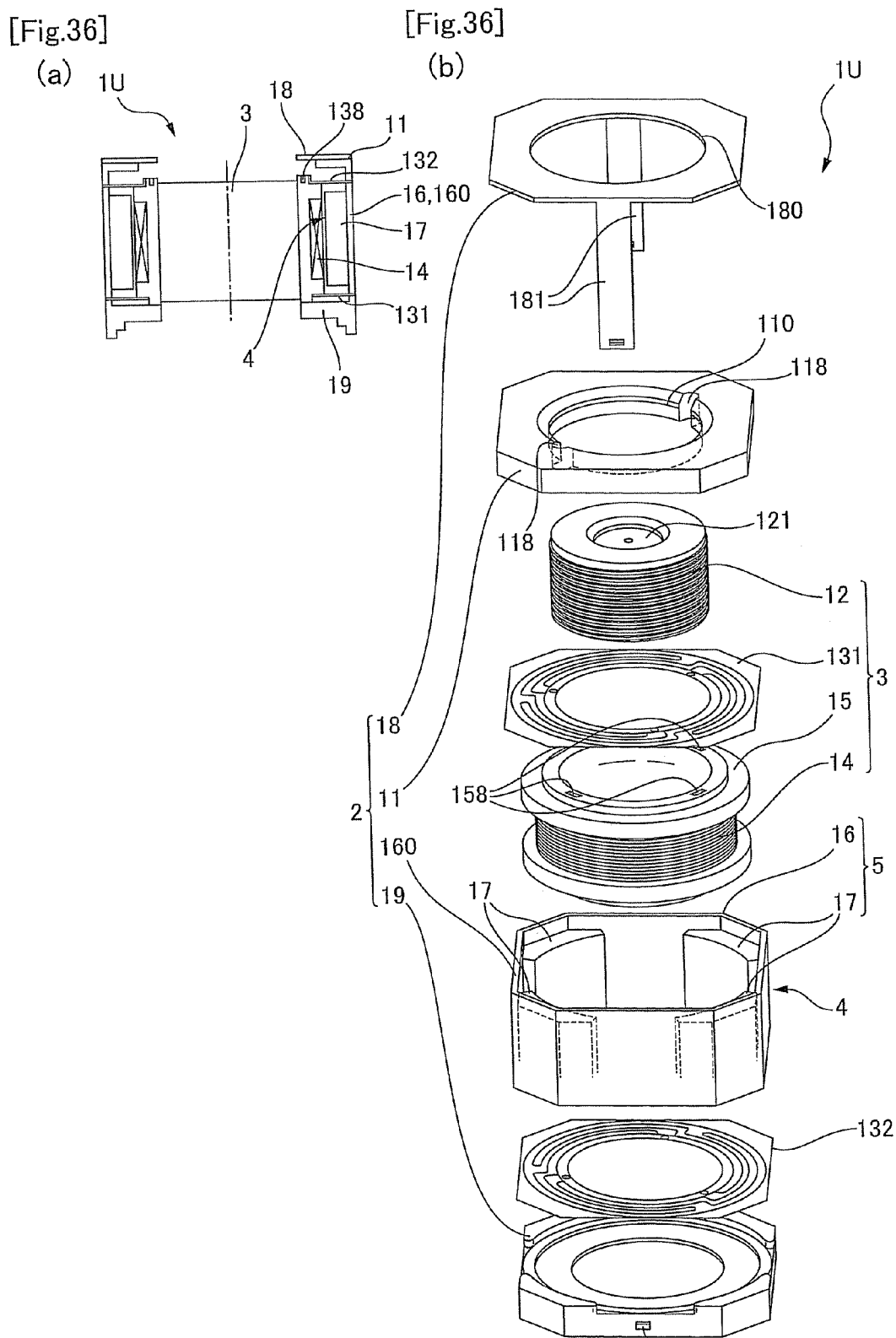

LENS DRIVING APPARATUS

CROSS REFERENCE TO RELATED APPLICATIONS

This is a U.S. national stage of application No. PCT/JP2006/317264, filed on Aug. 31, 2006. Priority under 35 U.S.C. §119(a) and 35 U.S.C. §365(b) is claimed from Japanese Application No. 2005-255040, filed Sep. 2, 2005; Japanese Patent Application No. 2005-314565, filed Oct. 28, 2005; Japanese Application No. 2006-048497, filed Feb. 24, 2006; and Japanese Application No. 2006-078343, filed Mar. 22, 2006, the disclosures of which are also incorporated herein by reference.

TECHNICAL FIELD OF THE INVENTION

The present invention relates to a lens driving apparatus which drives lenses to be displaced in the optical axis direction to form an image of the photographic subject.

TECHNICAL BACKGROUND OF THE INVENTION

A wide spread availability of camera phones having a camera function in recent years has increased the opportunities for users to photograph various kinds of photographic subjects. For example, a photographic subject at a distance from the camera lens, such as a friend or scenery, is photographed (normal snapshot) or a photographic subject at a close distance from the camera lens, such as a bus time schedule or flower petals, is photographed (close-up photography).

For close-up photography (macro photography), the camera lens needs to be positioned slightly closer to the photographic subject than for a normal snap shot. Therefore, a photographing lens system of this kind is equipped with a drive mechanism that drives the lens to be displaced in the optical axis direction; by switching a switch, the drive mechanism is driven to move the lens in the optical axis direction (see Patent Reference 1, for example).

The lens driving apparatus disclosed in Patent Reference 1 comprises a movable body having lenses and a fixed body that moves the movable body in the lens optical axis direction while holding the movable body; a drive magnet is arranged to the movable body and a coil and two magnetic pieces (yokes) are arranged to the fixed body. When electrification to the coil is stopped, the magnetic adsorption between the drive magnet and the magnetic pieces is used to retain the movable body at a position of one of the above-mentioned magnetic pieces to which the movable body is closer. Therefore, this type of lens driving apparatus has a simple configuration and requires fewer components, which is suitable to downsizing.

[Patent reference 1] Japanese Unexamined Patent Application (Tokkai) NO. 2005-37865

However, the lens driving apparatus disclosed in the above mentioned Patent Reference 1 has a problem that there are only two points to determine the position of the movable body (that is, the lens position), making it difficult to determine the middle position of the lens.

In other words, as described above, the movable body holding lenses is to be retained at a position of one of the two magnetic pieces to which the movable body is closer; therefore, it is difficult to position the lenses in desired positions between the lens position for close-up photography and the lens position for a normal snapshot. If it is difficult to position the lenses in desired positions, a further improvement of the focusing function cannot be expected as a result.

For example, one sometimes takes a picture of himself (self photography) using a camera phone. That is, the distance between the camera lens and a photographic subject is not too far, compared to the photographing of friends or scenery, but not too close, either, compared to the photographing of a bus time schedule or flower petals. In this case, a conventional camera phone uses the lens position for a normal snapshot (which means that the lens position for a normal snapshot is alternatively used); however, it is still desired to position the lenses in desired positions between the lens position for a normal snapshot and the lens position for close-up photography in order to obtain a focused, crisp image.

At least an embodiment of the present invention is devised considering the above problems; at least an embodiment of the present invention provides a lens driving apparatus that can position the lenses in desired positions so that the focusing function can be improved.

At least an embodiment of the present invention presents a lens driving apparatus that comprises a movable body holding lenses, a fixed body in which the movable body is mounted movable along the lens optical axis, and a drive mechanism that moves the movable body in the lens optical axis direction; wherein the drive mechanism is equipped with a coil that is held in either the movable body or the fixed body, a magnet held in the other body, and a regulatory means that regulates the movement of the movable body which is induced by an electromagnetic force generated when current is passed through the coil.

In at least an embodiment of the present invention, the drive mechanism is equipped with a coil that is held in either the movable body or the fixed body, a magnet held in the other body, and a regulatory means that regulates the movement of the movable body which is induced by an electromagnetic force produced when current is passed through to the coil. Therefore, the movable body can be retained in the desired position.

In other words, when the current is passed through the coil under the condition in which a magnetic flux emanated from a magnet is interlinked with the coil, an electromagnetic force is produced. Then, when the coil is arranged in the movable body, an electromagnetic force itself is exerted on the movable body and the movable body starts moving in the lens optical axis direction. Also, when the coil is arranged in the fixed body, a force reactive to the electromagnetic force is exerted on the movable body and then the movable body starts moving in the lens optical axis direction. At that time, a force to prevent the movement of the movable body is produced by the above-mentioned regulatory means; when the force to move the movable body and the force to regulate the movement of the movable body attains equilibrium, the movable body is halted. Thus, the movable body can be halted in the desired position by adjusting the amount of current flowing in the coil and the force that the regulatory means exerts on the movable body.

In this manner, the lenses can be positioned in desired positions between the lens position for close-up photography and the lens position for a normal snapshot; a crisp image can be obtained even for self-photography, for example, and the focusing function of the lens driving apparatus can be improved. Also, the lens driving apparatus can be made thinner.

The "regulatory means" here is a means to produce a force in the direction opposite from the moving direction of the movable body. It is preferred that the magnitude of the force be varied depending to the moving distance of the movable body. For example, a resilient member such as a flat spring, a coil spring, a magnetic spring or a rubber may be used as the regulatory means; or the N pole (S pole) magnet is placed on the fixed body and the N pole (S pole) magnet is placed on the movable body to generate a magnetic repulsive force, which can be used as a regulatory means. Any such device can be used for the regulatory means.

Also, "when an electromagnetic force is produced" does not mean to eliminate "when an electromagnetic force is not generated". In other words, the above mentioned "regulatory means" can regulate the movement of the movable body by using a resilient force even when current is not passed through the coil and an electromagnetic force is not generated.

In at least an embodiment of the present invention, the regulatory means can use a resilient member that urges the movable body in the lens optical axis direction. According to at least an embodiment of the present invention, a resilient member that urges the above mentioned movable body in the lens optical axis direction; therefore, the linearity between the moving distance of the movable body and the current flowing in the coil can be improved. In other words, since a resilient member such as a flat spring has an established linear relationship between the resilience (stress) and the amount of displacement, a resilient member used as the regulatory means can contribute to the improvement of the above mentioned linearity.

In at least an embodiment of the present invention, the resilient member is composed of a first resilient member and a second resilient member that are able to urge the movable body in the lens optical axis direction. According to at least an embodiment of the present invention, the above mentioned resilient member is composed of two resilient members: one urges the movable body in one direction in the lens optical axis direction; the other urges the movable body in the opposite direction in the lens optical axis direction. In this way, the force to prevent the movement of the movable body can be intensified. Therefore, when the movable body is halted in a predetermined position, the force to move the movable body and the force to prevent the movement of the movable body both intensify so that the movable body can be halted in the position with more stability. For example, even when a cell phone is swung around and another kind of force such as a centrifugal force is exerted in the lens optical axis direction, the movable body can be halted with stability. By using two resilient members to compose the resilient member, the bad effect of another force such as a centrifugal force is relatively reduced; therefore, the above mentioned linearity can be further improved. Note that, by using two resilient members, the resilient members are kept from deterioration over the time, compared to using a single resilient member.

In at least an embodiment of the present invention, it is preferred that the first and second resilient members be metallic resilient members that electrify the coil. According to at least an embodiment of the present invention, the metallic resilient members that electrify the coil are used for the first and second resilient members; therefore, the first and second resilient members can be used as a wire for electrifying the coil. In this manner, the design of an electrical circuit (circuit wiring) of the lens driving apparatus can be simplified, contributing to downsizing the lens driving apparatus overall.

In at least an embodiment of the present invention, the coil is arranged to be opposed to the magnet in the lens optical axis direction.

In this case, it is preferred that the coil be arranged in multiple so that the magnet is interposed between the coils in the lens optical axis direction. According to at least an embodiment of the present invention, the coil is arranged in multiple (two coils, for example) so that the magnet is interposed between the coils in the lens optical axis direction; therefore, the magnetic flux emanated from the magnet in one direction in the lens optical axis direction and the magnetic flux emanated from the magnet in the opposite direction in the lens optical axis direction can be converted to an electromagnetic force by the multiple coils. Therefore, a thrust force can be effectively produced in the movable body, which in turn efficiently halts the movable body in the desired position.

In at least an embodiment of the present invention, when the coil is arranged to be opposed to the magnet in the lens optical axis direction, the magnet may be arranged in multiple so that the coil is interposed between the magnets in the lens optical axis direction. According to at least an embodiment of the present invention, the above mentioned magnet is arranged in multiple (two magnets, for example) so that the coil is interposed between the magnets in the coil can be intensified, compared to a method using a single magnet and the lens optical axis direction; therefore, the density of the magnetic flux around multiple coils is intensified; even if the number of coils to produce a thrust force is reduced to one, a thrust force at the same level can be produced, and the form of the magnetic circuit can be flat. Thus, the lens driving apparatus can be made thinner or smaller; in addition, the movable body can be halted in the desired position. Also, when only one coil is interposed between the magnets, a connecting wire between the coils is not necessary, thus improving operability.

In at least an embodiment of the present invention, when the coil is arranged to be opposed to the magnet in the lens optical axis direction, the magnet may be arranged singly to be opposed to the coil in the lens optical axis direction. According to at least an embodiment of the present invention, the above mentioned magnet is arranged singly to be opposed to the coil in the lens optical axis direction; therefore, only one coil is opposed to the magnet, that is, a combination of one magnet and one coil may be used to make a thinner or smaller lens driving apparatus.

In at least an embodiment of the present invention, it is preferred that the lens driving apparatus further comprise a yoke that changes the direction of the magnetic flux emanated from the magnet, the yoke be formed such that its length in the lens optical axis is longer than at least the opposing surface-to-surface distance between the coil(s) and/or the magnet(s), and also arranged in the movable body and/or said fixed body. According to at least an embodiment of the present invention, a yoke having the length in the lens optical axis direction longer than at least the opposing surface-to-surface distance between the coil(s) and/or the magnet(s) is arranged to either movable body or the fixed body or to both bodies (when two coils are used, it is the distance between the opposing surfaces of the coils in the optical axis direction; when two magnets are used, it is the distance between the opposing surfaces of the magnets in the optical axis direction; when one coil and one magnet are used, it is the distance between the opposing surfaces of the coil and the magnet in the optical axis direction); therefore, magnetic flux leaking from the magnetic path between the magnet and coil can be reduced, which in turn further improves the linearity between the moving distance of the movable body and the current flowing in the coil.

In this case, it is preferred that the magnet and the yoke be held in the other body (either the movable body or the fixed body, whichever holds the magnet). According to at least an embodiment of the present invention, the above mentioned magnet and yoke are both arranged in one of the bodies; therefore, the relative positional relationship between the magnet and the yoke is constant, and so the bad effect caused by an attraction force between the magnet and the yoke can be prevented. In other words, since the yoke is a magnetic material, the yoke is magnetized when the magnet is near, and then a magnetic attraction force exists between the two members in the radial direction. If the relative positional relationship between the magnet and the yoke is changed under such a condition, when the movable body on which the magnet is arranged is moved in the optical axis direction with respect to the fixed body to which the yoke is arranged, for example, the lens driving apparatus is badly affected by the attraction force. Also, if the magnet and the yoke are both arranged in the movable body or in the fixed body as in at least an embodiment of the present invention, both members move together or neither member moves; therefore, the relative positional relationship between the members can be constant, thus preventing the bad effect which may be caused by a magnetic attraction force between the magnet and the yoke.

In at least an embodiment of the present invention, it is preferred that the drive mechanism be equipped with a magnetic member which is held in the body and is magnetically attracted to the magnet. With this configuration, a magnetic attraction force exists between the magnetic member and the magnet. Therefore, while an electromagnetic force of the coil and a regulating force of the regulatory means attain equilibrium so that the movable body can be halted in an appropriate position for macro photography, the magnetic attraction between the magnetic member and the magnet can be used to retain the movable body for a normal snapshot (or when a camera is not in use). In particular, in at least an embodiment of the present invention, the movable body is retained not by the urging force of a spring, but by a highly stable magnetic attraction force, unlike the above mentioned conventional lens driving apparatus. Therefore, inaccuracy of the static position of the movable body can be prevented and the accuracy will be more stable. Note that the manufacturing of a spring that retains the movable body is not necessary, thus contributing to reduced cost in manufacturing. Also, the "magnetic member" in at least an embodiment of the present invention can be any substance as long as a magnetic attraction force can be created with the magnet to some extent. For example, even if a member is generally known for non-magnetic characteristics, it would be "a magnetic member" if it generates even a small force of magnetic attraction with the magnet. Also, the "magnetic member" can be of any form, type, and size.

In at least an embodiment of the present invention, it is preferred that the magnetic member be formed in a circular shape and arranged coaxially with the lens optical axis. According to at least an embodiment of the present invention, the above mentioned magnetic member is formed in a circular shape and arranged coaxially with the lens optical axis; therefore, a magnetic attraction force can be produced with the magnet with better stability, and the accuracy in the static position of the movable body can be more stabilized. In other words, when small pieces of the magnetic member are equidistantly arranged along the coil in the circumferential direction, a magnetic attraction between the coil and the magnet can be uneven depending on the distance between the pieces, and the accurate static position of the movable body cannot be obtained with stability. However, according to at least an embodiment of the present invention, a magnetic member formed in a circular shape is arranged coaxially with the lens optical axis; therefore, an uneven magnetic attraction force with the magnet will not be caused but an even magnetic attraction force is produced anywhere around the coil in the circumferential direction. This stabilizes accuracy in the static position of the movable body even more.

In at least an embodiment of the present invention, the above mentioned magnetic member may be in the form of a ball, wire or bar. In this case, it is preferred that the magnetic member be adjustable in the number to be mounted and in size. With this configuration, the number of the magnets to be mounted and the size are so optimized that the inclination of the movable body can be corrected.

In at least an embodiment of the present invention, it is preferred that the magnet be held in the fixed body, and the magnetic member be held in the movable body at a position at which the magnetic member is closer to the photographic subject than the magnet is. According to at least an embodiment of the present invention, the magnetic member is closer to the photographic subject than the magnet is; therefore, the movable body is attracted in the opposite direction from the direction it moves when used for macro photography. For this reason, the movable body can be retained by a magnetic attraction force produced between the magnetic member and the magnet during a normal snapshot (or when the camera is not in use), providing a more stable accuracy in the static position of the movable body.

In at least an embodiment of the present invention, the resilient member may be composed of a member that is to be magnetically attracted to the magnet. In this case, the resilient member used as a regulating member produces a magnetic attraction with the magnet. Therefore, the movable body can be retained not by using the urging force of the spring but by using a highly stable magnetic attraction. This prevents inaccuracy of the static position of the movable body, stabilizing the accuracy in the static position of the movable body.

In at least an embodiment of the present invention, when the first resilient member and the second resilient member are used as the regulatory means, either the first resilient member or the second resilient member is composed of a member that is to be magnetically attracted to the magnet. With this configuration, a magnetic attraction is caused between the first resilient member and the magnet, for example. Therefore, either the first resilient member or the second resilient member which is on the photographic subject side (for example, the first resilient member) is attracted to the magnet so that the movable body can be retained by using a highly stable magnetic attraction during a normal snapshot (or when the camera is not in use), thus stabilizing accuracy in the static position of the movable body.

In at least an embodiment of the present invention, the coil is held on the outer circumference of the movable body.

In this case, it is preferred that the coil be directly wound around the movable body. With this configuration, the space occupied by the coil can be reduced, compared to the configuration using a bobbin. Also, when the space occupied by the coil is kept as it is, the number of windings of the coil can be increased.

In at least an embodiment of the present invention, when the coil is held on the outer periphery of the movable body, it is preferred that the fixed body have a cover portion that surrounds the movable body and the magnet, and the magnet be arranged along the inner periphery of the cover portion. According to at least an embodiment of the present invention, the magnet is shaped along the inner periphery of the cover portion; therefore, the space between the inner peripheral surface of the cover portion and the outer circumferential surface of the coil can be utilized as a space for positioning the magnet, thus reducing dead space. Also, since the magnet can be efficiently filled between the inner peripheral surface of the cover portion and the outer circumferential surface of the coil, a magnet of a larger mass can be used, which helps produce a magnetic field that is interlinked with the coil efficiently.

In at least an embodiment of the present invention, the cover portion in a non-circular inner peripheral shape surrounds the movable body and the magnet.

In at least an embodiment of the present invention, it is preferred that the inner peripheral shape of the cover portion and the outer circumferential shape of the coil be different from each other when viewed in the optical axis direction.

In at least an embodiment of the present invention, it is preferred that the plane shape of the regulatory means agree with the plane shape of the cover portion.

In at least an embodiment of the present invention, it is preferred that multiple magnets be equidistantly arranged in multiple positions in the circumferential direction. With this configuration, the magnets can be efficiently filled in the space between the inner peripheral surface of the cover portion and the outer circumferential surface of the coil; therefore, a magnet of a large mass can be used, which in turn helps produce efficiently a magnetic field which is interlinked with the coil.

In at least an embodiment of the present invention, it is preferred that the coil be wound annularly, and when the inner peripheral shape of the cover portion is polygonal, the magnet be arranged at a position which includes at least one of the multiple corners in the inner peripheral shape of the cover portion.

In at least an embodiment of the present invention, it is preferred that the coil be wound annularly, and when the inner circumferential shape of the cover portion is square or polygonal in which the corner portions of square are chamfered, the magnets be arranged in the corner portions of the square.

In at least an embodiment of the present invention, it is preferred that the magnet be positioned with the corner portion of the cover portion. With this configuration, there is no need to provide a jig for positioning the magnet at the cover portion, increasing efficiency in operation.

In at least an embodiment of the present invention, it is preferred that the cover portion be a tube-like body portion of a back yoke, and the magnet is adhered on the inner peripheral surface of the tube-like body portion of the back yoke.

In at least an embodiment of the present invention, it is preferred that the fixed body is composed of a base, which is placed on the tube-like body portion of the back yoke on the image pickup device side in the optical axis direction, and a case, which is placed on the tube-like body portion of the back yoke on the photographic subject side and the back yoke, the base, and the case have the identical outer peripheral shape when viewed from the optical axis direction.

In at least an embodiment of the present invention, it is preferred that the back yoke have an inner yoke which extends from the tube-like body portion to the inner side of the coil. With this configuration, the density of a magnetic flux that is interlinked with the coil can be intensified.

In at least an embodiment of the present invention, it is preferred that a coil yoke be arranged on the other side of the coil from the side on which said magnet is arranged. With this configuration, the density of a magnetic flux that is interlinked with the coil can be intensified.

In at least an embodiment of the present invention, the magnet can be positioned on the outer circumference side of the coil and can also be positioned on one side of the coil in the optical axis direction. However, it is preferred that the magnet be positioned on the outer circumference side of the coil from the view point of making a thinner lens driving apparatus.

In this case, it is preferred that the magnet be arranged such that the inner face thereof extends along the outer circumference of the coil.

In at least an embodiment of the present invention, when the magnet is positioned on the outer circumference side of the coil, the magnet may be magnetized to unlike poles in the inside-outside direction.

In at least an embodiment of the present invention, the magnet may be composed of two magnet pieces, each of which is magnetized to unlike poles in the optical axis direction, and the two magnet pieces may be layered in the optical axis direction such that like poles make contact with each other. With this configuration, magnetic lines of force are intensely produced in the vicinity of the layered portion of the two magnet pieces; therefore, a magnetic field that is interlinked with the coil can be efficiently produced.

In at least an embodiment of the present invention, it is preferred that the magnet be composed of multiple magnet pieces which are layered in the optical axis direction, the coil be arranged in multiple in the optical axis direction to be opposed to each of the multiple magnetic pieces, and each of the multiple magnet pieces be magnetized to unlike poles in the inside-outside direction and the magnetizing directions in the magnetic pieces, which are adjacent to each other in the optical axis direction, be opposite from one another in the inside-outside direction. With this configuration, the density of the magnetic flux that is interlinked with the coil can be intensified.

In at least an embodiment of the present invention, it is preferred that the magnet have a plurality of divided magnetized areas along the optical axis direction, the coil be arranged in multiple in the optical axis direction to be opposed to each of the plurality of divided magnetized areas, each of the plurality of divided magnetized areas be magnetized to unlike poles in the inside-outside direction, and the magnetizing directions in the magnetized areas, which are adjacent to each other in the optical axis direction, be opposite from one another in the inside-outside direction. With this configuration, the density of the magnetic flux that is interlinked with the coil can be intensified.

In at least an embodiment of the present invention, it is preferred that the fixed body have a plate-like cover that is placed on the case on the photographic subject side. With this configuration, foreign matter such as particles are prevented from coming into the lens driving apparatus.

In at least an embodiment of the present invention, it is preferred that the plate-like cover have engaging leg portions which are to be engaged with the other member configuring the fixed body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a perspective disassembly drawing of a lens driving apparatus to which at least an embodiment of the present invention is applied.

FIGS. 2(a) and 2(b) are respectively a cross-sectional view of a major portion of the lens driving apparatus illustrated in FIG. 1, taken along the lens optical axis, and a plane cross-sectional view of the lens driving apparatus, taken along the Y1-Y1' line.

FIGS. 3(a), 3(b), 3(c), and 3(d) are explanatory illustrations showing how a movable body is halted in the desired position in the lens driving apparatus illustrated in FIG. 1.

FIG. 4 is an explanatory illustration showing a mechanical configuration of a lens driving apparatus of the Modification Example 1 of Embodiment 1 of the present invention.

FIGS. 5(a) and 5(b) are explanatory illustrations showing a mechanical configuration of a lens driving apparatus of the Modification Example 2 of Embodiment 1 of the present invention.

FIGS. 6(a) and 6(b) are explanatory illustrations showing a mechanical configuration of a lens driving apparatus of the Modification Example 3 of Embodiment 1 of the present invention.

FIG. 7 is a perspective disassembly drawing of a lens driving apparatus of the Modification Example 4 of Embodiment 1 of the present invention.

FIGS. 8(a) and 8(b) are respectively a cross-sectional view of a major portion of the lens driving apparatus illustrated in FIG. 7, taken along the lens optical axis, and a plan cross-sectional view of the lens driving apparatus, taken along the Y2-Y2' line.

FIGS. 9(a), 9(b), 9(c), and 9(d) are explanatory illustrations showing how a sleeve is halted in the desired position in the lens driving apparatus illustrated in FIG. 7.

FIG. 10 is an explanatory illustration showing a mechanical configuration of a lens driving apparatus of the Modification Example 5 of Embodiment 1 of the present invention.

FIGS. 11(a) and 11(b) are explanatory illustrations showing a mechanical configuration of a lens driving apparatus of the Modification Example 6 of Embodiment 1 of the present invention.

FIG. 12 is an explanatory illustration showing a mechanical configuration of a lens driving apparatus of the Modification Example 7 of Embodiment 1 of the present invention.

FIGS. 13(a) and 13(b) explanatory illustration showing a mechanical configuration of a lens driving apparatus of the Modification Example 8 of Embodiment 1 of the present invention.

FIG. 14 is a perspective disassembly drawing of a lens driving apparatus of Embodiment 2 of the present invention.

FIGS. 15(a) and 15(b) are respectively a cross-sectional view of a major portion of the lens driving apparatus illustrated in FIG. 14, taken along the lens optical axis, and a plan cross-sectional view of the lens driving apparatus, taken along the Y3-Y3' line.

FIGS. 16(a) and 16(b) are explanatory illustrations showing how the sleeve is halted in the desired position in the lens driving apparatus illustrated in FIG. 14.

FIG. 17 is an explanatory illustration showing a mechanical configuration of a lens driving apparatus of Embodiment 3 of the present invention.

FIGS. 18(a) and 18(b) are the illustrations showing the mechanical configurations in the Modification Examples of Embodiments 2 and 3 of the present invention.

FIG. 19 is the exterior appearance view showing the exterior configuration of a lens driving apparatus of Embodiment 4 of the present invention.

FIGS. 20(a), 20(b), and 20(c) are respectively a cross-sectional view of the lens driving apparatus illustrated in FIG. 19, taken along the direction of the lens optical axis, X, a cross sectional view taken along the Y5-Y5' line, and a cross sectional view taken along the Y6-Y6' line.

FIGS. 21(a) and 22(b) are explanatory illustrations showing the effects of the lens driving apparatus of Embodiment 4 of the present invention.

FIG. 22 is a plane cross-sectional view of a mechanical configuration of the lens driving apparatus of the Modification example 2 of Embodiment 4 of the present invention.

FIG. 23 is a plane cross-sectional view of a mechanical configuration of the lens driving apparatus of the Modification example 3 of Embodiment 4 of the present invention.

FIG. 24 is a plane cross-sectional view of a mechanical configuration of the lens driving apparatus of the Modification example 4 of Embodiment 4 of the present invention.

FIGS. 26(a) and 26(b) are respectively an exterior appearance view and a perspective disassembly drawing of a lens driving apparatus of Embodiment 5 of the present invention.

FIG. 27 is a cross-sectional view of the lens driving apparatus illustrated in FIG. 26, taken along the lens optical axis.

FIGS. 28(a), 28(b), and 28(c) are respectively a plan view and a vertical cross-sectional view of a magnetic circuit used in a drive mechanism of the lens driving apparatus illustrated in FIG. 26 and an explanatory illustration of the magnet.

FIGS. 29(a) and 29(b) are explanatory illustrations showing the lens driving operation of the lens driving apparatus of FIG. 26.

FIGS. 30(a), 30(b), and 30(c) are respectively a plan view and a vertical cross-sectional view of a magnetic circuit used in the drive mechanism of the lens driving apparatus of the Modification Example 1 of Embodiment 5 of the present invention and an explanatory illustration of the magnet.

FIGS. 31(a), 31(b), and 31(c) are respectively a plan view and a vertical cross-sectional view of a magnetic circuit used in the drive mechanism of the lens driving apparatus of the Modification example 2 of Embodiment 5 of the present invention and an explanatory illustration of the magnet.

FIGS. 32(a), 32(b), and 32(c) are respectively a plan view and a vertical cross-sectional view of a magnetic circuit used in the drive mechanism of the lens driving apparatus of the Modification Example 3 of Embodiment 5 of the present invention and an explanatory illustration of the magnet.

FIGS. 33(a), 33(b), and 33(c) are respectively a plan view and a vertical cross-sectional view of a magnetic circuit used in the drive mechanism of the lens driving apparatus of the Modification Example 4 of Embodiment 5 of the present invention and an explanatory illustration of the coil yoke.

FIGS. 34(a), 34(b), 34(c), and 34(d) are respectively a plan view and a vertical cross-sectional view of a magnetic circuit used in the drive mechanism of the lens driving apparatus of the Modification Example 5 of Embodiment 5 of the present invention and the explanatory illustrations of the magnet and its modification.

FIG. 35 is an explanatory illustration of a magnetic member used in a lens driving apparatus of the Modification Example 6 of Embodiment 5 of the present invention.

FIGS. 36(a) and 36(b) are respectively an exterior appearance view and a perspective disassembly drawing of a lens driving apparatus of the Modification Example 7 of Embodiment 5 of the present invention.

DETAILED DESCRIPTION OF THE PREFERRED EMBODIMENTS

Figure 25A:
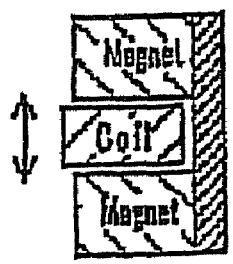
FIGS. 25(a)-25(z) are pattern diagrams to show the arrangement pattern of the coil, the magnet and the yoke in the lens driving apparatus of Embodiments 1 through 4 of the present invention.
Figure 25B:
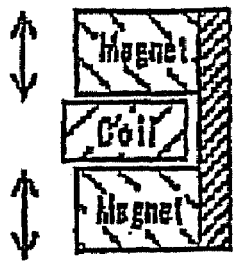
Figure 25C:
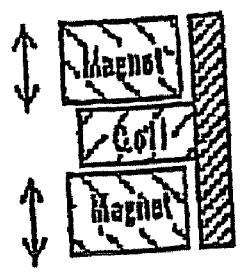
Figure 25D:
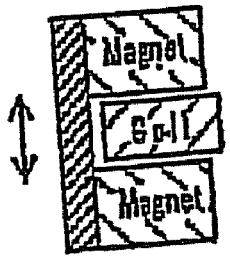
Figure 25E:
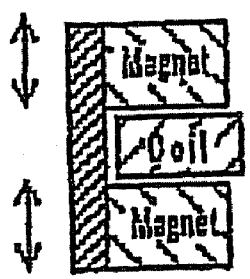
Figure 25F:
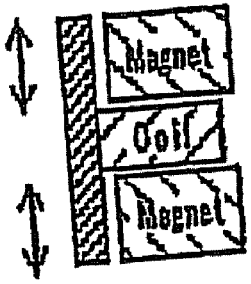
Figure 25G:
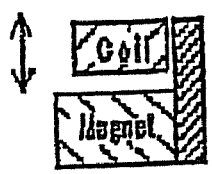
Figure 25H:
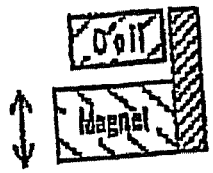
Figure 25I:
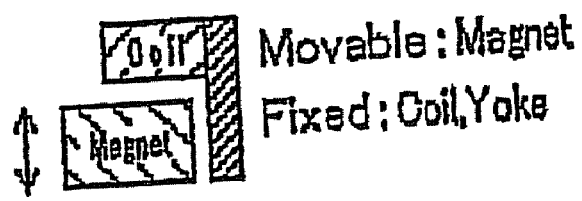
Figure 25J:
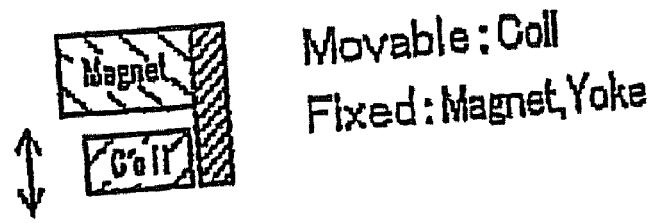
Figure 25K:
Figure 25L:
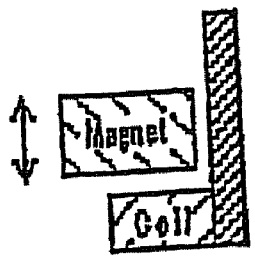
Figure 25M:
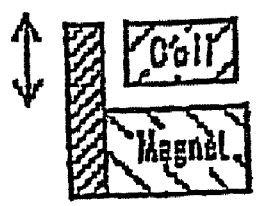
Figure 25N:
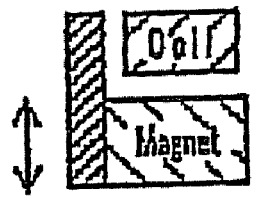
Figure 25O:
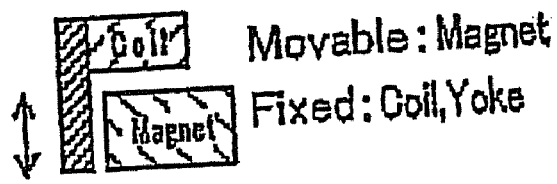
Figure 25P:
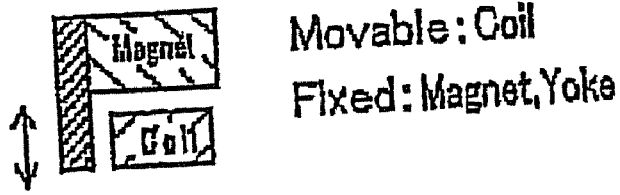
Figure 25Q:
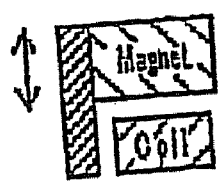
Figure 25R:
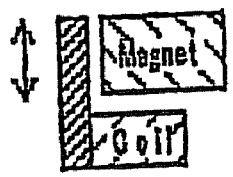
Figure 25S:
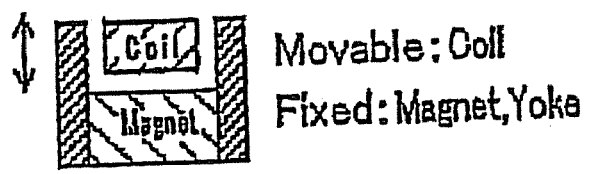
Figure 25T:
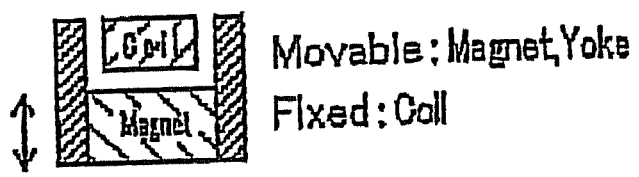
Figure 25U:
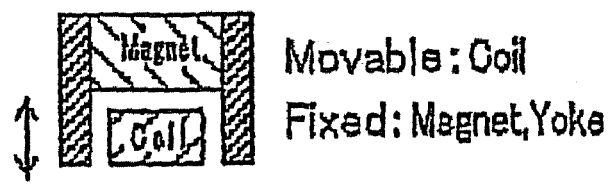
Figure 25V:
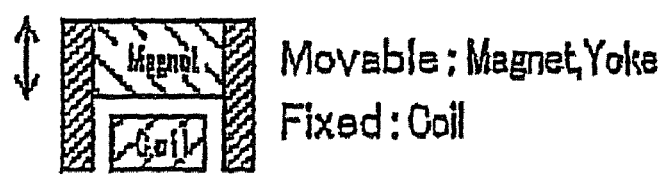
Figure 25W:
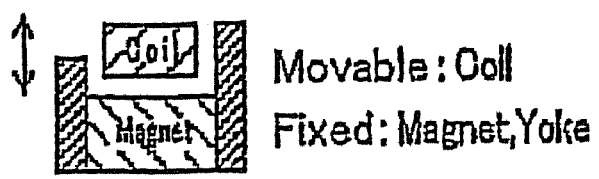
Figure 25X:
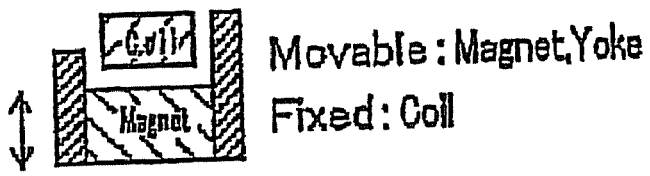
Figure 25Y:

A lens driving apparatus to which at least an embodiment of the present invention is applied is described hereinafter referring to the drawings. Note that the lens driving apparatus which is described hereinafter can be installed not only in camera phones, but also in various electronic machines. For example, it can be used in PHSs, PDAs, barcode readers, thin digital cameras, surveillance cameras, cameras for checking behind vehicles, or doors having an optical verification function.

Embodiment 1

(Overall Configuration)

FIG. 1 is a perspective disassembly drawing of a lens driving apparatus to which at least an embodiment of the present invention is applied. FIGS. 2 (a) and 2(b) are respectively a cross-sectional view of a major portion of the lens driving apparatus illustrated in FIG. 1, taken along the lens optical axis, and a plane cross-sectional view of the lens driving apparatus taken along the Y1-Y1' line.

FIG. 1 and FIG. 2 (a) shows the lens driving apparatus 1 of this embodiment which is used in a thin camera such as a digital camera or a camera phone for moving three lenses 121, 122, and 123 in both the A direction (to the front) and the B direction (to the back) along the lens optical axis X, the A direction in which the lenses are moved toward a photographic subject (toward an object) and the B direction in which the lenses are moved in the opposite direction from the photographic subject (toward an image). The lens driving apparatus 1 has a movable body 3 holding the three lenses 121, 122, 123 a fixed aperture 124, and a lens holder 12 together on a cylindrical sleeve 15 thereof, a drive mechanism 5 that moves the movable body 3 along the lens optical axis, X, and a fixed body 2 in which the drive mechanism 5 and the movable body 3 are installed. Also, the movable body 3 is equipped with a first coil 141 and a second coil 142 fixed around the outer circumferential surface of the sleeve 15 thereof.

In this embodiment, the fixed body 2 is composed of a base 19 for holding an image pickup device (not illustrated) on the image side, a case 11 positioned on the photographic subject side, and a yoke 16; in the center of the case 11 on the front side, a circular light-entrance window 110 is formed for collecting the light reflected from the photographic subject into the lens 121.

(Configuration of Drive Mechanism 5)

The case 11 and the base 19 can be fitted with each other, and the cylindrical yoke 16 used in the drive mechanism 5 is fixed between the case and the base. On the inner circumferential surface of the yoke 16, a ring-like magnet 17 is adhered. The magnet 17 is adhered to the yoke 16 such that it projects from the inner circumferential surface of the yoke 16 toward the inside. The yoke 16 is composed of a ferromagnetic material such as a steel plate.

Around the outer circumference of the sleeve 15, a ring-like first coil 141 is adhered on the photographic subject side (on the front side) and a ring-like second coil 142 is adhered on the image pickup device side (on the rear side). The first coil 141 is positioned on the outer circumference of the sleeve 15 and on the front side of the magnet 17. The second coil 142 is positioned such that the magnet 17 is interposed between the first and second coils 141 and 142 in the lens optical axis, X. Therefore, the rear end face of the first coil 141 is opposed to the front end face of the magnet 17 and the front end face of the second coil 142 is opposed to the rear end face of the magnet 17. Note that the first coil 141 and the second coil 142 adhered to the sleeve 15 are capable of moving together with the movable body 3 relatively to the yoke 16 in the lens optical axis X.

In the lens driving apparatus 1 configured as above, the magnet 17 is magnetized in the direction perpendicular to the direction of the lens optical axis X; the magnetic flux emanated from the N pole of the magnet 17 makes a loop passing through the sleeve 15, first coil 141, and yoke 16 and returning to the magnet 17, for example. Also, the magnetic flux emanated from the N pole of the magnet 17 makes a loop passing through the sleeve 15, the second coil 142, and the yoke 16 and returning to the magnet 17, for example. Thus, a magnetic circuit (magnetic path) is formed with the first coil 141, the second coil 142, the yoke 16 and the sleeve 15. Therefore, it is preferred that a magnetic material be used for the sleeve 15. Note that the sleeve 15 can be excluded from the members that compose the magnetic circuit (magnetic path).

The opposing surface-to-surface distance between the first coil 141 and the second coil 142 is larger than the thickness of the magnet 17 in the direction of the lens optical axis, X; there is a space between the magnet 17 and the first coil 141 and between the magnet 17 and the second coil 142 in the direction of the lens optical axis, X. Therefore, the movable body 3 can be moved in the direction of the lens optical axis, X, within the range of this space.

The yoke 16 is formed such that the length thereof in the direction of the lens optical axis, X, is longer than the opposing surface-to-surface distance between the first coil 141 and the second coil 142. This configuration can reduce magnetic flux leakage from the magnetic path formed between the magnet 17 and the first coil 141 and formed between the magnet 17 and the second coil 142 so that the linearity between the moving distance of the sleeve 15 and the current passing through the first and second coils 141, 142 can be improved.

In the lens driving apparatus 1 of this embodiment, a first flat spring 131 (a first resilient member/regulatory means) and a second flat spring 132 (a second resilient member/regulatory means) that regulate the movement of the sleeve 15 are provided in the drive mechanism 5, as shown in FIG. 1 and FIGS. 2 (a) and FIG. 2 (b). Of the flat springs 131 and 132, the second flat spring 132 is described in detail referring to FIG. 2 (b). As shown in FIGS. 2 (b), the second flat spring 132 is held in the base 19; it is engaged with a rotation-preventing groove 19a (not shown in FIG. 1) cut in the base 19. In this way, the second flat spring is kept from rotating.

The second flat spring 132 is a metallic spring that lets current flow, and the rear end of the sleeve 15 is placed at the innermost circumferential portion 132a of the spring 132. Also, a terminal 132b is formed at three places in the circumferential portion 132a for electrifying the second coil 142; through the terminals 132b, current can be supplied to the coil 142.

Note that, although the detailed description is omitted, the first flat spring 131 also has terminals formed therein for electrifying the first coil 141 in the same manner as the second flat spring 132; through the terminals, current is supplied to the first coil 141. Therefore, the first flat spring 131 and the second flat spring 132 can function as the wires electrifying the first coil 141 and the second coil 142. This simplifies the electrical circuit design (circuit wiring) in the lens driving apparatus 1, contributing to downsizing the overall lens driving apparatus 1.

As shown in FIG. 2 (a), an electrifying wire 140 that connects the first coil 141 and second coil 142 in series is provided on the outer circumferential surface of the sleeve 15 in this embodiment. With this, the current that flows in the first coil 141 and the current that flows in the second coil 142 can be equal, facilitating the current control.

According to the lens driving apparatus 1 with such a configuration, the sleeve 15 to which the first coil 141 and the second coil 142 are adhered can be retained in the desired position by using the resiliency of the flat springs 131 and 132. The retaining operation will be described later.

(Assembling Method)

Next, an assembling method in the manufacturing method of the lens driving apparatus 1 is described. Note that the method which is described here can be used in lens driving apparatuses which will be described later in the same manner.

In this embodiment, the first coil 141 and the second coil 142 are adhered to the outer circumference of the sleeve 15 in advance and the sleeve 15 holding the lenses 121, 122, 123 is also installed inside the yoke 16 in advance. The magnet 17 is adhered to the inner circumferential surface of the yoke 16 in advance. Note that the magnet 17 and the yoke 16 have a cutting line, respectively, in the direction of the lens optical axis, X, so that each of them can be divided into two.

When the lens driving apparatus 1 using the members configured as above is assembled, the flat spring 132 is first attached to the base 19 such that it engages with the rotation-prevention groove 19a (not shown in FIG. 1) cut in the base 19. Next the magnet 17 and the yoke 16 are respectively divided into two pieces, and the two pieces of the magnet 17 and the two pieces of the yoke 16 are respectively reunited (adhered) such that the magnet 17 is interposed between the first coil 141 and the second coil 142 which are adhered to the outer circumference of the sleeve 15. Then, the yoke 16 inside which the sleeve 15 is installed is fixed to the base 19. At that time, the rear end of the sleeve 15 is placed at the innermost circumferential portion 132a of the second flat spring 132. The first flat spring 131 is placed such that the innermost circumferential portion thereof makes contact with the front end of the sleeve 15, and finally the case 11 is engaged with the base 19. In this manner, the lens driving apparatus 1 shown in FIG. 2 (a) can be assembled. Note that a tongue-like portion is formed respectively on the outside of the flat springs 131, 132 in the radial direction, which is used as a current-supplying portion for the coil 141, 142.

(Retaining Operation)

FIGS. 3(a), 3(b), 3(c), and 3(d) are explanatory illustrations showing how the movable body 3 is retained in the desired position in the lens driving apparatus 1. Note that FIGS. 3(a), 3(b), 3(c), and 3(d) show mechanical arrangements of the apparatus 1, looking at the right half from the lens optical axis X in FIG. 2 (a), and illustrates only the sleeve 15 of the movable body 3. Also, the magnet 17 is magnetized to the N pole on the inner side thereof in the radial direction and to the S pole on the outer side thereof in the radial direction.

In FIG. 3 (a), the magnetic flux emanated from N pole of the magnet 17 passes through the sleeve 15, the first coil 141 and the yoke 16 in this order (see arrows in FIG. 3 (b)). Note that, with respect to magnetic flux leakage, some of the magnetic flux emanated from the N pole of the magnet 17 passes through only the first coil 141 and returns to the magnet 17. Also, the magnetic flux emanated from the N pole of the magnet 17 passes through the sleeve 15, the second coil 142 and yoke 16 in this order (see arrows in FIG. 3 (b)). Note that, with respect to magnetic flux leakage, some of the magnetic flux emanated from the N pole of the magnet 17 passes through only the second coil 142 and returns to the magnet 17. Thus, a magnetic circuit (magnetic path) is formed with the first coil 141, the second coil 142, the yoke 16 and the sleeve 15.

Under such a condition, the current in the same direction is passed through the first coil 141 and to the second coil 142. In this embodiment, as shown in FIG. 3 (c), current is passed from "the rear side" to "the front side" as facing the paper. Consequently, the first and second coils 141 and 142 in electrification, which are placed in the magnetic field, respectively receive an upward electromagnetic force $F_H$ (on the front side) (see arrows in FIG. 3 (c)). With this, the sleeve 15 on which the first coil 141 and the second coil 142 are adhered starts moving toward the photographic subject (toward the front side). Note that, since the electrifying wire 140 is provided to the sleeve 15 in this embodiment as described above to equalize the current flowing in the first coil 141 and the current flowing in the second coil 142, an almost equal electromagnetic force $F_H$ is exerted on the first coil 141 and the second coil 142. Also, since the lens driving apparatus 1 is very small (10 mm outside diameter×5 mm height, for example), the magnetic flux passing through the first coil 141 and that passing through the second magnetic coil 142 are almost equal in electromagnetic force.

At that time, between the first flat spring 131 and the front end of the sleeve 15 and between the second flat spring 132 and the rear end of the sleeve 15, forces (the resilient force $F_{s1}$, the resilient force $F_{s2}$) are produced which regulate the movement of the sleeve 15 (See arrows in FIG. 3 (d)). Therefore, when the electromagnetic force $F_H+F_H$ that moves the sleeve 15 to the front side and the resilient force $F_{s1}+F_{s2}$ that prevents the movement of the sleeve 15 attain equilibrium, the sleeve 15 is halted. Thus, the amount of current flowing in the first coil 141 and the second coil 142 and the resilient force of the flat springs 131 and 132 exerted on the sleeve 15 are adjusted to halt the sleeve 15 in the desired position.

Since, in this embodiment, the flat springs 131 and 132 are used so that a linear relationship is established between the resilient force (stress) and the amount of displacement, the linearity between the moving distance of the sleeve 15 and the current flowing in the first coil 141 and second coil 142 can be improved. Also, since two resilient members which are the flat springs 131 and 132 are used, the large force in equilibrium is applied to the sleeve in the direction of the lens optical axis X when the sleeve 15 is halted. Therefore, even when another force such as a centrifugal force is exerted on the sleeve in the direction of the lens optical axis X, the sleeve 15 can be halted in a more stable manner. Further, the sleeve 15 is halted by using the equilibrium force between the electromagnetic force and the resilient force, not by colliding the sleeve 15 with a colliding material (a buffer material); therefore, a colliding noise can be prevented.

Modification Example 1 of Embodiment 1

In the lens driving apparatus of at least an embodiment of the present invention, the following configurations may be used in place of the drive mechanism 5 described referring to FIG. 1 through FIG. 3(d).

FIG. 4 is an explanatory illustration showing the mechanical arrangement of a lens driving apparatus of the Modification Example 1 of Embodiment 1 of the present invention. In FIG. 4, a lens driving apparatus 1A uses a first coil spring 211 and a coil spring 212, which is shorter than the coil spring 121, for regulating the movement of the sleeve 15 (movable body 3). Even when the flat springs 131 and 132 used in the lens driving apparatus 1 shown in FIGS. 1 through 3(d) are replaced with other resilient members (coil springs 211, 212) as above, the amount of current flowing in the first coil 141 and the second coil 142 is adjusted to generate an appropriate resilient force in the coil springs 211, 212 so that the lenses 121, 122, 123 held in the sleeve 15 (see FIG. 2 (a)) can be halted in desired positions. Note that the coil springs 211, 212 can be used as the electrifying wire. Also, the length of the coil spring 212 is shorter than that of the coil spring 211 in this example because the standard position of the sleeve 15 is located on the rear side. For example, when the standard position of the sleeve 15 is located on the front side, the coil spring 211 is shorter than the spring 212. When the standard position of the sleeve 15 is located in the middle, the two springs are equal in length.

Modification Example 2 of Embodiment 1

FIGS. 5(a) and 5(b) are diagrams showing the mechanical arrangement of a lens driving apparatus of the Modification Example 2 of Embodiment 1 of the present invention. FIG. 5 (a) shows a lens driving apparatus 1B in which a medium-size cylindrical case 20 is fixed by the case 11 and the base 19. The magnet 17 is adhered to the case 20 such that it projects inward from the inner circumferential surface of the medium-sized case 2, and the yoke 16 is adhered to the magnet 17. As shown in the figure, the yoke 16 may be positioned on the inner side of the first and second coils 141, 142 in the radial direction. As shown in FIG. 5 (b), the middle-size case 20 may be replaced with the yoke 16 so that the yoke 16 may be arranged on both the outer side and the inner side of the first coil 141 and the second coil 142 in the radial direction. With this, magnetic flux leakage from the magnetic path between the magnet 17, the first coil 141 and the second coil 142 can be further reduced so that the linearity between the moving distance of the sleeve 15 and the current flowing in the first coil 141 and the second coil 142 can be improved.

Note that although, in FIG. 5 (b), the length of the yoke 16 (adhered to the N pole of the magnet 17) on the inner side in the radial direction is shorter than that of the yoke 16 (adhered to the S pole of the magnet 17) on the outer side in the radial direction, the present invention is not limited to this, but the length of the yoke 16 (adhered to the N pole of the magnet 17) on the inner side in the radial direction may be longer than the other. The lengths can be the same, of course. However, with respect to magnetic flux leakage, it is preferred that the length of the yoke 16 be longer than the opposing surface-to-surface distance between the first coil 141 and the second coil 142.

In any of the lens driving apparatus in the above examples, the magnet 17 and the yoke 16 are both arranged in either the movable body 3 or the fixed body 2. Therefore, even when the movable body 3 is moved with respect to the fixed body 2, the relative positional relationship between the magnet 17 and the yoke 16 is constant, thus preventing bad effects which may caused by the radial attraction force between the magnet 17 and the yoke 16.

Modification Example 3 of Embodiment 1

Note that the present invention is not limited to the example in which the relative positional relationship between the magnet 17 and the yoke 16 is used.

FIGS. 6(a) and 6(b) are diagrams showing the mechanical arrangement of a lens driving apparatus of the Modification Example 3 of Embodiment 1 of the present invention. In FIG. 6 (a), the magnet 17 is adhered to the sleeve 15 (the movable body 3) and also the first coil 141 and the second coil 142 are adhered to a coil yoke 165 which is fixed by the case 11 and the base 19. When the movable body 3 to which the magnet 17 is adhered is moved in the direction of the lens optical axis X with respect to the fixed body 2 to which the coil yoke 165 is adhered, the lens driving apparatus 1C having such a mechanical arrangement is affected by the radial attraction force between the magnet 17 and the yoke 16. However, such a lens driving apparatus 1C also has the following advantage: since the first coil 141 and the second coil 142 are adhered not to the movable body 3 but to the fixed body 2, the wiring for electrification does not need to be complicated. Also in FIG. 6 (a), the coil yoke 165 is provided only on the outer side of the first coil 141 and the second coil 142 in the radial direction; however, the yoke 16 may be positioned on the back surface of the magnet 17 (see FIG. 6 (b)). Note that, since the first coil 141 and the second coil 142 are adhered to the coil yoke 165 in the lens driving apparatus 1C, a repelling force against the electromagnetic force between the first coil 141 and the second coil 142 is exerted on the sleeve 15 so that the sleeve 15 can be moved in the direction of the lens optical axis X.

Modification Example 4 of Embodiment 1

Next, another example of the lens driving apparatus in which the second coil 142 is eliminated is described in detail. In other words, the example is described in which the magnetic circuit is formed with the first coil 141, the yoke 16, and the sleeve 15. FIG. 7 is a perspective disassembly drawing of a lens driving apparatus of the Modification Example 4 of Embodiment 1 of the present invention. FIGS. 8 (a) and (b) are respectively a cross-sectional view of a major portion of the lens driving apparatus shown in FIG. 7 taken along the lens optical axis and a plane cross-sectional view of the major portion taken along the Y2-Y2' line in FIG. 8 (a). FIGS. 9(a)-9(d) are explanatory illustrations showing how the sleeve 15 is halted in the desired position. Note that FIGS. 9(a)-9(d) shows the mechanical arrangement, looking at the light half from the lens optical axis X.

As shown in FIG. 7 and FIGS. 8 (a) and 8(b), a lens driving apparatus 1D is not equipped with the second coil 142 which is present in the lens driving apparatus 1 (see FIG. 1). Such a lens driving apparatus 1D can be simply manufactured by adhering only the first coil 141 to the outer circumference of the sleeve 15. In FIGS. 9 (a) and (b), the lens driving apparatus 1D performs the same operation as the halting operation of the lens driving apparatus 1 shown in FIGS. 3(a)-3(d). In other words, the magnetic flux emanated from the N pole of the magnet 17 passes through the sleeve 15, first coil 141, and the yoke 16 in this order (FIG. 9 (a)→FIG. 9 (b)). When current is passed through the first coil 141 from "the rear side" to "the front side" on the paper, the first coil 141 in electrification, which is placed in the magnetic field, receives the upward electromagnetic force $F_H$ (to the front side) (see arrows in FIG. 9 (c)). Also, between the first flat spring 131 and the front end of the sleeve 15 and between the second flat spring 132 and the rear end of the sleeve 15 respectively, the force (the resilient force $F_{s1}$, the resilient force $F_{s2}$) of regulating the movement of the sleeve 15 (the movable body 3) is produced (see arrows in FIG. 9 (d)). When the electromagnetic force $F_H$ to move the sleeve 15 toward the front and the resilient force $F_{s1}$ to regulate the movement of the sleeve 15 attain equilibrium, the sleeve 15 (the movable body 3) is halted. Thus, the amount of current flowing in the first coil 141 and the resilient force of the flat spring 131 and flat spring 132 exerted on the sleeve 15 are adjusted to halt the sleeve 15 in the desired position. Also, in the lens driving apparatus 1D, current flows only in the first coil 141; therefore, the entire apparatus can be made thinner and smaller.

Modification Example 5 of Embodiment 1

FIG. 10 is an explanatory illustration showing the mechanical arrangement of a lens driving apparatus of the Modification Example 5 of Embodiment 1 of the present invention. As shown in the lens driving apparatus 1E in FIG. 10, the second coil 142 may be placed on the second flat spring 132 side with respect to the magnet 17 to move the sleeve 15 (the movable body 3) toward the image pickup device (to the rear side).

Modification Example 6 of Embodiment 1

FIGS. 11(a) and 11(b) are an explanatory illustrations showing the mechanical arrangements of a lens driving apparatus of the Modification Example 6 of Embodiment 1 of the present invention. The lens driving apparatus 1F shown in FIG. 11 (a) uses the same components as those of the lens driving apparatus 1D (see FIGS. 8(a) and 8(b)) of the Modification 6 of Embodiment 1; however, the magnet 17 is adhered to the sleeve 15 and only the first coil 141 is adhered to the coil yoke 165. In this manner, the positions of the magnet 17 and the first coil 141 can be switched. As shown in FIG. 11 (b), the second coil 142 can be placed on the second flat spring 132 side with respect to the magnet 17 to move the sleeve 15 (the movable body 3) toward the imaging pickup device (to the rear side) in the same manner as in FIG. 10.

Modification Example 7 of Embodiment 1

FIG. 12 is a diagram of the mechanical arrangement of a lens driving apparatus of the Modification Example 7 of Embodiment 1. In the lens driving apparatus 1G shown in FIG. 12, the yoke 16 is provided in the vicinity of the N pole of the magnet 17 of the lens driving apparatus 1D of the Modification Example 6 of Embodiment 1. Even in such a lens driving apparatus 1G, the arrangement may be used in which the yoke 16 is arranged to the magnet 16, as in the lens driving apparatus 1B described referring to FIG. 5 (b).

Modification Example 8 of Embodiment 1

Next, a lens driving apparatus is described in which, based on the lens driving apparatus 1D shown in FIGS. 8(a) and 8(b) that uses the magnet 17, a magnet 172 as well as a magnet 171 are arranged.

FIGS. 13(a) and 13(b) are an explanatory illustrations of the mechanical arrangements of a lens driving apparatus of the Modification 8 of Embodiment 1 of the present invention. As shown in FIG. 13 (a), the lens driving apparatus 1H is configured such that two magnets 171 and 172 are adhered to the yoke 16 and sandwich the coil 14 between them in the direction of the lens optical axis X. Note that, as shown in FIG. 13 (b), two magnets 171 and 172 may be adhered to the outer side of the sleeve 15 in the radial direction and sandwich the coil 14 between them.

In the lens driving apparatus 1H, the magnetic flux density around the coil can be intensified, compared to the configuration which uses a single magnet and a plurality of coils (for example, see FIG. 1). Thus, even if the number of coils that produce the thrust force is reduced to one, the same magnitude of thrust force as in the configuration shown in FIG. 1 can be obtained; while the magnetic circuit is shaped flat, the movable body can be halted in the desired position. Also, since only one coil is used (for example, the first coil 141 only), there is no need to provide a connecting wire between the coils, thus improving operability.

Embodiment 2

FIG. 14 is a perspective disassembly drawing of a lens driving apparatus of Embodiment 2 of the present invention. FIGS. 15 (a) and (b) are respectively a cross-sectional view of a major portion of the lens driving apparatus illustrated in FIG. 14, taken along the direction of the lens optical axis, and a plane cross-sectional view of the lens driving apparatus, taken long the Y3-Y3' line. Note that in FIG. 15 (a), the top is the front side which is close to the photographic subject for convenience of description. In this embodiment and other embodiments that will be described later, the same codes are given to the portions common to those in Embodiment 1, and their description is omitted.

In FIG. 14 and FIGS. 15 (a) and 15(b), a lens driving apparatus 1J is mainly composed of a case 11 which is a portion of the fixed body and the sleeve 15 which is a portion of the movable body 3. Inside the sleeve 15, a cylindrical sleeve 15 centered about the lens optical axis X is attached inside the yoke 16 (not shown in FIGS. 15(a) or 15(b), see FIG. 14), and the lens 121 and the like are arranged inside the sleeve 15 (see FIG. 14).

The case 11 and the base 19 can be fitted to each other even in this embodiment (see FIG. 14), an between then the cylindrical yoke 16 is fixed. The fixed boy is composed of the case 11, the base 19 and the yoke 16. The ring-like magnet 17 is adhered on the inner circumferential surface of the yoke 16. More specifically, the magnet 17 is adhered to the yoke 16 such that it projects toward the inside from the inner circumferential surface of the yoke 16 (see FIG. 14). And, the magnet 17 is magnetized in the direction perpendicular to the direction of the lens optical axis, X. Note that the yoke 16 is composed of a ferromagnetic material such as a steel plate.

Around the outer circumference of the sleeve 15, the ring-shaped first coil 141 is adhered on the front side and the ring-shaped second coil 142 on the rear side. In other words, the first coil 141 is positioned on the front side of the magnet 17 to be opposed to the magnet 17, and the second coil 142 is positioned such that the magnet 17 is interposed in the direction of the optical axis, X, in relation to the first coil 141. Consequently, the rear end face of the coil 141 and the front end face of the magnet 17 are opposed to each other, and the front end face of the second coil 142 and the rear end face of the magnet 17 are opposed to each other.

Also, in the lens driving apparatus 1J of this embodiment, the first flat spring 131 and the second flat spring 132 are arranged to regulate the movement of the sleeve 15. As the flat spring 132 is shown in FIG. 15 (b), the flat springs 131, 132 have the same configuration as those of Embodiment 1.

As shown in FIG. 14 and FIG. 15 (a), in the sleeve 15 (the movable body 3) an annular magnetic member 30 is positioned to be opposed to the magnet 17 interposing the first coil 141 between them. The magnetic member 30 is positioned coaxially to the lens optical axis, X. Therefore, a magnetic attraction exits between the magnetic member 30 and magnet 17, by which the sleeve 15 can be retained. The retaining operation is described in detail in (Retaining Operation) which is described later. Note that a method of assembling the lens driving apparatus 1J is the same as that of the lens driving apparatus 1; therefore, its description is omitted.

(Retaining Operation)

FIGS. 16(a) and 16(b) are explanatory illustrations showing how the sleeve 15 is retained in the lens driving apparatus 1J. Note that FIGS. 16 (a) and (b) show the mechanical arrangement of the apparatus, looking at the right half from the optical axis, X. Also, the magnet 17 is magnetized such that the inner side thereof in the radial direction is the N pole and the outer side thereof in the radial direction is the S pole.

In FIG. 16 (a), the magnetic flux emanated from the N pole of the magnet 17 passes through the sleeve 15, the first coil 141 and the yoke 16 in this order. Also, the magnetic flux emanated from the N pole of the magnet 17 passes through the sleeve 15, the second coil 142 and yoke 16 in this order. Under this condition, current flowing in the same direction is passed through the first coil 141 and the second coil 142 (for example, current is passed from "the rear side" to "the front side" on the paper) in FIG. 16 (a), the first coil 141 and the second coil 142 in electrification, placed in the magnetic field, respectively receive the upward (the front side) electromagnetic force $F_H$ (see arrows in FIG. 16 (a)). With this, the sleeve 15 to which the first coil 141 and the second coil 142 are adhered is moved to the front side.

As described above, the electrifying wire 140 is provided to the sleeve 15 in this embodiment, and the current flowing in the first coil 141 and the current flowing in the second coil 142 are equal to each other; therefore, almost equal electromagnetic force $F_H$ is exerted on the first coil 141 and the second coil 142. Also, since the size of the lens driving apparatus 1J is small (for example, 10 mm outside diameter×5 mm height), it can be considered that the magnetic flux passing through the first coil 141 and that passing through the second coil 142 are equivalent to each other.

On the other hand, between the flat spring 131 and the front end of the sleeve 15 and between the flat spring 132 and the rear end of the sleeve 15, the force (the resilient force $F_{S1}$, the resilient force $F_{S2}$) to regulate the movement of the sleeve 15 is produced (see arrows in FIG. 16 (a)). Thus, In FIG. 16 (a), the electromagnetic force $F_H+F_H$ that moves the sleeve to the front side and the resilient force $F_{S1}+F_{S2}$ that regulates the movement of the sleeve 15 are in equilibrium so that the sleeve 15 is halted.

When the mode is switched from a macro shoot to a normal snapshot (or when the camera is not in use), the lens driving apparatus 1J changes the status shown in FIG. 16 (a) to the status shown in FIG. 16 (b). More specifically described, when the first coil 141 and the second coil 142 are not in electrification, the above mentioned electromagnetic force $F_H$ is not exerted on the first coil 141 and the second coil 142; therefore, the sleeve 15 is returned to the original position by the resilient force $F_{S1}$, $F_{S2}$ of the flat spring 131 and flat spring 132.

At that time, the sleeve 15 is retained by the magnetic attraction $F_{m1}$ and $F_{m2}$ produced between the magnetic member 30 and the magnet 17 via the first coil 141. Therefore, this prevents vibrations or clattering in the sleeve 15, and in turn, inaccuracy of the static position of the movable body such as the lens 121 and sleeve 15 can be reduced during a normal snapshot (or when the camera is not in use).

Particularly, according to the lens driving apparatus 1J of this embodiment, the magnetic member 30 is formed in an annular shape and positioned coaxially with the lens optical axis, X; therefore, there is no uneven magnetic attraction between the magnetic member 30 and the magnet 17, but a constant magnetic attraction can be produced at any position on the first coil 141 in the entire circumferential direction. Therefore, the accuracy of the static position of the movable body 3 such as the lens 121 and the sleeve 15 can be more stable. Note that the thickness of the magnetic member 30 in the direction of the optical axis, X, can be varied to adjust the magnitude of the magnetic attraction force.

However, the shape of the magnetic member 30 is not limited to an annular shape. For example, a plurality of magnetic members can be positioned coaxially with the lens optical axis, that is, at an equal angle distance in the circumferential direction. More specifically, the magnetic members can be in the form of a ball, wire or bar, and a configuration may be used in which the magnetic urging force produced between the above-mentioned magnetic members and the magnet can be applied to the movable body. As for the magnetic members in a ball, wire or stick form, a plurality of magnetic members may be positioned at locations of an unequal angular distance around the lens optical axis as long as the plurality of magnetic members are centered about the lens optical axis. Further, the inclination of the movable body may be adjusted by arranging the magnetic members in the form of a ball, wire or stick in different number and size.

In the lens driving apparatus 1J, the outside diameter of the magnetic member 30 is about an intermediate value between the inside diameter and the outside diameter of the first coil 141 (see FIG. 14 or FIGS. 15(a)-15(b)). This configuration can prevent the magnetic attraction in the radial direction between the magnetic members 30 and the yoke 16, and also the movable body 3 such as the lens 121 and sleeve 15 can be kept from being displaced from the lens optical axis, X. Note that, from those viewpoints, it is preferred that the outside diameter of the magnetic member 30 be smaller than the above-mentioned intermediate value.

Embodiment 3

FIG. 17 is an explanatory illustration showing the mechanical arrangement of a lens driving apparatus of Embodiment 3 of the present invention. FIG. 17 shows a lens driving apparatus 1K, different from the lens driving apparatus 1J shown in FIG. 16 (b), in which the magnetic member 30 is eliminated and the first flat spring 131 is used as a magnetic member that is magnetically attracted to the magnet 17. Consequently, the sleeve 15 (the movable body 3) is retained by the magnetic attraction $F_{m1}$ and $F_{m2}$ which is produced between the first flat spring 131 and the magnet 17 via the first coil 141. Since other configuration remains the same as Embodiment 1, the same codes are given to the common portions and shown in the drawing, and their description is omitted.

Thus, according to the lens driving apparatus 1K, vibration or clattering is prevented in the sleeve 15, and in turn, inaccuracy of the static position of the movable body such as the lens 121 and sleeve 15 can be prevented for a normal snapshot (when a camera is not in use).

Considering that the first flat spring 131 functions as a terminal for electrifying the first coil 141 as described above, it is preferred that the material of the spring 131 be a copper-type or phosphorus magnetic stainless.

Modification Examples of Embodiment 2 and 3

FIGS. 18 (a) and (b) are the illustrations of the mechanical arrangements of lens driving apparatuses of the Modification Examples of Embodiments 2 and 3 of the present invention.

FIGS. 18 (a) and (b) show lens driving apparatuses 1L and 1M in which, different from the lens driving apparatuses 1J and 1K described referring to FIGS. 16(a) and 16(b) and FIG. 17, the coil 141 is held on the sleeve 15 (the movable body), only on the photographic subject side with respect to the magnet 17, and the coil 142 is not held on the base 19 side with respect to the magnet 17.

In the lens driving apparatus 1L configured as above, the sleeve 15 is retained by the magnetic attraction $F_{m1}$ and $F_{m2}$ between the magnetic member 30 and the magnet 17. Also, in the lens driving apparatus 1M, the sleeve 15 (the movable body 3) is retained by the magnetic attraction force $F_{m1}$ and $F_{m2}$ between the flat spring 131 and the magnet 17. Other configurations remain the same as Embodiments 2 and 3; therefore, the same codes are given to the common portions and shown in the figures, and their description is omitted.

Embodiment 4

FIG. 19 is an exterior appearance view of an exterior configuration of a lens driving apparatus of Embodiment 4 of the present invention. FIGS. 20(a)-20(c) are respectively a cross-sectional view of the lens driving apparatus shown in FIG. 19, taken along the direction of the lens optical axis, X, a cross-sectional view of the apparatus taken along the Y5-Y5' line, and a cross-sectional view of the apparatus, taken along the Y6-Y6' line. FIGS. 21(a) and 21(b) are explanatory illustrations showing the effect of the lens driving apparatus of this embodiment. Note that in FIG. 20 (a), the top is the front side which is close to the photographic subject and the bottom is the rear side which is close to the back face of a camera body for convenience of description. Also in FIG. 20 (a), the right side of the figure shows the status not in electrification and the left side shows the status in electrification.

In FIG. 19 and FIGS. 20(a)-20(c), a lens driving apparatus 1N is composed of the sleeve 15 (the movable body 3) holding the lenses and a lens holder 12 and the cover portion (the case 11, the yoke 16 and the base 19 in this embodiment) to cover the sleeve 15, the coils 141 and 142 and the magnet 17. Note that the coils 141 and 142 and the magnet 17 function as the magnetic drive portion that moves the sleeve 15 in the direction of the lens optical axis, X.

As shown in FIG. 19, the case 11 and the base 19 can be respectively fitted into the yoke 16. The magnet 17 is adhered on the inner circumferential surface of the yoke 16. More specifically described, the magnet 17 is adhered to the yoke 16 such that it projects toward the inside from the inner circumferential surface of the yoke 16 (see FIG. 20 (a)), and it is magnetized in the direction perpendicular to the direction of the lens optical axis, X (the N pole on the inner side in the radial direction and the S pole on the outer side in the radial direction). The yoke 16 is composed of a ferromagnetic material such as a steel plate.

As shown in FIG. 20 (a), on the outer circumference of the sleeve 15, the first coil 141 is adhered on the front side and the second coil 142 is adhered on the rear side. More specifically described, on the outer circumference of the sleeve 15, the coil 141 is positioned on the front side with respect to the magnet 17 to be opposed to the magnet 17 and the second coil 142 is positioned so as to interpose the magnet 17 in the direction of the lens optical axis, X, in relation to the coil 141. Consequently, the rear end face of the first coil 141 is opposed to the front end face of the magnet 17, and the front end face of the second coil 142 is opposed to the rear end face of the magnet 17. Note that, although the coils 141 and 142 are the same in number of windings in this embodiment, they may be different.

Even in this embodiment, the movement of the sleeve 15 (the movable body 3) can be regulated by the first flat spring 131 and second flat spring 132 in the same manner as Embodiments 1 through 3. In other words, when current is passed through the coil 141 and the coil 142 and an electromagnetic force is produced, the movement of the sleeve 15 caused by the electromagnetic force is regulated by the flat springs 131 and 132. As FIG. 20 (c) shows the flat spring 132, the flat springs 131 and 132 have the same configuration as those in Embodiment 1.

In this embodiment, as shown in FIG. 20 (b), the magnet 17 is contoured along the inner peripheral shape of the cover portion (each tube-like body portion of the yoke 16). In other words, the outer peripheral shape of the magnet 17 is almost square and contoured along the inner peripheral surface of the yoke 16. Also, the inner periphery of the magnet 17 is formed in an annular shape (i.e. in a circular shape) along the outer circumference of the sleeve 15. The magnet 17 and the cover portion (the yoke 16) are positioned by the chamfered portions 16a at the corners. Further, the magnet 17 is divided into four pieces, and a gap 17x is created between the pieces of the magnet 17.

Also, FIG. 20 (b) shows the lens driving apparatus 1N in which the second coil 142 (see one-dotted line in the figure) is contoured along the inner periphery of the cover portion (the yoke 16). The first coil 141 is also shaped to conform to the inner periphery of the cover portion (the yoke 16) in the same manner as the second coil 142. The magnet 17 and the cover portion (the yoke 16) are positioned by the chamfered portions 16a at the cores.

In the lens driving apparatus 1N configured as above, the magnet 17 is shaped along the inner periphery of the cover portion (each corner of the tube-like body portion of the yoke 16); therefore, the efficiency in driving the sleeve 15 can be enhanced. More specifically described using FIGS. 21(a) and 21(b), in a conventional lens driving apparatus 1P shown in FIG. 21 (a), the magnet 17 placed outside the sleeve 15 is formed in an annular shape (a ring shape); therefore, the magnet 17 and the yoke 16 together create a useless space 55 at each corner of the lens driving apparatus 1P.

As shown in FIG. 21 (b), on the other hand, in the lens driving apparatus 1N of this embodiment (the chamfered portions 16a of the yoke 16 are not illustrated in the figure for convenience of description), the magnet 17 can be filled in the places at which the useless spaces 55 (see FIG. 21 (a)) exist in the conventional lens driving apparatus 1P; therefore, the magnetic force of the magnet 17 can be enhanced with the magnet-filled spaces. Thus, the amount of the magnetic flux passing through the magnetic circuit (the magnetic path), in the order of the sleeve 15, the coil 141, the coil 142 and the yoke 16, can be intensified; as a result, the electromagnetic force exerted on the coil 141 and the coil 142 can be enhanced without increasing the current flowing in the coil 141 and the coil 142. This increases the efficiency in driving the sleeve 15. That the amount of magnetic flux in the magnetic circuit is increased means that, even when current flowing in the coil 141 and the coil 142 is reduced, the force to drive the sleeve 15 can be obtained in the same manner as in a conventional apparatus; therefore, the efficiency in energy savings can be increased.

Also, since the magnet 17 and the cover portion (the yoke 16) are positioned at each of the corner portions, there is no need to provide a jig and the like, increasing efficiency in operation. As shown in FIG. 20 (b), the coils 141 and 142 are contoured along the inner periphery of the cover portion (the yoke 16) in the lens driving apparatus 1N; therefore, useless space can be reduced between the coils 141, 142 and the yoke 16, and more coil can be wound; thus, an efficiency in driving the sleeve 15 can be increased and an efficiency in energy savings can be increased as well.

Further, since the outer peripheral shape and the inner peripheral shape of the cover portion (the yoke 16) is a square shape in which a chamfered portion 16a is formed at each corner, the magnet 17 and the coils 141 and 142 can be easily inserted into the cover portion (the yoke 16), improving operability.

Modification Example 1 of Embodiment 4

Although, in the above mentioned lens driving apparatus 1N, the flat springs 131 and 132 are formed in an annular shape (a ring shape) (see FIG. 20 (c)), they may be shaped along the inner peripheral shape of the cover portion (the yoke 16 or the base 19), for example. With this, the flat springs 131 and 132 can be arranged in the places which used to be useless space in the conventional apparatus; therefore, a regulating force larger than that in the conventional device can be obtained, increasing stability in retaining (or regulating) the sleeve 15.

Modification 2 of Embodiment 4

FIG. 22 is a plane cross-sectional view of the mechanical arrangement of a lens driving apparatus of the Modification Example 2 of Embodiment 4 of the present invention. Note that the illustration of the coil 142 is omitted in FIG. 22.

FIG. 22 shows a lens driving apparatus 1Q in which one plane surface 16b is included in the inner peripheral shape of the yoke 16 (the cover portion). Even in the lens driving apparatus 1Q having such a cover portion, useless space can be eliminated and a driving efficiency can be increased for moving the sleeve 15 (i.e. the movable body 3) in the lens optical axis direction.

Modification Example 3 of Embodiment 4

FIG. 23 is a plane cross-sectional view of the mechanical arrangement of a lens driving apparatus of the Modification Example 3 of Embodiment 4 of the present invention. FIG. 23 shows a lens driving apparatus 1R in which the magnet 17 is shaped along the inner peripheral shape of the yoke 16, but the coil 142 is formed in an annular shape (a ring shape). Thus, it is possible that only the magnet 17 is shaped along the inner peripheral shape of the yoke 16 in this manner.

Modification Example 4 of Embodiment 4

FIG. 24 is a plane cross-sectional view of the mechanical arrangement of a lens driving apparatus of the Modification Example 4 of Embodiment 4 of the present invention. FIG. 24 shows a lens driving apparatus 1S in which the coil 142 is formed in an annular shape (a ring shape) (formed in the same shape as that shown in FIG. 20 (b)), but the magnet 17 is rectangular. With this configuration, the surface of the magnet opposed to the coil 142 (the coil 141) is smaller, but a larger adhering area of the magnet 17 can be obtained.

Modification Examples of Embodiments 1 through 4

Figure 25Z:
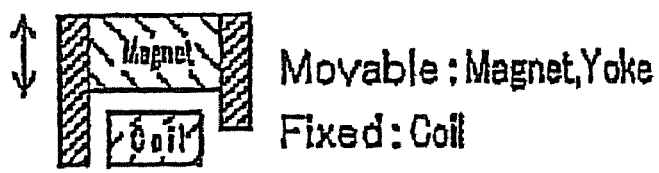

FIGS. 25(a)-25(z) are pattern diagrams to explain the arrangement patterns of the coils 141 and 142, the magnet 17 and the yoke 16 (the yoke 16 or the coil yoke 165) in the above described embodiments 1 through 4. In FIGS. 25(a)-25(z), "coil" refers to the coils 141 and 142, "magnet" refers to the magnet 17, and "yoke" in the figure refers to the yoke 16 or coil yoke 165.

FIG. 25 (a) through FIG. 25 (f) show the arrangement patterns in which two magnets (the magnet 17 and the magnet 172) and one coil (the first coil 141) are arranged. As shown in FIGS. 25 (a) and 25(d), FIGS. 25 (b) and 25(e), and FIG. 25. (c) and 25(f), the movable member(s) indicated by the arrow can be any of the following combinations: the coil only, the magnet and the yoke, or the magnets only. Also, in each pattern, the position of the yoke in the radial direction can be changed as shown in FIGS. 25 (a) and 25(d), FIGS. 25 (b) and 25(e), and FIGS. 25 (c) and 25(f).

FIG. 25 (g) through FIG. 25 (z) show the patterns in which one magnet 17 and only the first coil 141 are arranged. As shown in FIGS. 25 (g), 25(j), 25(m) and 25(p), FIGS. 25 (h), 25(k), 25(n) and 25(q) and FIG. 25 25(i), 25(l), 25(o), and 25(r), the movable member(s) can be any of the following combinations: the coil only, the magnet and the yoke, or the magnet only. Also, as shown in FIGS. 25 (g) and 25(m), FIGS. 25 (h) and 25(n), and FIGS. 25 (i) and 25(o), or FIGS. 25(j) and 25(p), FIGS. 25 (k) and 25(q), and FIGS. 25 (l) and 25(r), the position of the yoke 16 in the radial direction can be changed. Further, as shown in FIGS. 25 (g) and 25(j), FIGS. 25 (h) and 25(k), and FIGS. 25 (i) and 25(l), or FIGS. 25 (m) and 25(p), FIGS. 25 (n) and 25(q), and FIGS. 25 (o) and 25(r), the positions of the coil and the magnet can be switched. Moreover, as shown in FIG. 25 (s) through FIG. 25 (z), the yokes may be adhered on both sides of the magnet so that the coil is surrounded.

Embodiment 5

(Overall Configuration)

FIGS. 26 (a) and 25(b) are respectively an exterior appearance view and a perspective disassembly view of a lens driving apparatus of Embodiment 5 of the present invention. FIG. 27 is a cross-sectional view of the lens driving apparatus of FIGS. 26(a) and 26(b), taken along the lens optical axis.

A lens driving apparatus 1T of this embodiment shown in FIGS. 26 (a) and 26(b) and FIG. 27 is also used in thin cameras such as digital cameras and camera phones, for moving three lenses 121, 122 and 123 along the lens optical axis, X, in both the A direction (toward the front) to get closer to the photographic subject (the object side) and the B direction (toward the back) to get closer to the opposite side (the image side) from the photographic subject, in the same manner as Embodiment 1. It comprises of the movable body 3 that holds the three lenses 121, 122 and 123 and the fixed aperture 124 together on the cylindrical sleeve 15 thereof, the drive mechanism 5 for moving the movable body 3 along the lens optical axis, X, and the fixed body 2 in which the drive mechanism 5 and the movable body 3 are mounted. Also, the movable body 3 is equipped with the cylindrical sleeve 15 which is fixed inside thereof.

In this embodiment, the fixed body 2 is equipped with the base 19 for holding an image pickup device (not illustrated) on the image side and the case 11 positioned on the photographic subject side. In the center of the case 11, a circular light-entrance window 110 is formed to collect the light reflected from the photographic subject into the lenses. The fixed body 2 is also equipped with the yoke 16 (the back yoke) sandwiched between the base 19 and the case 11; the tube-like body portion 160 of the yoke 16 functions as a cover portion that surrounds the magnet 17 which will be described later and also configures with the magnet 17 an interlinked magnetic field producing body that produces an interlinked magnetic field to the coil 14.

(Configuration of Drive Mechanism 5)

FIGS. 28(a)-28(c) are respectively a plan view and vertical cross-sectional view of a magnetic circuit used in the drive mechanism of the lens driving apparatus shown in FIGS. 26(a) and 26(b), and an explanatory illustration of the magnet. FIGS. 29(a) and 29(b) are an explanatory illustrations showing the lens driving operation in the lens driving apparatus of FIGS. 26(a) and 26(b); FIG. 29 (a) shows the state of the movable body when positioned on the image pickup device, and FIG. 29 (b) shows the state of the movable body when positioned on the photographic subject side. Note that the magnetizing directions with respect to the magnet are indicated by the arrows in FIGS. 28 (b) and (c).

As shown in FIG. 26 (b), FIG. 27, FIGS. 28(a)-28(c) and FIGS. 29 (a) and 29(b), the drive mechanism 5 is equipped with the annular coil 14 which is directly wound around the outer circumferential surface of the sleeve 15 and the interlinked magnetic field producing body 4 that produces an interlinked magnetic field to the coil 14; a magnetic circuit is configured with the coil 14 and the interlinked magnetic field producing body 4. In the lens driving apparatus 1T, a current supplying portion (not illustrated) to the coil 14 is formed as well.

In this embodiment, the interlinked magnetic field producing body 4 is equipped with the magnet 17 arranged on the outer circumference side of the coil 14 and the yoke 16 composed of a ferromagnetic plate such as a steel plate. The yoke 16 has the tube-like body portion 160 that surrounds the coil 14, and the magnet 17 is fixed on the inner peripheral surface of the tube-like body portion 160.

The tube-like body portion 160 of the yoke 16 is sandwiched between the base 19 and the case 11: the end portion of the tube-like body portion 160 of the yoke 16 on the image pickup device side is adhered to the base 19 and the other end portion of the tube-like body portion 160 of the yoke 16 on the photographic subject side is adhered to the case 11. Thus, the tube-like body portion 160 of the yoke 16 is exposed to the side face of the lens driving apparatus 1 and configures the side face of the apparatus 1.

The drive mechanism 5 is equipped with the first flat spring 132, which is sandwiched between the tube-like body portion 160 of the yoke 16 and the base 19, and the second flat spring 131, which is sandwiched between the tube-like body portion 160 of the yoke 16 and the case 11. The first flat spring 132 has a small hole 136 bored in a deformation resilient portion inside thereof, and a small protrusion 151 that fits into the small hole 136 is formed at the end portion of the sleeve 15 on the image pickup device side; the deformation resilient portion is coupled with the end portion of the sleeve 15 on the image pickup device side so that the first flat spring 132 can urge the movable body 3 in the optical axis direction. Also, the first flat spring 132 functions to prevent the rotation of the sleeve 15.

The second flat spring 131 has a small hole 137 bored in a deformation resilient portion inside thereof, and a small protrusion 152 that fits into the small hole 137 is formed at the end portion of the sleeve 15 on the photographic subject side; the deformation resilient portion is coupled with the end portion of the sleeve 15 on the photographic subject side so that the second flat spring 131 can urge the movable body 13 in the optical axis direction. Also, the second flat spring 131 functions to prevent the rotation of the sleeve 15.

Note that the FIG. 29 (a) shows the state of the movable body in which the coil 14 is not in electrification, that is, the movable body 3 is in the original position in which the end portion thereof on the image pickup device side makes contact with the top face (the stopper portion) of the base 19.

When the lens driving apparatus 1T configured as above is observed from the direction of the lens optical axis, X, the tube-like body portion 160 of the yoke 16 is in a shape in which the corner portions 51, 52, 53 and 54 of the square 50, indicated by the two-dotted line, are chamfered. The base 19 and the case 11 are also in the shape in which the corner portions are chamfered, and their size is the same as that of the tube-like body portion 160. Therefore, the outer peripheral shapes of the tube-like body portion 160 of the yoke 16, the base 19 and the case 11 define the exterior peripheral shape of the lens driving apparatus 1T.

In the movable body 3, the sleeve 15 is cylindrical; therefore, the coil 14 is wound annularly. Also, the inner peripheral shape of the tube-like body portion 160 of the yoke 16 is non-circular (polygonal in this embodiment) which is different from the outer circumferential shape of the coil 14. For this reason, the space between the outer circumferential surface of the coil 14 and the inner peripheral surface of the tube-like body portion 160 of the yoke 16 is narrower in the areas corresponding to the sides of the square 50 and wider in the areas corresponding to the corner portions 51, 52, 53 and 54 of the square.

In this embodiment, the four magnets 17 are equidistantly placed in the corner portions 51, 52, 53 and 54 of the tube-like body portion 160 of the yoke 16. Also, each of the four magnets 17, when seen in a plan view, has the inner face in an arc shape along the outer circumferential shape of the coil 14 and the outer face in the shape of the inner peripheral surface of the corner portion 51, 52, 53 or 54 of the tube-like body portion 160.

(Operation)

In the lens driving apparatus 1T configured as above, each of the four magnets 17 is magnetized to unlike poles in the inside-outside direction, and produces an interlinked magnetic field to the coil 14 via the yoke 16. Therefore, when the coil 14 is electrified, the movable body 3 receives a thrust force (an electromagnetic force) which is directed toward the photographic subject, as indicated by arrow A in FIG. 27, FIG. 28 (b) and FIG. 29 (a), and is moved toward the photographic subject. At that time, since the first flat spring 132 and the second flat spring 131 are pulled toward the photographic subject, they have an urging force to return the movable body 3 to the original position. Therefore, the movable body 3 is halted in the position at which the electromagnetic force exerted on the movable body 3 and the urging force of the first flat spring 132 and the second flat spring 131 attain equilibrium.

When the electrification to the coil 14 is stopped under this condition, the movable body 3 is moved back to its original position by the urging force of the first flat spring 132 and the second flat spring 131, as indicated by arrow B in FIG. 27, FIGS. 28 (b) and FIG. 29 (b). At that time, the coil 14 may be electrified in the opposite direction from the direction when the movable body 3 is driven toward the photographic subject.

(Major Effects of This Embodiment)

As described above, in the lens driving apparatus 1T of this embodiment, the outer peripheral shape of the coil 14 is circular while the tube-like body portion 160 of the yoke 16 is in the shape in which the corner portions of the square 50 are chamfered, as seen from the optical axis direction. Therefore, the space between the outer circumferential surface of the coil 14 and the inner peripheral surface of the tube-like body portion 160 of the yoke 16 is narrower in the areas corresponding to the sides of the square 50 and wider in the areas corresponding to the corner portions 51, 52, 53 and 54 of the square 50. Because of such a configuration, four magnets 17 are arranged in the corner portions 51, 52, 53 and 54 of the tube-like body portion 160 of the yoke 16 and shaped along the inner peripheral surface of the tube-like body portion 160 of the yoke 16 in this embodiment; therefore, the space between the inner peripheral surface of the tube-like body portion 160 of the yoke 16 and the outer circumferential surface of the coil 14 can be effectively utilized as a space for placing the magnets 17, thus reducing dead space. Also, since the magnets 17 can be efficiently filled between the inner peripheral surface of the tube-like body portion 160 of the yoke 16 and the outer circumferential surface of the coil 14, the magnets 17 of a large mass can be used, so a magnetic field that is interlinked to the coil 14 can be efficiently produced. For this reason, the drive efficiency, current usage efficiency and energy savings efficiency can be improved.

Modification Example 1 of Embodiment 5

FIGS. 30(a)-30(c) are respectively a plan view and a vertical cross-sectional view of a magnetic circuit used in a drive mechanism of a lens driving apparatus of the Modification Example 1 of Embodiment 5 of the present invention and an explanatory illustration of the magnet. Note that this example and other examples that will be described later have the same basic configuration as Embodiments 1 and 5; therefore, the same codes are given to the common portions and their description is omitted.

As shown in FIGS. 30 (a) and 30(b), the drive mechanism 5 in this embodiment is also equipped with the annular coil 14 which is directly wound around the outer circumferential surface of the sleeve 15 and the interlinked magnetic field producing body 4 that produces an interlinked magnetic field to the coil 14, in the same manner as in Embodiment 5; the magnetic circuit is configured with the coil 14 and the interlinked magnetic field producing body 4. The interlinked magnetic field producing body 4 is equipped with the magnets 17 arranged on the outer periphery of the coil 14 and the yoke 16 composed of a ferromagnetic plate such as a steel plate. The yoke 16 has the tube-like body portion 160 (the cover portion) that surrounds the coil 14, and the magnets 17 are fixed on the inner peripheral surface of the tube-like body portion 160.

The tube-like body portion 160 of the yoke 16 is in the shape in which the corner portions 51, 52, 53 and 54 of the square are chamfered in the same manner as Embodiment 1. Since the movable body 3 is a cylindrical body, the coil 14 is wound annularly. Therefore, the space between the outer circumferential surface of the coil 14 and the inner peripheral surface of the tube-like body portion 160 of the yoke 16 is narrower in the areas corresponding to the sides of the square and wider in the areas corresponding to the corner portions 51, 52, 53 and 54 of the square. For this reason, even in this embodiment, four magnets 17 are equidistantly arranged in the corner portions 51, 52, 53 and 54 of the tube-like body portion 160 of the yoke 16. Also, each of the four magnets 17, when seen in a plan view, has the inner face in an arc shape along the outer circumferential shape of the coil 14 and the outer face in the shape of the inner peripheral surface of the corner portion 51, 52, 53 or 54 of the tube-like body portion 160.

Each of the four magnets 17 is composed of two magnetic pieces 170, each of which is magnetized to unlike poles in the optical axis direction; the two magnetic pieces 170 are layered in the optical axis direction such that like poles make contact with each other. For example, the two magnetic pieces 170 are layered in the optical axis direction such that the N poles make contact with each other.

In the lens driving apparatus 1T configured as above, the four magnets 17 are respectively arranged in the corner portions 51, 52, 53 and 54 of the tube-like body portion 160 of the yoke 16 and shaped along the inner peripheral surface of the tube-like body portion 160 of the yoke 16; therefore, the space between the inner peripheral surface of the tube-like body portion 160 of the yoke 16 and the outer circumferential surface of the coil 14 can be effectively utilized as a space for placing the magnets 17, thus reducing dead space.

Each of the four magnets 17 is composed of two magnetic pieces 170, each of which is magnetized to unlike poles in the optical axis direction; the two magnetic pieces 170 are layered in the optical axis direction such that like poles make contact with each other. Therefore, around the contact portion between the two magnetic pieces 170, the magnetic lines of force are intensely produced, thus efficiently producing a magnetic field interlinked to the coil 14.

Modification Example 2 of Embodiment 5

FIGS. 31(a)-31(c) are respectively a plan view and a vertical cross-sectional view of a magnetic circuit used in a drive mechanism of a lens driving apparatus of the Modification Example 2 of Embodiment 5 of the present invention and an explanatory illustration of the magnet.

As shown in FIGS. 31(a) and 31(b), the drive mechanism 5 in this example is also equipped with the annular coil 14 which is directly wound around the outer circumferential surface of the sleeve 15 and the interlinked magnetic field producing body 4 that produces an interlinked magnetic field to the coil 14, in the same manner as in Embodiment 5; the magnetic circuit is configured with the coil 14 and the interlinked magnetic field producing body 4. The interlinked magnetic field producing body 4 is equipped with the magnets 17 arranged on the outer circumferential side of the coil 14 and the yoke 16 composed of a ferromagnetic plate such as a steel plate. The yoke 16 has the tube-like body portion 160 (the cover portion) that surrounds the coil 14, and the magnets 17 are fixed on the inner peripheral surface of the tube-like body portion 160.

The tube-like body portion 160 of the yoke 16 is in the shape in which the corner portions 51, 52, 53 and 54 of the square are chamfered. Since the movable body 3 is a cylindrical body, the coil 14 is wound annularly. Therefore, the space between the outer circumferential surface of the coil 14 and the inner peripheral surface of the tube-like body portion 160 of the yoke 16 is narrower in the area corresponding to the sides of the square and is wider in the area corresponding to the corner portions 51, 52, 53 and 54 of the square. For this reason, even in this embodiment, four magnets 17 are equidistantly arranged in the corner portions 51, 52, 53 and 54 of the tube-like body portion 160 of the yoke 16. Also, each of the four magnets 17, when seen in a plan view, has the inner face in an arc shape along the outer circumferential shape of the coil 14 and the outer face in the shape of the inner periphery of the corner portion 51, 52, 53 or 54 of the tube-like body portion 160.

Each of the four magnets 17 is magnetized to unlike poles in the inside-outside direction. Also, the yoke 16 is provided with inner yoke portions 161, which respectively start at the bottom end of the tube-like body portion 160, go under the movable body 3 at four places in the circumferential direction at which the magnet 17 are arranged, and extend to the inside position; the inner yoke portion 161 is opposed to the magnet 17 interposing the coil 14 therein. More specifically, for instance, the sleeve 15 and the sleeve 15 may be distanced from each other in the radial direction and the sleeves 15 be connected to each other with the top ends thereof, and then the inner yoke portion 161 be extended up to the connection between the sleeve 15 and the sleeve 15. Also, a notch may be cut in the sleeve 15 and inner yoke portion 161 can be extended into the notch.

In the lens driving apparatus 1T configured as above, the four magnets 17 are respectively arranged along the inner peripheral surface of the tube-like body portion 160 of the yoke 16 in the corner portions 51, 52, 53 and 54 of the tube-like body portion 160 of the yoke 16; therefore, the space between the inner peripheral surface of the tube-like body portion 160 of the yoke 16 and the outer circumferential surface of the coil 14 can be effectively utilized as a space for placing the magnets 17, thus reducing dead space.

Since the yoke 16 is provided with the inner yoke portions 161, each of which is extended to the position on the inner side of the coil 14, a magnetic field interlinked to the coil 14 can be efficiently produced.

Modification Example 3 of Embodiment 5

FIGS. 32(a)-32(c) are respectively a plan view and a vertical cross-sectional view of a magnetic circuit used in a drive mechanism of a lens driving apparatus of the Modification Example 3 of Embodiment 5 of the present invention and an explanatory illustration of the magnet.

As shown in FIGS. 32 (a) and 32(b), the drive mechanism 5 in this embodiment is also equipped with the coil 14 which is directly wound around the outer peripheral surface of the sleeve 15 and the interlinked magnetic field producing body 4 that produces an interlinked magnetic field to the coil 14, in the same manner as in Embodiment 5; the magnetic circuit is configured with the coil 14 and the interlinked magnetic field producing body 4. The interlinked magnetic field producing body 4 is equipped with the magnets 17 arranged on the outer periphery side of the coil 14 and the yoke 16 composed of a ferromagnetic plate such as a steel plate. The yoke 16 has the tube-like body portion 160 (the cover portion) that surrounds the coil 14, and the magnets 17 are fixed on the inner peripheral surface of the tube-like body portion 160.

Since the movable body 3 is in a shape in which the corner portions 51, 52, 53, and 54 of the square are chamfered, the coil 14 is formed also in the shape in which the corner portions 51, 52, 53, and 54 of the square are chamfered. Also, the tube-like body portion 160 of the yoke 16 is in the shape in which the corner portions 51, 52, 53 and 54 of the square are chamfered; the space between the outer peripheral surface of the coil 14 and the inner peripheral surface of the tube-like body portion 160 of the yoke 16 is narrower in the areas corresponding to the sides of the square and is wider in the areas corresponding to the corner portions 51, 52, 53 and 54 of the square. For this reason, even in this embodiment, the four magnets 17 are equidistantly arranged in the corner portions 51, 52, 53 and 54 of the tube-like body portion 160 of the yoke 16.

Each of the four magnets 17 has the outer face shaped along the inner peripheral surface of the tube-like body portion 160 of the yoke 16 in the same manner as in Embodiments 1 through 3, but it is positioned in the optical axis direction with respect to the coil 14 in this embodiment. Also, inner yokes 162, which are independent from the yoke 16 (the tube-like body portion 160) are provided in this embodiment; each of the inner yokes 162 is fixed to the inner face of the magnet 17 and the end portion thereof is opposed to the yoke 16 (the tube-like body portion 160) having the coil 14 interposed with the yoke 16.

In the lens driving apparatus configured as above, although the outer peripheral shape of the coil 14 and the inner peripheral shape of the tube-like body portion 160 of the yoke 16 are almost the same, the magnet 17 is arranged and shaped along the inner peripheral surface of the tube-like body portion 160 of the yoke 16 in each of the wider-width areas (the areas corresponding to the square corners) between the outer peripheral surface of the coil 14 and the inner peripheral surface of the tube-like body portion 160 of the yoke 16. Thus, the space between the inner peripheral surface of the tube-like body portion 160 of the yoke 16 and the outer peripheral surface of the coil 14 can be effectively utilized as a space for placing the magnets 17, thus reducing dead space.

Modification Example 4 of Embodiment 5

FIGS. 33(a)-33(c) are respectively a plan view and a vertical cross-sectional view of a magnetic circuit used in a drive mechanism of a lens driving apparatus of the Modification Example 4 of Embodiment 5 of the present invention and an explanatory illustration of the coil yoke.

As shown in FIGS. 33(a)-33(c), the drive mechanism 5 in this example is also equipped with the annular coil 14 which is directly wound around the outer circumferential surface of the sleeve 15 and the interlinked magnetic field producing body 4 that produces an interlinked magnetic field to the coil 14, in the same manner as in Embodiment 5; the magnetic circuit is configured with the coil 14 and the interlinked magnetic field producing body 4. The interlinked magnetic field producing body 4 is equipped with the magnets 17 arranged on the outside of the coil 14 in the radial direction and the yoke 16 composed of a ferromagnetic plate such as a steel plate. The yoke 16 has the tube-like body portion 160 (the cover portion) that surrounds the coil 14, and the magnets 17 are fixed on the inner peripheral surface of the tube-like body portion 160.

Since the movable body 3 is formed in the shape in which the corner portions 51, 52, 53, and 54 of the square are chamfered, the coil 14 is formed also in the shape in which the corner portions 51, 52, 53, and 54 of the square are chamfered. Also, the tube-like body portion 160 of the yoke 16 is in the shape in which the corner portions 51, 52, 53 and 54 of the square are chamfered; the space between the outer circumferential surface of the coil 14 and the inner peripheral surface of the tube-like body portion 160 of the yoke 16 is narrower in the areas corresponding to the sides of the square and wider in the areas corresponding to the corner portions 51, 52, 53 and 54 of the square. For this reason, even in this embodiment, the four magnets 17 are equidistantly arranged in the corner portions 51, 52, 53 and 54 of the tube-like body portion 160 of the yoke 16.

Each of the four magnets 17 is magnetized to unlike poles in the inside-outside direction in the same manner as in Embodiment 5, and produces an interlinked magnetic field to the coil 14 via the yoke 16. In this embodiment, coil yokes 165 are arranged on opposite side (on the inner circumferential side) of the coil 14 from the side on which the magnets 17 are arranged. Since the magnetic lines of force emanated from the magnetic pieces 170 can be efficiently guided to be interlinked with the coil 14, the density of the interlinked magnetic flux is intense. For this reason, a large thrust force can be applied to the movable body 3.

Modification Example 5 of Embodiment 5

FIGS. 34(a)-34(d) are respectively a plan view and a vertical cross-sectional view of a magnetic circuit used in a drive mechanism of a lens driving apparatus of the Modification Example 5 of Embodiment 5 of the present invention, an explanatory illustration of the magnet and an explanatory illustration of its modification example.

As shown in FIGS. 34(a)-34(c), the drive mechanism 5 in this embodiment is also equipped with the annular coil 14 which is directly wound around the outer circumferential surface of the sleeve 15 and the interlinked magnetic field producing body 4 that produces an interlinked magnetic field to the coil 14, in the same manner as in Embodiment 5; the magnetic circuit is configured with the coil 14 and the interlinked magnetic field producing body 4. The interlinked magnetic field producing body 4 is equipped with the magnets 17 arranged on the outside of the coil 14 in the radial direction and the yoke 16 composed of a ferromagnetic plate such as a steel plate. The yoke 16 has the tube-like body portion 160 (the cover portion) that surrounds the coil 14, and the magnets 17 are fixed on the inner peripheral surface of the tube-like body portion 160.

The tube-like body portion 160 of the yoke 16 is in the shape in which the corner portions 51, 52, 53 and 54 of the square are chamfered in the same manner as Embodiment 1. Since the movable body 3 is a cylindrical body, the coil 14 is wound annularly. Therefore, the space between the outer circumferential surface of the coil 14 and the inner peripheral surface of the tube-like body portion 160 of the yoke 16 is narrower in the areas corresponding to the sides of the square and wider in the areas corresponding to the corner portions 51, 52, 53 and 54 of the square. For this reason, even in this example, the four magnets 17 are equidistantly arranged in the corner portions 51, 52, 53 and 54 of the tube-like body portion 160 of the yoke 16. Also, each of the four magnets 17, when seen in a plan view, has the inner face in an arc shape along the outer circumferential shape of the coil 14 and the outer face in the shape of the inner periphery of the corner portion 51, 52, 53 or 54 of the tube-like body portion 160.

In this embodiment, each of the four magnets 17 is composed of two magnetic pieces 170 which are layered in the direction of the lens optical axis, X, and two coils 14 are arranged to be respectively opposed to each of the multiple magnetic pieces 170. Each of the two magnetic pieces 170 is magnetized to unlike poles in the inside-outside direction, and the magnetizing directions of the two magnetic pieces 170 are opposite from each other in the inside-outside direction. Therefore, one of the two magnetic pieces 170 is opposed to the coil 14 with the S pole and the other is opposed to the coil 14 with the N pole.

In the magnetic circuit configured as above, the magnetic lines of force emanated from the two magnetic pieces 170 concentrate toward the center of the magnet 17 in the optical axis direction, as diagrammatically illustrated in FIG. 34 (*c*). Also, the magnetic lines of force emanated from the two magnetic pieces 170 travel around within the narrow area, and thus leakage flux is minimal. Accordingly, the density of the magnetic flux interlinked with the coil 14 is intensified; therefore, a large thrust force can be applied to the movable body 3.

Note that, although FIGS. 34 (*b*) and 34(*c*) show the example that uses two magnetic pieces 170, three or more magnetic pieces 170 may be layered in the direction of the lens optical axis, X. Even in this case, each of the three or more magnetic pieces 170 can be magnetized to unlike poles in the inside-outside direction, and the magnetizing directions of the magnetic pieces 170 in the inside-outside direction, which are adjacent to each other in the direction of the lens optical axis, X, can be opposite from each other.

Although the example is illustrated in FIGS. 34 (*b*) and 34(*c*) in which two magnetic pieces 170 are used, a polarized (magnetized) magnet may be provided to a single magnet 170 as shown in FIG. 34 (*d*) to arrange the magnetic poles as shown in FIG. 34 (*b*). In other words, each of the four magnets 17 has two magnetized areas arranged parallel to the direction of the lens optical axis, X and two of the coil 14 are arranged in the direction of the lens optical axis, X, to be opposed to each of the two magnetized areas. The magnet 17 has unlike poles in the inside-outside direction in each of the two magnetized areas, and the magnetizing directions in the inside-outside direction are opposite from each other in the magnetized areas which are adjacent to each other in the direction of the lens optical axis, X. By using such a configuration, the density of the magnetic flux interlinked to the coil 14 can be intensified even with one magnet 17; therefore, a large thrust force can be applied to the movable body 3.

Note that, comparing the configuration shown in FIG. 34 (*c*) with the one shown in FIG. 34 (*d*), hardly any unstable region is produced in the border area of the unlike poles in the configuration shown in FIG. 34 (*c*); therefore, there is an advantage that the density of the magnetic flux interlinked with the coil 14 can be intensified.

Modification Example 6 of Embodiment 5

FIG. 35 is an explanatory illustration of a magnetic member used in a lens driving apparatus of the Modification Example 6 of Embodiment 5 of the present invention. In the above-described Embodiment 5, the first flat spring 132 and the second flat spring 131 (the spring members) that apply a mechanical urging force to the movable body 3 are used as a regulatory means capable of applying an urging force to retain the movable body 3 in a predetermined position in the optical axis direction whether or not the coil 14 is electrified; however, as shown in FIG. 35, a ball-type, wire-type, or bar-type magnetic member 138 in addition to the first flat spring 132 and the second flat spring 131 may be attached to the movable body 3. With this configuration, a magnetic urging force produced between the magnetic member 138 and the magnet 17 can be applied to the movable body 3.

Modification Example 7 of Embodiment 5

FIGS. 36 (*a*) and 36(*b*) are respectively an exterior appearance view and a perspective disassembly diagram of a lens driving apparatus of the Modification Example 7 of Embodiment 5 of the present invention.

In FIGS. 36 (*a*) and 36(*b*), a lens driving apparatus 1U of this example has the movable body 3 that holds three lenses 121, 122 and 123 and the fixed aperture together on the cylindrical sleeve 15 thereof, the drive mechanism 5 that moves the movable body 3 along the lens optical axis, X, and the fixed body 2 in which the drive mechanism 5 and the movable body 3 are mounted.

In this example, the fixed body 2 is equipped with the base 19 for holding the image pickup device (not illustrated) on the image side and the case 11 positioned on the photographic subject side. In the center of the case 11, a circular light-entrance window 110 is created for collecting light reflected from the photographic subject into the lenses. Also, the fixed body 2 is equipped with the yoke 16 sandwiched between the base 19 and the case 11, and the tube-like body portion 160 of the yoke 16 functions as a cover portion that surrounds the magnet 17 and configures together with the magnet 17 an interlinked magnetic field producing body that produces an interlinked magnetic field to the coil 14. An end portion of the tube-like body portion 160 of the yoke 16 on the image pickup device side is adhered to the base 19 and the other end portion of the tube-like body portion 160 of the yoke 16 on the photographic subject side is adhered to the case 11.

In this example, the fixed body 2 is equipped with a thin metallic plate-type cover 18 that covers the photographic subject side of the case 11; a circular light-entrance window 110 is also created in the thin plate-like cover 18. Also, the thin plate-like cover 18 has a pair of engaging legs 181 which are extended from the two opposing sides of the cover toward the base 19, and protrusions 192 projecting from the side faces of the base 19 are fitted into holes 182 bored in the bottom end portions of the engaging leg portions 181. An adhesive is used to further secure the bottom end portions of the engaging leg portions 181 and the protrusions 192.

When the lens driving apparatus 1U configured as above is seen from the optical axis direction, the tube-like body portion 160 of the yoke 16 is in the shape in which the corner portions of the square are chamfered. The base 19, the case 11 and the thin plate-like cover 18 are also shaped so that the corners of the square are chamfered, and their size is the same as the tube-like body portion 160. Therefore, the outer peripheral shapes of the tube-like body portion 160 of the yoke 16, the base 19, the case 11 and the thin plate cover 18 define the exterior peripheral shape of the lens driving apparatus 1U.

Since the movable body 3 has the cylindrical sleeve 15, the coil 14 is wound annularly. The inner peripheral shape of the tube-like body portion 160 of the yoke 16 is non-circular (polygonal in this example) which is different from the outer circumferential shape of the coil 14. Therefore, the space between the outer circumferential surface of the coil 14 and the inner peripheral surface of the tube-like body portion 160 of the yoke 16 is narrower in the areas corresponding to the sides of the square and wider in the areas corresponding to the square corners. In this example, then, four magnets 17 are equidistantly placed in the corner portions of the tube-like body portion 160 of the yoke 16. Each of the four magnets 17, when seen in a plan view, has the inner face in an arc shape along the outer circumferential shape of the coil 14 and the outer face in the shape of the inner periphery of the corner portion of the tube-like body portion 160.

In this example, the first flat spring 132 and the second flat spring 131 (the spring members) that apply a mechanical urging force to the movable body 3 are used as a regulatory means capable of applying an urging force to retain the movable body 3 in a predetermined position in the optical axis direction whether or not the coil 14 is electrified. Also, in this example, the ball-type, wire-type, or bar-type magnetic members 138 held in the movable body 3 are used as the magnetic material that are magnetically attracted to the magnets 17, and a magnetic urging force produced between the magnetic members 138 and the magnets 17 can be applied to the movable body 3.

In this example, in order to have the movable body 3 hold the magnetic members 138, recess portions 158 that can store a plurality of magnetic members 138 are formed at the positions corresponding to the four corner portions of the tube-like body portion 160 in the top face of the movable body 3. Also, notches 118 that open up the upper ends of the two recess portions diagonally positioned among the four recess portions 158 are cut in the case 11.

To manufacture such a lens driving apparatus 1U, prior to placing the case 11, the magnetic members 138 are respectively first attached to the inside of each of the four recess portions 158 and adhered, and then the case 11 is placed. In this state, the driving condition and the inclination of the movable body 3 are examined, and based on the examinations, the magnetic members 138 are additionally placed in the two diagonally-positioned recess portions 158 from the notches 118 in the case 11 and adhered, and then the driving condition and the inclination of the movable body 3 are adjusted. After the adjustments, the thin plate-like cover 18 is placed to cover the recess portions 158. Also, when the small gap that exists at the upper part of the case 11 is covered by the thin plate cover 18, foreign matter is kept from entering the lens driving apparatus 1U, thus increasing reliability of the lens driving apparatus 1U.

Note that, although, in this example, the holes 182 are bored in the bottom end portions of the engaging leg portions 181 and the protrusions 192 are formed on the side faces of the base 19 for engaging the engaging leg portions 181 of the thin plate-like cover 18 with the base 19, the bottom ends of the engaging leg portions 181 may be projected toward the inside, and the bottom ends of the engaging leg portions 181 may be fitted into the recess portions created in the side faces of the base 19. Also, the bottom ends of the engaging leg portions 181 may be projected toward the inside and slid into the grooves cut in the side faces of the base 19.

Other Modification Examples of Embodiment 5

In the above mentioned Embodiment 5 and its Modification Examples, the tube-like body portion 160 of the yoke 16 is in the shape in which the corner portions 51, 52, 53 and 54 of the square are chamfered; however, the tube-like body portion 160 of the yoke 16 can be octagonal. In this case, each of the magnets 17 is placed at the position that includes two of the corner portions of the tube-like body portion 160 of the yoke 16; therefore, the space between the inner peripheral surface of the tube-like body portion 160 of the yoke 16 and the outer circumferential surface of the coil 14 can be effectively utilized as a space for placing the magnets 17, reducing dead space.

Also, in the above mentioned Embodiment 5 and its Modification Examples, the movable body 3 is cylindrical and the tube-like body portion 160 of the yoke 16 (the shape of the lens driving apparatus 1U) is in a polygonal shape; however, even when the movable body 3 is in a square tube shape and the tube-like body portion 160 of the yoke 16 (the shape of the lens driving apparatus 1U is in a circular shape, there are narrower areas and wider areas in the space between the outer circumferential surface of the coil 14 and the inner peripheral surface of the tube-like body portion 160 of the yoke 16. Even in this case, when the magnets 17 are arranged to be along the inner peripheral surface of the tube-like body portion 160 of the yoke 16 in the wider area, the space between the inner peripheral surface of the tube-like body portion 160 of the yoke 16 and the outer circumferential surface of the coil 14 can be effectively utilized as a space for arranging the magnets 17, reducing dead space.

Further, in the above mentioned Embodiment 5 and its Modification Examples, the cover portion is configured with the tube-like body portion 160 of the yoke 16; however, at least an embodiment of the present invention may be applied to the configuration in which the cover portion is configured with the tube-like body portion formed in the base 19 and the case 11.

As described above, according to at least an embodiment of the present invention, a force to regulate the movement of the movable body is produced and applied to the movable body by the regulatory means; therefore, the movable body is halted when the force to move the movable body attains equilibrium with the force to prevent the movement of the movable body. For this reason, the movable body can be halted in the desired position by adjusting the amount of the current that flows in the coil and the force exerted on the movable body with the regulatory means. Consequently the lenses can be positioned in desired positions between the lens position for close-up photography and the lens position for a normal snapshot; even for a self-photography, for example, a crispy image can be obtained, and the focusing function of the lens driving apparatus can be improved. Also, a lens driving apparatus can be thinner.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:
1. A lens driving apparatus comprising:
a movable body holding lenses;
a fixed body in which said movable body is mounted being movable along the lens optical axis; and
a drive mechanism that moves said movable body in the lens optical axis direction;
wherein said drive mechanism is equipped with a coil that is held by either said movable body or said fixed body, a magnet that is held by said other body, and a regulatory means that regulates the movement of said movable body which is induced by an electromagnetic force generated when current is passed through said coil, said fixed body has a cover portion that surrounds said movable body and said magnet, said coil is wound annularly, an inner peripheral shape of said cover portion is polygonal, and said magnet is arranged at a position that includes at least one corner portion of multiple corners in the inner peripheral shape of said cover portion.

2. The lens driving apparatus as set forth in claim 1, wherein the inner peripheral shape of said cover portion is square or polygonal in which the corners of the inner peripheral shape of said cover portion are chamfered, and said magnet is arranged at each of said corner portions of the inner peripheral shape of said cover portion.

3. The lens driving apparatus as set forth in claim 1, wherein said magnet is positioned with said corner portion of said cover portion.

4. A lens driving apparatus comprising:

a movable body holding lenses;

a fixed body in which said movable body is mounted moveably along a lens optical axis direction; and a drive mechanism that moves said movable body in the lens optical axis direction;

wherein said drive mechanism is equipped with a coil that is held by said movable body or said fixed body, a magnet that is held by the other body of the movable body and the fixed body, and a regulatory means that regulates the movement of said movable body which is induced by an electromagnetic force generated when current is passed through said coil;

wherein said coil is held on an outer circumference of said movable body;

wherein said fixed body has a cover portion that surrounds said movable body and said magnet, and said magnet is arranged along an inner peripheral surface of said cover portion; and wherein said cover portion is a tube-like body portion of a back yoke, and said magnet is adhered to an inner peripheral surface of said tube-like body portion of said back yoke.

5. The lens driving apparatus as set forth in claim 4, wherein said fixed body is equipped with a base which is placed on said tube-like body portion of said back yoke, on a side of an image pickup device in the optical axis direction, and a case which is placed on said tube-like body portion of said back yoke, on a photographic subject side; and said back yoke, said base, and said case are in an identical outer peripheral shape when viewed from the optical axis direction.

6. The lens driving apparatus as set forth in claim 4, wherein said back yoke has an inner yoke which is extended from said tube-like body portion to an inner side of said coil.

7. The lens driving apparatus as set forth in claim 4, wherein a coil yoke is arranged on an other side of said coil from the side where said magnet is arranged.

8. A lens driving apparatus comprising:

a movable body holding lenses;

a fixed body in which said movable body is mounted moveably along a lens optical axis direction; and a drive mechanism that moves said movable body in the lens optical axis direction;

wherein said drive mechanism is equipped with a coil that is held by said movable body or said fixed body, a magnet that is held by the other body of the movable body and the fixed body, and a regulatory means that regulates the movement of said movable body which is induced by an electromagnetic force generated when current is passed through said coil;

wherein said coil is held on an outer circumference of said movable body; and wherein said magnet is magnetized to unlike poles in an inside-outside direction.

9. A lens driving apparatus comprising:

a movable body holding lenses;

a fixed body in which said movable body is mounted moveably along a lens optical axis direction; and a drive mechanism that moves said movable body in the lens optical axis direction;

wherein said drive mechanism is equipped with a coil that is held by said movable body or said fixed body, a magnet that is held by the other body of the movable body and the fixed body, and a regulatory means that regulates the movement of said movable body which is induced by an electromagnetic force generated when current is passed through said coil;

wherein said coil is held on an outer circumference of said movable body; and wherein said magnet is composed of multiple magnetic pieces which are layered in the optical axis direction; and said coil is arranged in multiple in the optical axis direction to be opposed to each of said multiple magnetic pieces; and each of said multiple magnetic pieces are magnetized to unlike poles in an inside-outside direction and the magnetizing directions in the inside-outside direction in the magnetic pieces which are adjacent to each other in the optical axis direction are opposite from one another.

10. A lens driving apparatus comprising:

a movable body holding lenses;

a fixed body in which said movable body is mounted moveably along a lens optical axis direction; and a drive mechanism that moves said movable body in the lens optical axis direction;

wherein said drive mechanism is equipped with a coil that is held by said movable body or said fixed body, a magnet that is held by the other body of the movable body and the fixed body, and a regulatory means that regulates the movement of said movable body which is induced by an electromagnetic force generated when current is passed through said coil;

wherein said coil is held on an outer circumference of said movable body; and wherein said magnet has a plurality of divided magnetized areas along the optical axis direction, and said coil is arranged in multiple in the optical axis direction to be opposed to each of said plurality of divided magnetized areas; each of said plurality of divided magnetized areas is magnetized to unlike poles in an inside-outside direction, and the magnetizing directions in the inside-outside direction in the magnetized areas which are adjacent to each other in the optical axis direction are opposite from one another.

* * * * *